US012425711B2

(12) United States Patent
Tseng et al.

(10) Patent No.: US 12,425,711 B2
(45) Date of Patent: Sep. 23, 2025

(54) CAMERA MODULE AND ELECTRONIC DEVICE

(71) Applicant: LARGAN PRECISION CO., LTD., Taichung (TW)

(72) Inventors: Te-Sheng Tseng, Taichung (TW); Heng Yi Su, Taichung (TW); Yi Hua Tseng, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 106 days.

(21) Appl. No.: 18/535,959

(22) Filed: Dec. 11, 2023

(65) Prior Publication Data

US 2025/0024127 A1    Jan. 16, 2025

Related U.S. Application Data

(60) Provisional application No. 63/526,879, filed on Jul. 14, 2023.

(51) Int. Cl.
*H04N 23/55* (2023.01)
*G02B 13/00* (2006.01)
*G02B 27/64* (2006.01)
*G03B 13/32* (2021.01)
*H04N 23/54* (2023.01)

(52) U.S. Cl.
CPC ........... *H04N 23/55* (2023.01); *G02B 13/002* (2013.01); *G02B 27/64* (2013.01); *G03B 13/32* (2013.01); *H04N 23/54* (2023.01); *G03B 2205/0069* (2013.01)

(58) Field of Classification Search
CPC .... G02B 13/002; G02B 27/64; G02B 27/646; G02B 5/005; G03B 13/32; G03B 2205/0069; G03B 30/00; G03B 9/06; H04N 23/54; H04N 23/55; H04N 23/687
See application file for complete search history.

(56) References Cited

U.S. PATENT DOCUMENTS 10,863,094 B2   12/2020  Sharma et al.
10,924,675 B2    2/2021  Hubert et al.
11,057,564 B2    7/2021  Johnson et al.
(Continued)

FOREIGN PATENT DOCUMENTS

CN    108780207 A    11/2018
CN    110892704 B     3/2021
(Continued)

*Primary Examiner* — Antoinette T Spinks
(74) *Attorney, Agent, or Firm* — Maschoff Brennan

(57) ABSTRACT

A camera module includes an imaging lens having an optical axis, a variable through hole mechanism, an image sensor, an image sensor actuating module and a flexible printed circuit. The variable through hole mechanism is disposed corresponding to the imaging lens to adjust an amount of light into the imaging lens. The image sensor is disposed on the optical axis and is configured to convert imaging light passing through the imaging lens into an image signal. The image sensor actuating module is configured to move the image sensor. The variable through hole mechanism and the image sensor actuating module each have a coil disposed on the flexible printed circuit. The flexible printed circuit is electrically connected to the variable through hole mechanism and the image sensor actuating module.

18 Claims, 59 Drawing Sheets

(56) References Cited

U.S. PATENT DOCUMENTS

| | | | |
|---|---|---|---|
| 2001/0028516 A1* | 10/2001 | Noguchi | G02B 27/646 |
| | | | 359/694 |
| 2013/0016428 A1* | 1/2013 | Sugawara | G02B 7/08 |
| | | | 359/557 |
| 2014/0028862 A1 | 1/2014 | Kawai | |
| 2014/0375829 A1 | 12/2014 | Nishihara et al. | |
| 2016/0127621 A1* | 5/2016 | Liao | H04N 23/45 |
| | | | 348/335 |
| 2019/0369678 A1* | 12/2019 | Park | H04M 1/0264 |
| 2020/0036898 A1 | 1/2020 | Kuo et al. | |
| 2021/0092297 A1 | 3/2021 | Smyth et al. | |
| 2021/0218896 A1 | 7/2021 | Smyth et al. | |
| 2021/0258491 A1 | 8/2021 | Park | |
| 2021/0329170 A1 | 10/2021 | Osaka | |
| 2022/0094824 A1* | 3/2022 | Yang | H04N 23/55 |

FOREIGN PATENT DOCUMENTS

| | | |
|---|---|---|
| JP | 2011-133828 A | 7/2011 |
| JP | 2014-123852 A | 7/2014 |

\* cited by examiner

CAMERA MODULE AND ELECTRONIC DEVICE

RELATED APPLICATIONS

This application claims priority to U.S. Provisional Application 63/526,879, filed on Jul. 14, 2023, which is incorporated by reference herein in its entirety.

BACKGROUND

Technical Field

The present disclosure relates to a camera module and an electronic device, more particularly to a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

Recently, camera modules are applied to electronic devices in more fields than ever, such as portable devices (e.g., smartphones, action cameras), augmented reality (AR) or virtual reality (VR) head-mounted devices and aerial cameras. Moreover, the hardware used in the camera modules are continuously upgraded, for example, larger image sensors and imaging lenses with better image quality. A larger image sensor provides better image quality, but the background in the picture may become blurry due to an overly shallow depth of field. Conventionally, a variable aperture stop can be used to change the depth of field for adjusting the blur degree of the background and controlling the amount of incident light, such that arranging a variable aperture stop in an optical system of an electronic device becomes a forward-looking subject. However, the conventional optical system is designed without considering the integration of driving mechanism between the variable aperture stop and an image sensor actuating module, leading an overly size of the conventional optical system. Therefore, how to design a lens to highly integrate the driving mechanism between the variable aperture stop and the image sensor actuating module for meeting the requirement of high-end-specification electronic devices is an important topic in this field nowadays.

SUMMARY

According to one aspect of the present disclosure, a camera module includes an imaging lens, a variable through hole mechanism, an image sensor, an image sensor actuating module, and a flexible printed circuit. The imaging lens has an optical axis. The variable through hole mechanism is disposed corresponding to the imaging lens. The variable through hole mechanism is configured to adjust an amount of light into the imaging lens. The variable through hole mechanism includes a first driving mechanism. The first driving mechanism includes at least one first coil and at least one first magnet that are disposed opposite to each other. The image sensor is disposed on the optical axis. The image sensor is configured to convert imaging light passing through the imaging lens into an image signal. The image sensor actuating module is configured to move the image sensor along a direction parallel or perpendicular to the optical axis. The image sensor actuating module includes a second driving mechanism. The second driving mechanism includes at least one second coil and at least one second magnet that are disposed opposite to each other. The flexible printed circuit is electrically connected to the variable through hole mechanism and the image sensor actuating module. The at least one first coil of the first driving mechanism and the at least one second coil of the second driving mechanism are disposed on the flexible printed circuit. When a height of the flexible printed circuit along a direction parallel to the optical axis is Hf, and a height of the imaging lens along the direction parallel to the optical axis is Hi, the following condition is satisfied: $1 < Hf/Hi < 2.5$.

According to another aspect of the present disclosure, an electronic device includes the aforementioned camera module.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
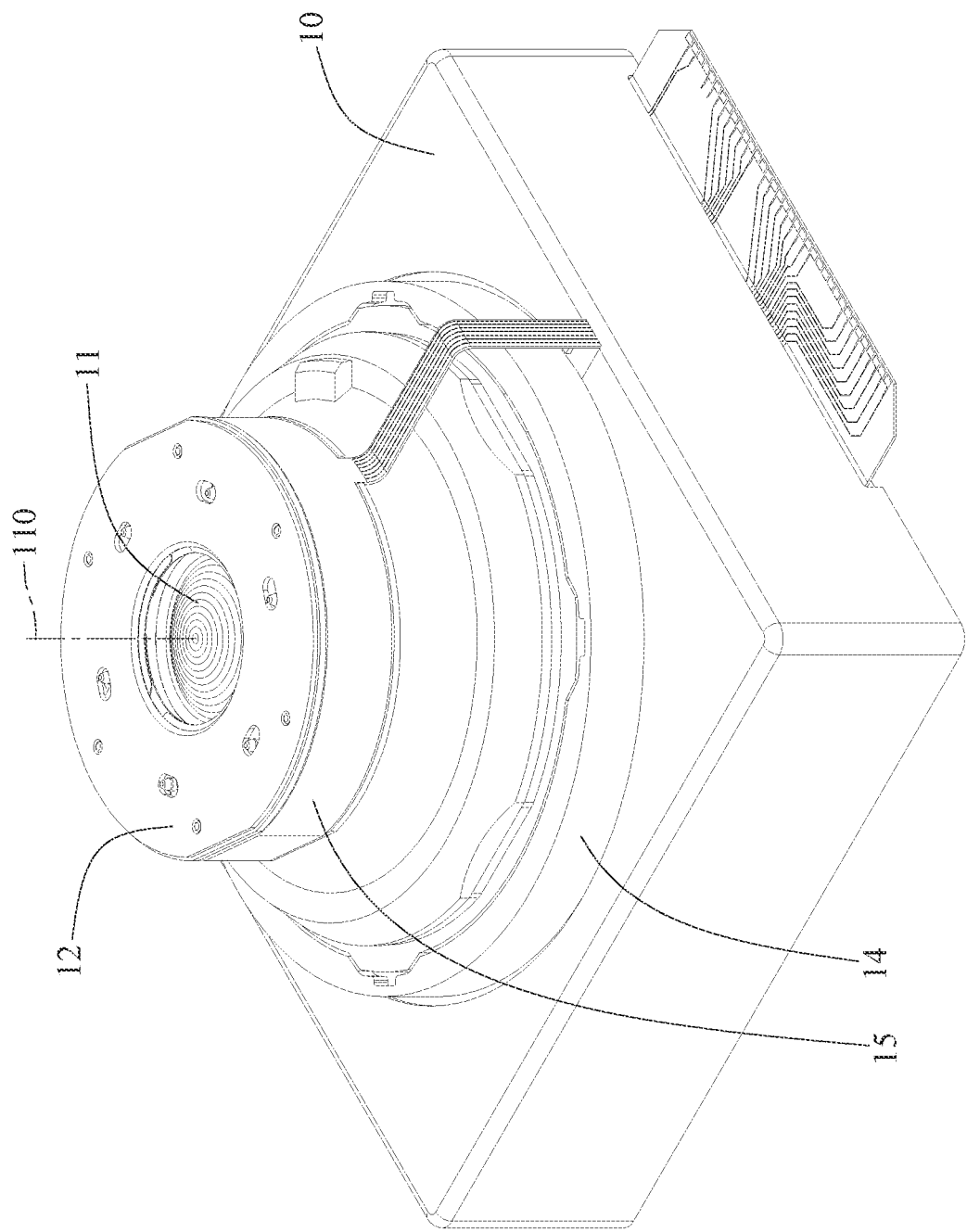
FIG. 1 is a perspective view of the camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a camera module that includes an imaging lens, a variable through hole mechanism, an image sensor, an image sensor actuating module and a flexible printed circuit.

The imaging lens has an optical axis. The imaging lens can include an optical lens assembly. The optical axis can pass through the optical lens assembly. The optical lens assembly can include at least one plastic lens element and at least one glass lens element. Therefore, it is favorable for the optical lens assembly to have a relatively stable optical performance to temperature effect.

When a number of the at least one plastic lens element is Np, and a number of the at least one glass lens element is Ng, the following condition can be satisfied: $1 \leq Ng<Np \leq 12$. Therefore, it is favorable for taking the weight and optical performance of the imaging lens into account by determining a proper quantity of the lens elements. Please refer to FIG. 24, which shows a plurality of plastic lens elements 211a and a glass lens element 211b according to the 2nd embodiment of the present disclosure.

Moreover, the at least one glass lens element can be manufactured by grinding or molding, but the present disclosure is not limited thereto. Moreover, at least one of the at least one glass lens element can be a molded glass lens element. Therefore, it is favorable for better production efficiency of the glass lens element. Moreover, the molded glass lens element can be provided without gate trace at the outer diameter surface thereof and can have a rounded appearance at the edge line thereof. Please refer to FIG. 25, which shows the rounded corner (fillet) LR of the glass lens element 211b according to the 2nd embodiment of the present disclosure, but the present disclosure is not limited thereto.

Moreover, the molded glass lens element can have a vestiger at the outer diameter surface thereof, such that a maximum outer diameter of the molded glass lens element, observed from outside, is located on the vestiger. Please refer to FIG. 26, which shows the vestiger LV and the maximum outer diameter LM of the glass lens element 311b according to the 3rd embodiment of the present disclosure, but the present disclosure is not limited thereto.

The variable through hole mechanism is disposed corresponding to the imaging lens. The variable through hole mechanism is able to adjust an amount of light into the imaging lens. It can be also considered that the variable through hole mechanism provides a variable aperture value, such that the camera module can efficiently correspond to variable photographing scenarios with different requirements of light incident amounts. Therefore, it is favorable for improving image quality.

The variable through hole mechanism can include a first driving mechanism, a light-blocking assembly, a fixed element and a movable element. The first driving mechanism includes at least one first coil and at least one first magnet that are disposed opposite to each other. The light-blocking assembly can include a plurality of light-blocking sheets that can be stacked with each other along a circumferential direction about the optical axis to form a light-passable hole with a variable aperture.

The fixed element can be connected to the light-blocking assembly. The movable element can be connected to the light-blocking assembly, and the at least one first magnet can be disposed on the movable element to be disposed opposite to the at least one first coil. The first driving mechanism is able to rotate the movable element along the circumferential direction with respect to the fixed element so as to drive the light-blocking assembly to adjust the variable aperture of the light-passable hole. Therefore, it is favorable for optimizing the driving efficiency of the first driving mechanism by the proper arrangement between the fixed element and the movable element.

The image sensor is disposed on the optical axis. The image sensor is able to convert imaging light passing through the imaging lens into an image signal.

The image sensor actuating module is able to move the image sensor along a direction parallel to or perpendicular to the optical axis. For example, if the optical axis is the Z-axis, the direction perpendicular to the optical axis can be any direction on an X-Y plane defined by the X-axis and the Y-axis, and the image sensor can be moved along a direction parallel to the Z-axis or any direction on the X-Y plane.

The image sensor actuating module can include a second driving mechanism, an image stabilization module and an image focus module. The second driving mechanism includes at least one second coil and at least one second magnet that are disposed opposite to each other. The image stabilization module and the image focus module can be disposed corresponding to each other.

The image stabilization module is able to move the image sensor along the direction perpendicular to the optical axis. The image stabilization module can include an image sensor carrier, a first movable plate, at least one first rolling supporter, a second movable plate and a first ferromagnetic element. The image sensor carrier can carry the image sensor. Moreover, there can be no relative displacement between the image sensor carrier and the image sensor. The first movable plate can be coupled to the image sensor carrier, and the second driving mechanism can move the first movable plate along the direction perpendicular to the optical axis with respect to the imaging lens. The at least one first rolling supporter can be rollably disposed on the first movable plate. The second movable plate can be connected to the first movable plate via the at least one first rolling supporter, and the second driving mechanism can move the second movable plate along the direction perpendicular to the optical axis with respect to the first movable plate. The first ferromagnetic element can be formed together with the first movable plate through an insert molding process. Therefore, it is favorable for inserting the first ferromagnetic element inside the first movable plate, thereby improving structural strength of the first movable plate.

The image focus module is able to move the image sensor along the direction parallel to the optical axis. The image focus module can include at least one second rolling supporter, a base, at least one third rolling supporter, a frame and a second ferromagnetic element. The at least one second rolling supporter can be rollably disposed on the second movable plate. The base can be connected to the second movable plate via the at least one second rolling supporter, and the second driving mechanism can move the base along the direction parallel to the optical axis with respect to the imaging lens. The at least one third rolling supporter can be rollably disposed on the base. The frame can be connected to the base via the at least one third rolling supporter. The second ferromagnetic element can be formed together with the base through an insert molding process. Therefore, it is favorable for inserting the second ferromagnetic element inside the base, thereby improving structural strengthen of the base. Moreover, the second ferromagnetic element can be disposed opposite to the at least one second magnet. Therefore, it is favorable for providing a preloading force required by the at least one second magnet, such that the at least one second magnet can be relatively secured. Moreover, the at least one second magnet of the second driving mechanism can be disposed on the first movable plate, the second movable plate or the base. Moreover, when the number of the at least one second magnet of the second driving mechanism is three, the second magnets can be respectively disposed on the first movable plate, the second movable plate and the base, but the present disclosure is not limited thereto.

The frame can have a mounting structure. The mounting structure is able to mount the imaging lens, such that there is no relative displacement between the imaging lens and the frame. Therefore, it is favorable for integrating the optical stabilization and auto focusing functions into the image sensor actuating module, thereby simplifying the design of the flexible printed circuit and improving space utilization of the camera module. Moreover, the frame can be formed by coupling an upper cover and a lower cover, wherein the mounting structure is located at the upper cover, and the lower cover is in physical contact with the at least one third rolling supporter. However, the present disclosure is not limited thereto. Moreover, the imaging lens can have no relative displacement inside the camera module. Therefore, it is favorable for fixing the imaging lens inside the camera module by making the frame to have no relative displacement inside the camera module.

The flexible printed circuit is electrically connected to the variable through hole mechanism and the image sensor actuating module. Moreover, the at least one first coil of the first driving mechanism and the at least one second coil of the second driving mechanism are disposed on the flexible printed circuit. Therefore, it is favorable for miniaturizing the camera module by arranging at least part of each of the variable through hole mechanism and the image sensor actuating module on the flexible printed circuit with flexibility. Moreover, the flexible printed circuit can be electrically connected to the variable through hole mechanism, the image sensor and the image sensor actuating module. Therefore, it is favorable for compactly arranging at least part of each of the variable through hole mechanism, the image sensor and the image sensor actuating module on the flexible printed circuit with flexibility while establishing the electrical connections therebetween, thereby further miniaturizing the camera module. Moreover, the flexible printed circuit can include a first part and the second part that are connected to each other. The first part can be located adjacent to the variable through hole mechanism. The second part can be located adjacent to the image sensor actuating module. The first part can be located closer to the optical axis than the second part.

When a height of the flexible printed circuit along the direction parallel to the optical axis is Hf, and a height of the imaging lens along the direction parallel to the optical axis is Hi, the following condition is satisfied: 1<Hf/Hi<2.5. Therefore, it is favorable for further reducing the size of the camera module along the direction parallel to the optical axis, thereby further miniaturizing the camera module. Please refer to FIG. 14 and FIG. 11, which respectively show Hf and Hi according to the 1st embodiment of the present disclosure.

The flexible printed circuit can have a tapered part. Moreover, the tapered part can taper off along the direction parallel to the optical axis. Therefore, it is favorable for concentrating the displacement and deformation of the flexible printed circuit on the tapered part during the operation of the image stabilization module, thereby not affecting other parts of the flexible printed circuit and thus improving operation quality of the camera module. However, the present disclosure is not limited thereto. When a maximum thickness of the tapered part along the direction parallel to the optical axis is Tmax, and a minimum thickness of the tapered part along the direction parallel to the optical axis is Tmin, the following condition can be satisfied: 1<Tmax/Tmin<4.5. Therefore, it is favorable for increasing the flexibility margin of the flexible printed circuit, such that the flexible printed circuit is not easily damaged during the movement of the image sensor, especially the movement along the direction perpendicular to the optical axis. Moreover, the following condition can also be satisfied: 1.1<Tmax/Tmin<3.9. Therefore, it is favorable for having a proper flexibility margin of the flexible printed circuit by determining a proper range of the dimensional ratio. Please refer to FIG. 22 and FIG. 23, which show Tmax and Tmin according to the 1st embodiment of the present disclosure.

The flexible printed circuit can further have an enhanced structure at a bending position located between the variable through hole mechanism and the image sensor actuating module. Therefore, it is favorable for preventing crack on the flexible printed circuit due to an overly bending angle, thereby improving yield rate of products. Moreover, the bending angle of the flexible printed circuit can be greater than 90 degrees. Moreover, the enhanced structure can be thin semi-flexible laminates (FR4) made of glass-reinforced epoxy laminate materials, metal plates, etc., but the present disclosure is not limited thereto. Please refer to FIG. 50 and FIG. 53, which show the enhanced structure 552 according to the 5th embodiment of the present disclosure.

The present disclosure provides an electronic device that includes the abovementioned camera module.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
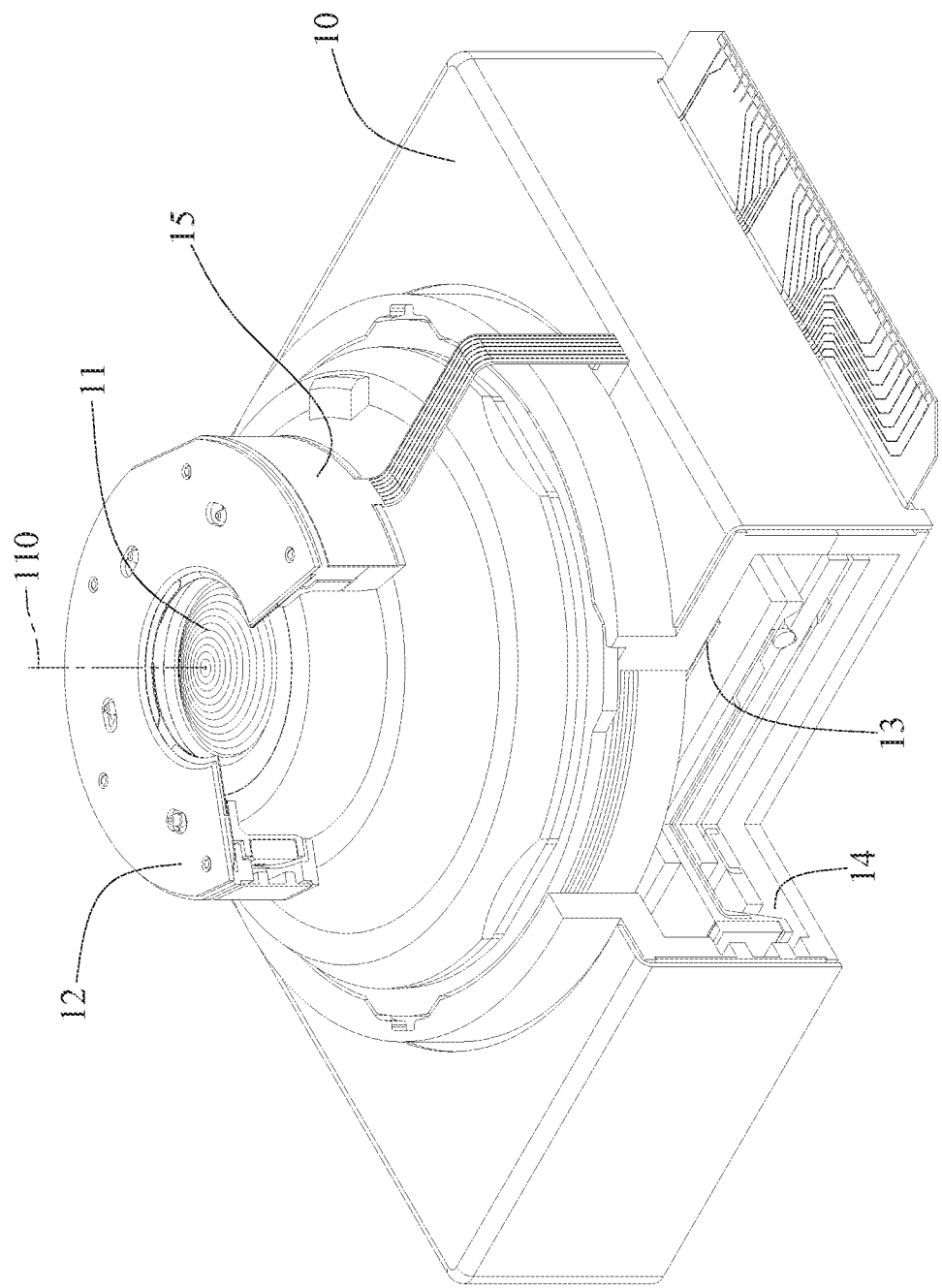
FIG. 2 is a perspective view of the camera module in FIG. 1 that has been partially sectioned.
Figure 3:
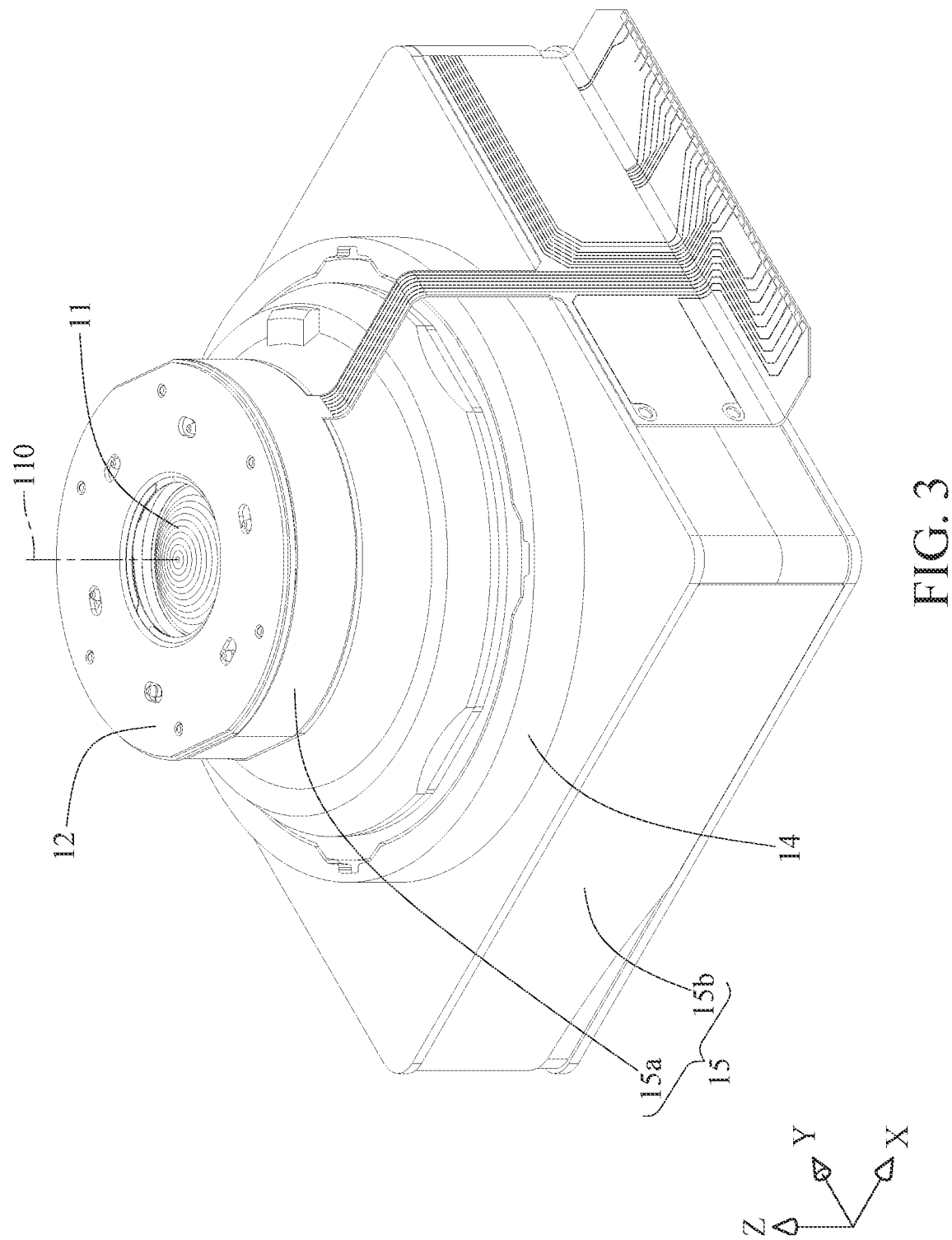
FIG. 3 is a perspective view of the camera module in FIG. 1 in which a casing has been removed.
Figure 4:
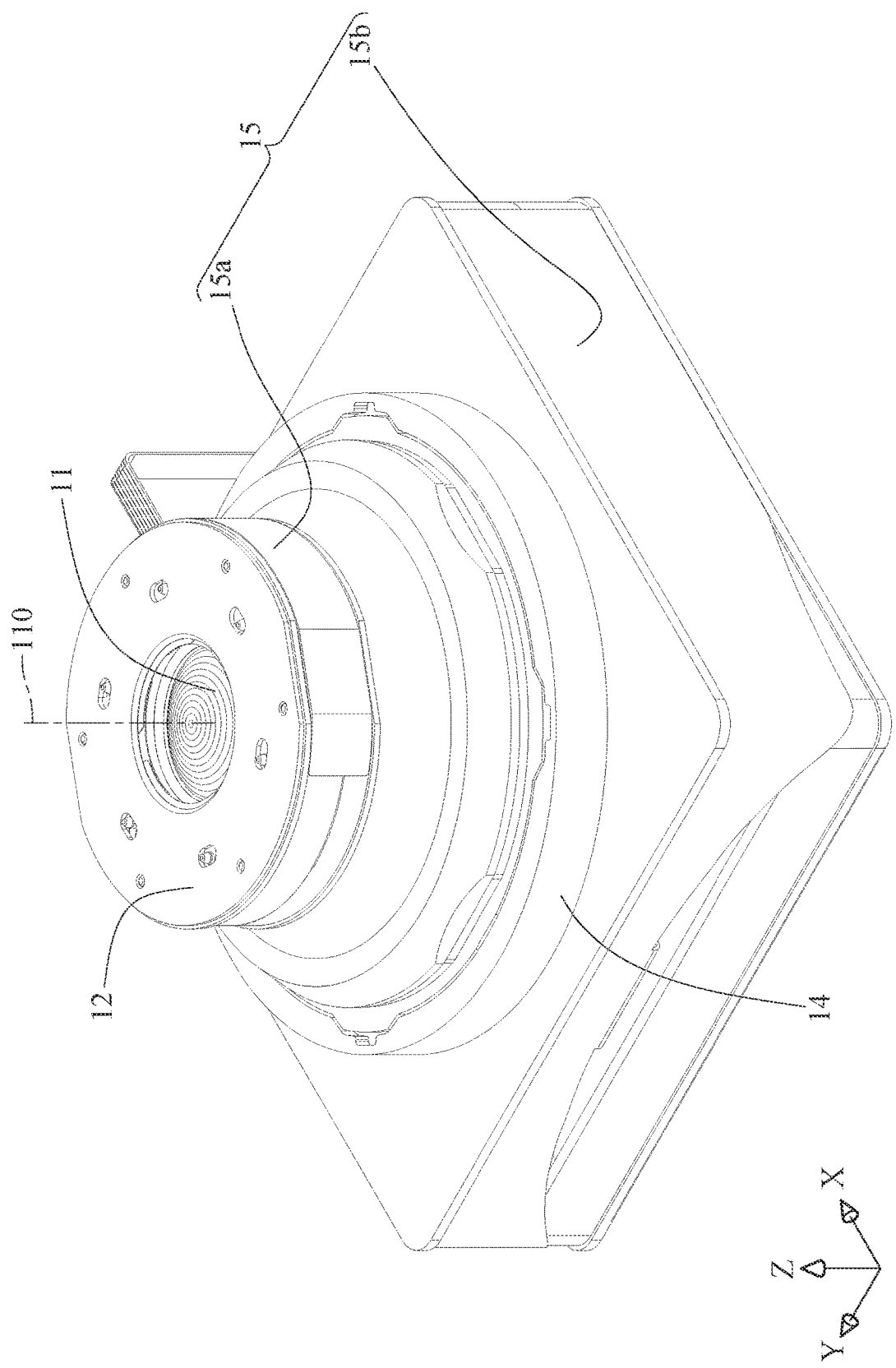
FIG. 4 is another perspective view of the camera module in FIG. 3 in which the casing has been removed.
Figure 5:
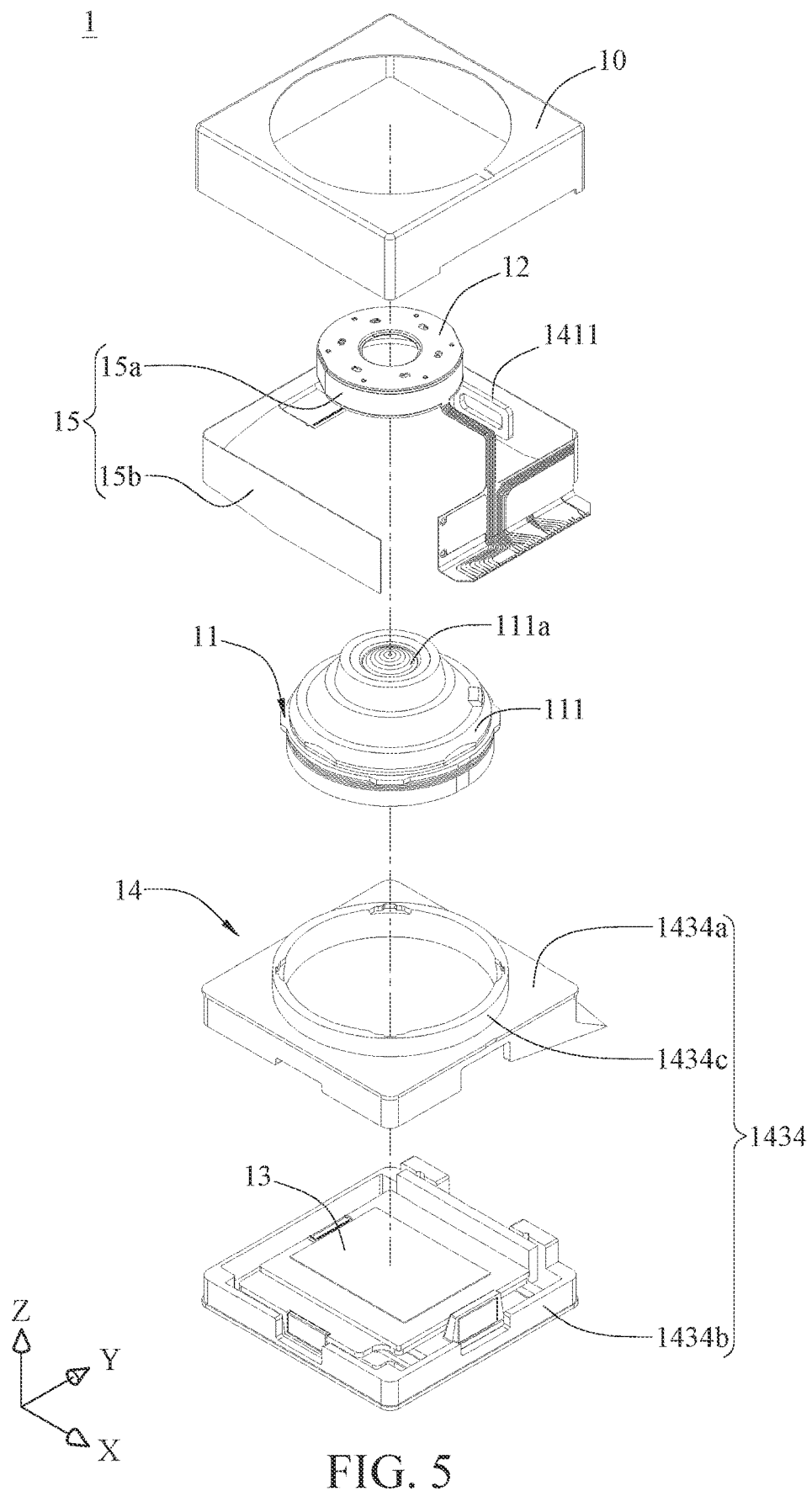
FIG. 5 is an exploded view of the camera module in FIG. 1.
Figure 6:
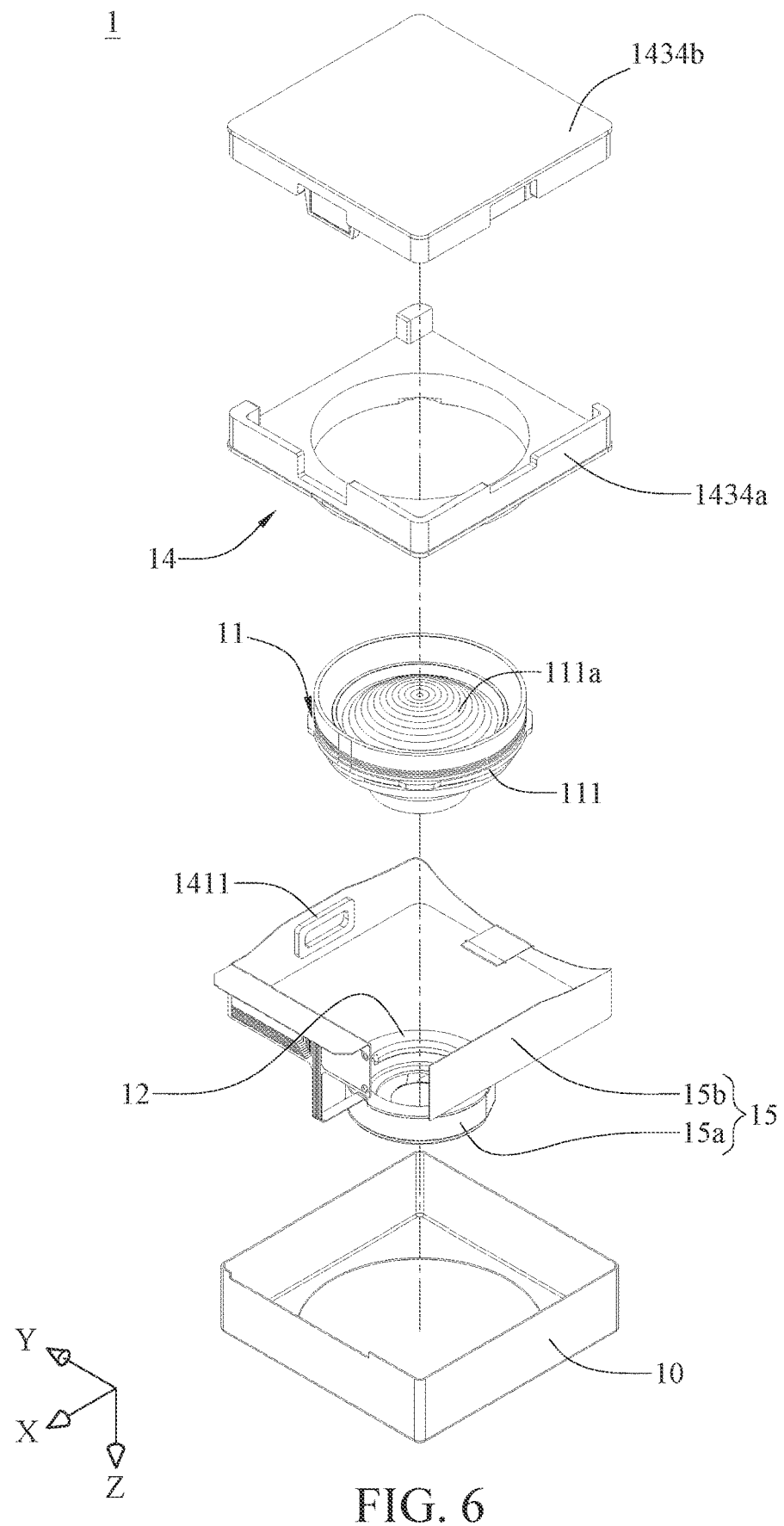
FIG. 6 is another exploded view of the camera module in FIG. 5.
Figure 7:
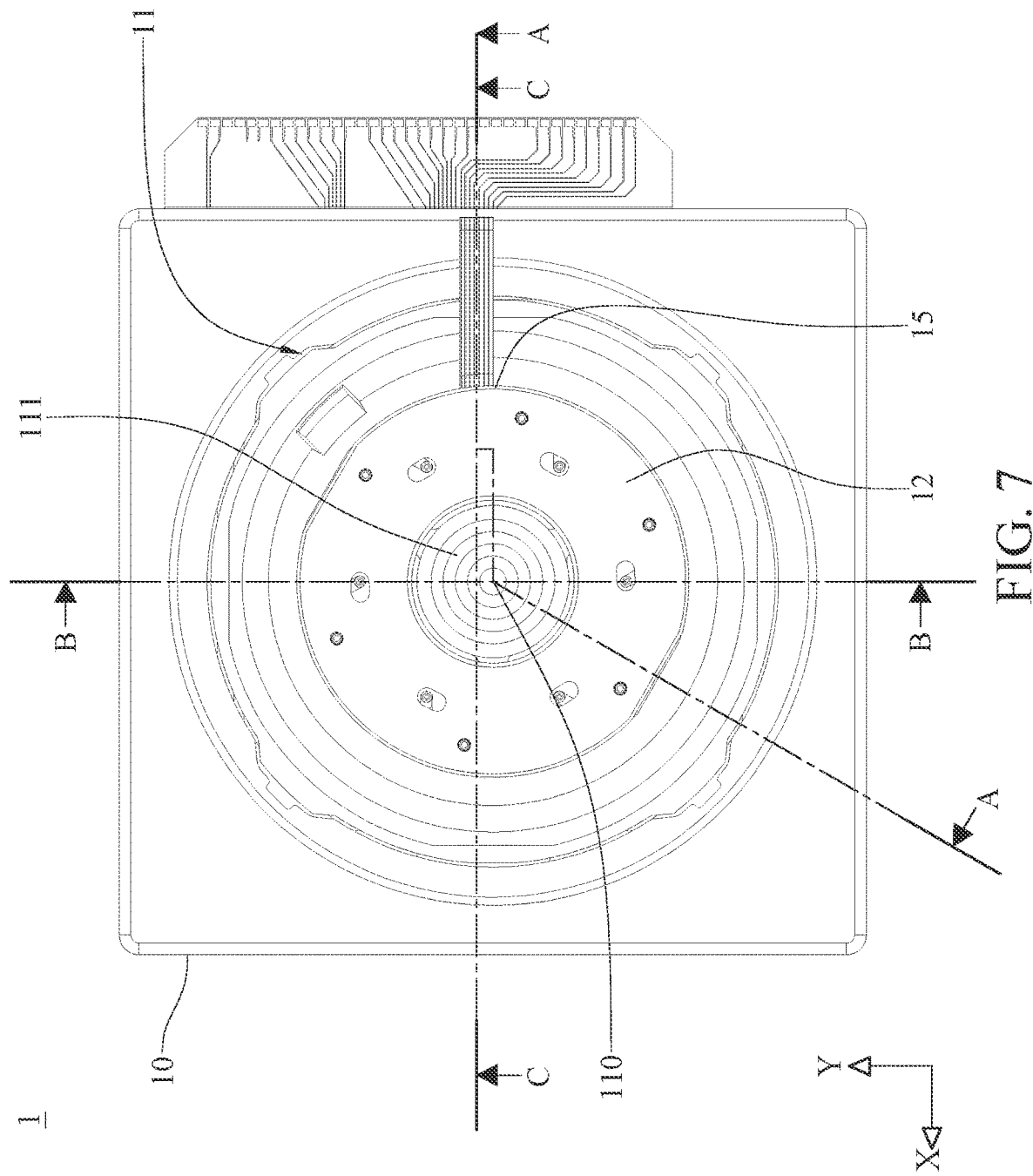
FIG. 7 is a top view of the camera module in FIG. 1.
Figure 8:
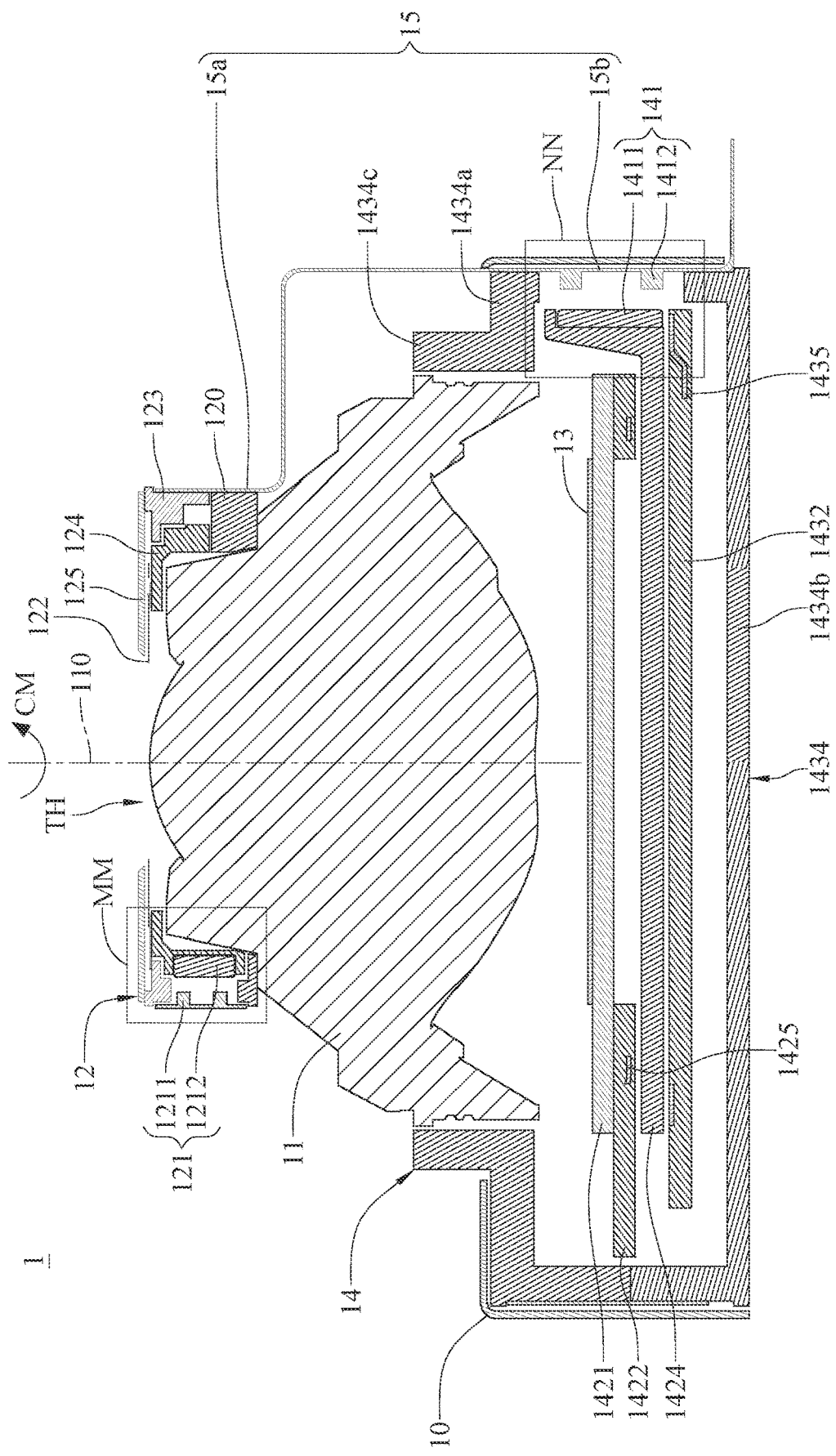
FIG. 8 is a cross-sectional view of the camera module along a line A-A in FIG. 7.
Figure 9:
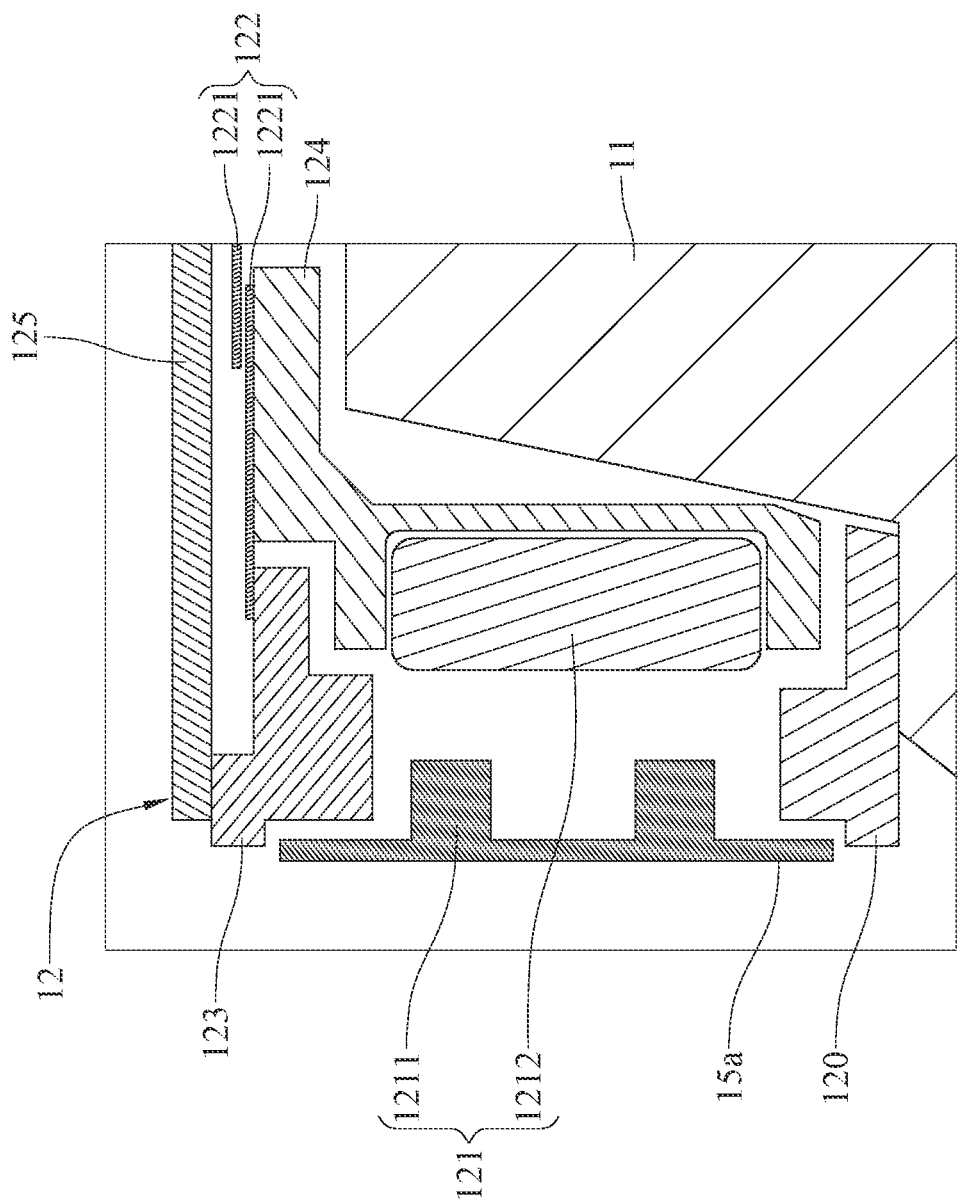
FIG. 9 is an enlarged view of region MM of the camera module in FIG. 8.
Figure 10:
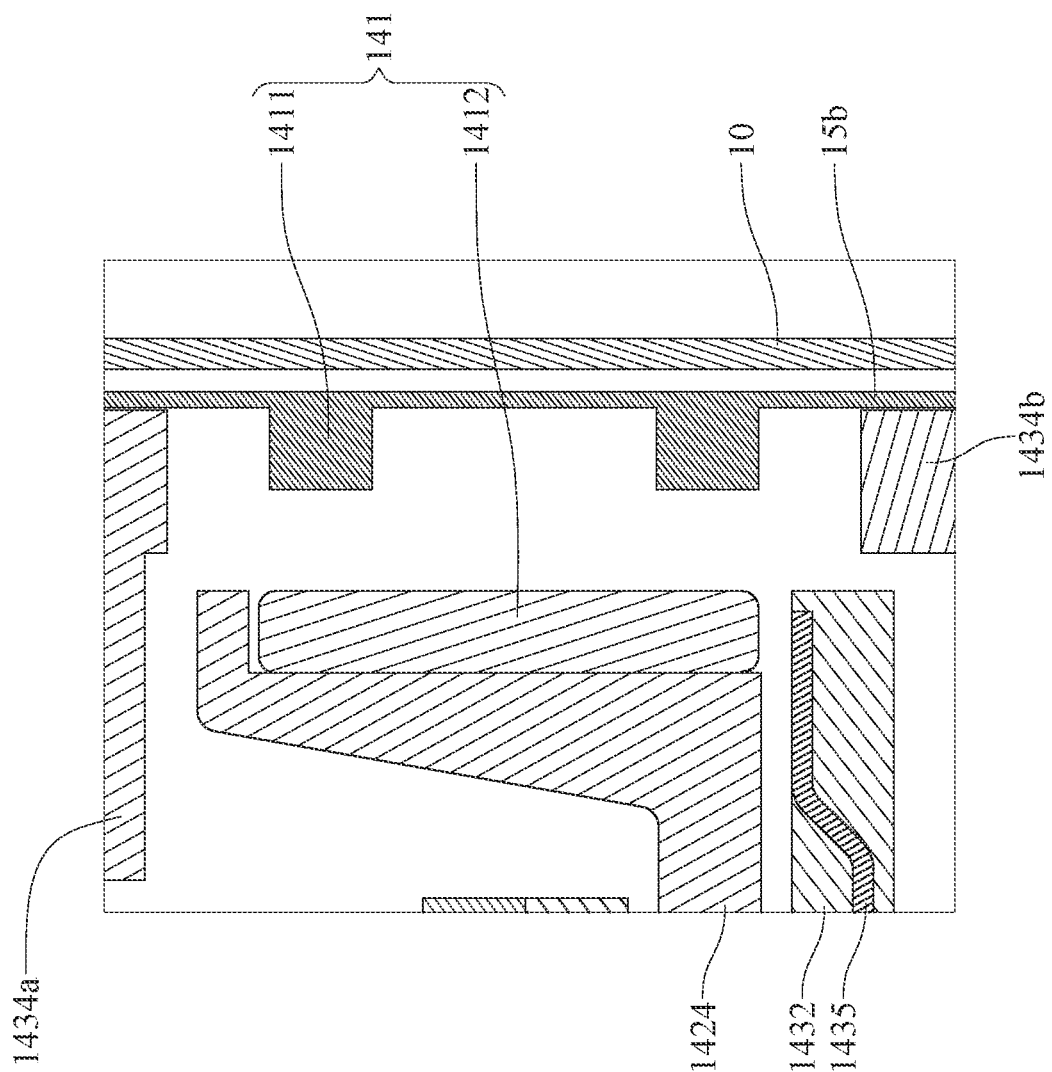
FIG. 10 is an enlarged view of region NN of the camera module in FIG. 8.
Figure 11:
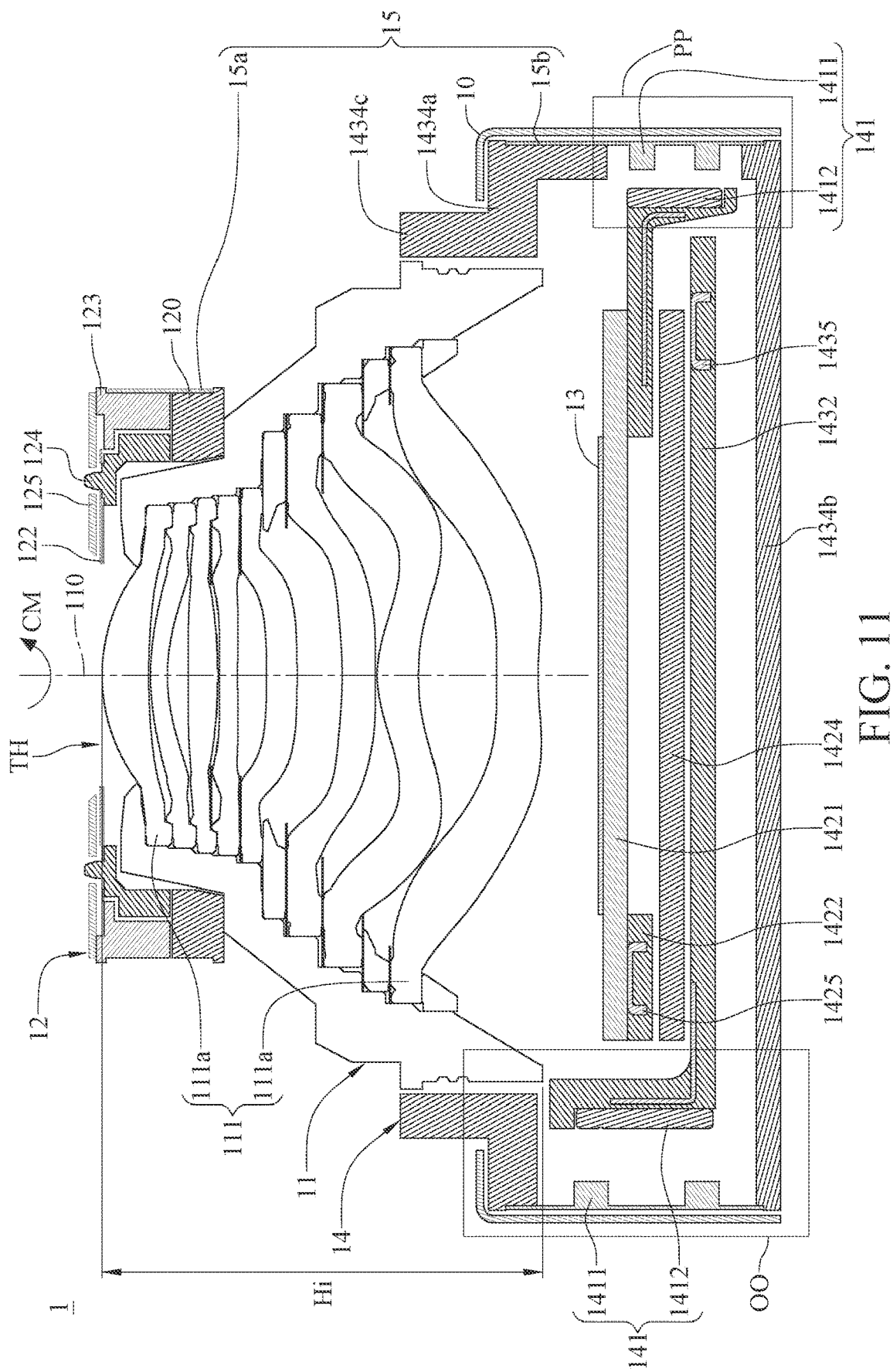
FIG. 11 is a cross-sectional view of the camera module along a line B-B in FIG. 7.
Figure 12:
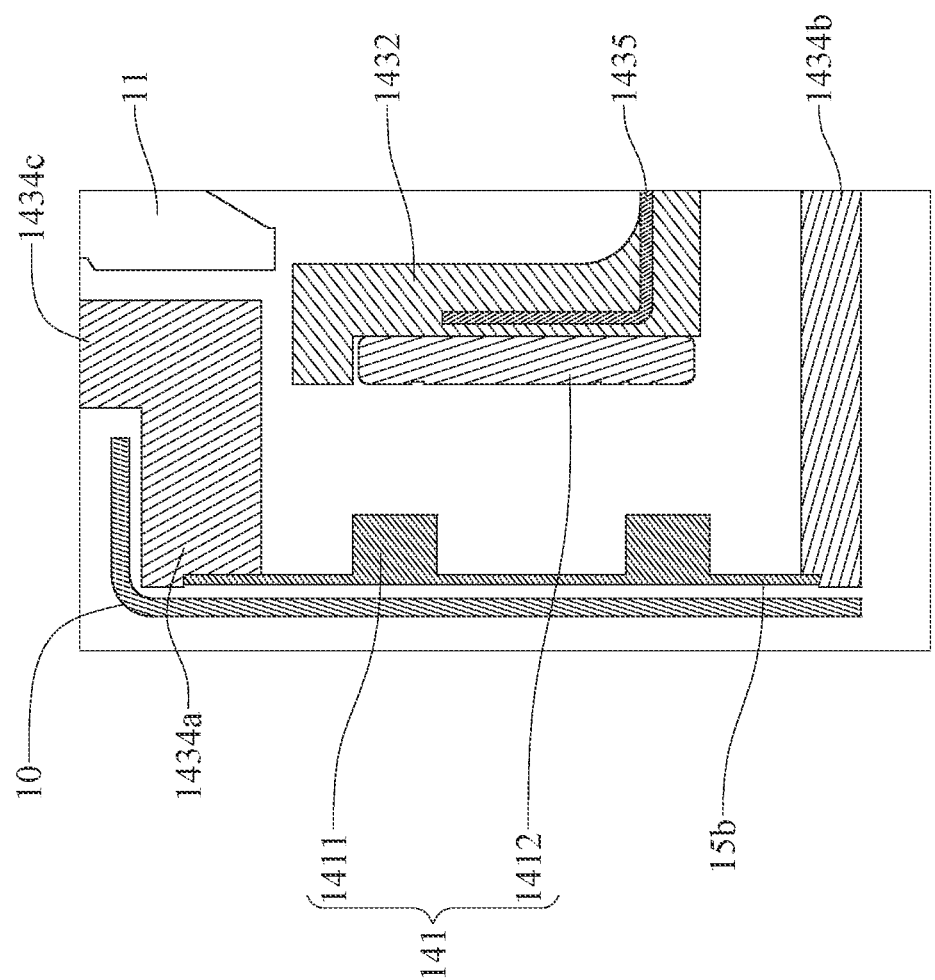
FIG. 12 is an enlarged view of region OO of the camera module in FIG. 11.
Figure 13:
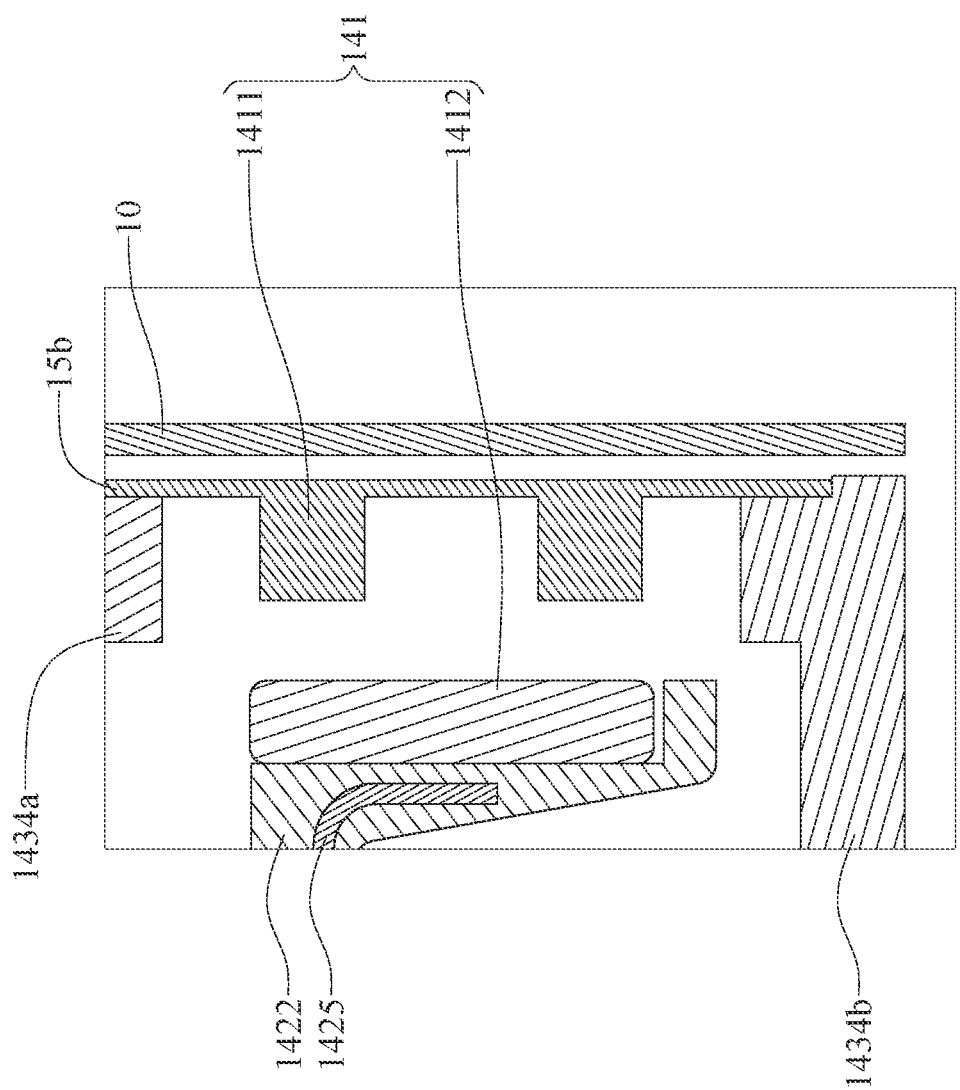
FIG. 13 is an enlarged view of region PP of the camera module in FIG. 11.
Figure 14:
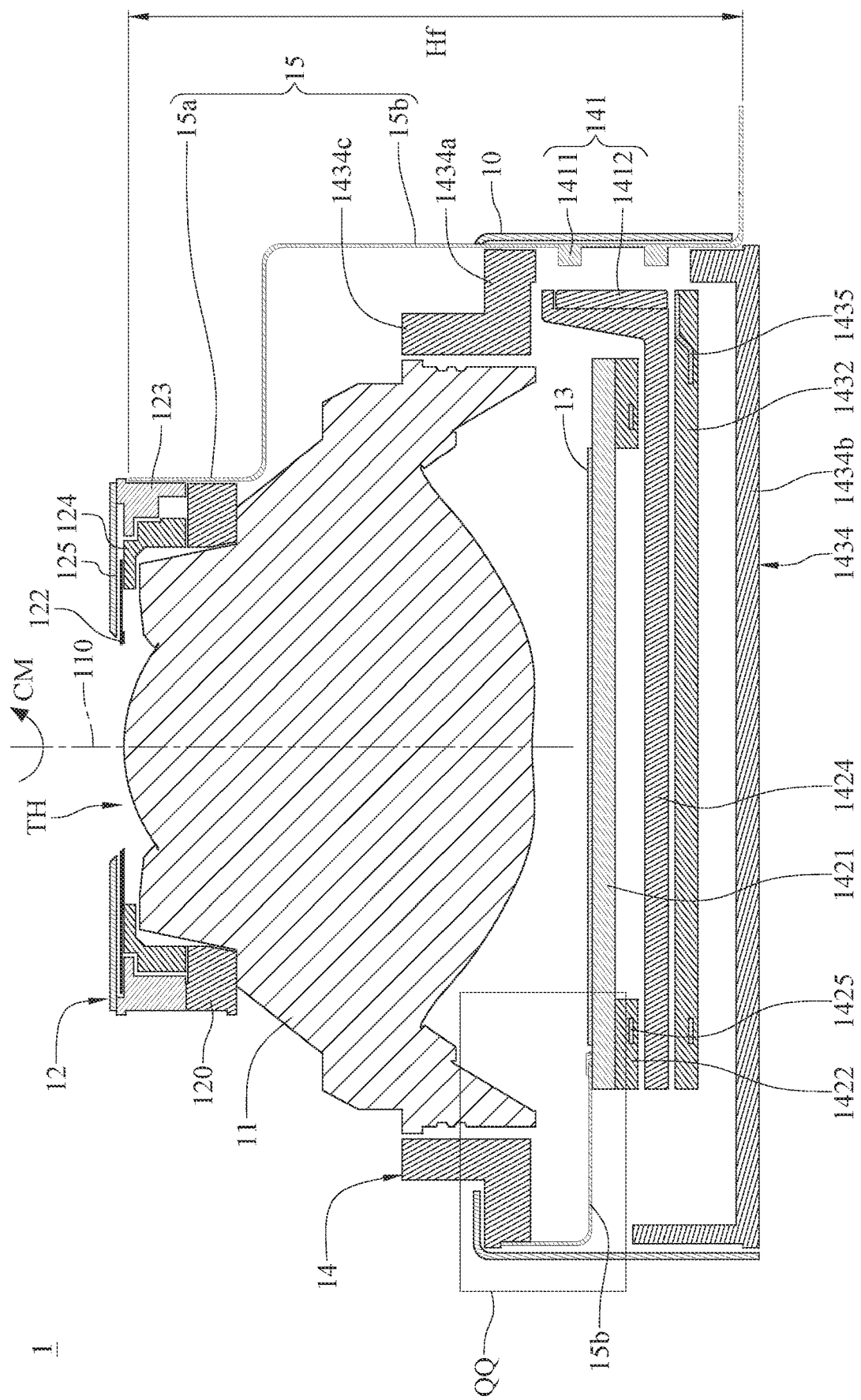
FIG. 14 is a cross-sectional view of the camera module along a line C-C in FIG. 7.
Figure 15:
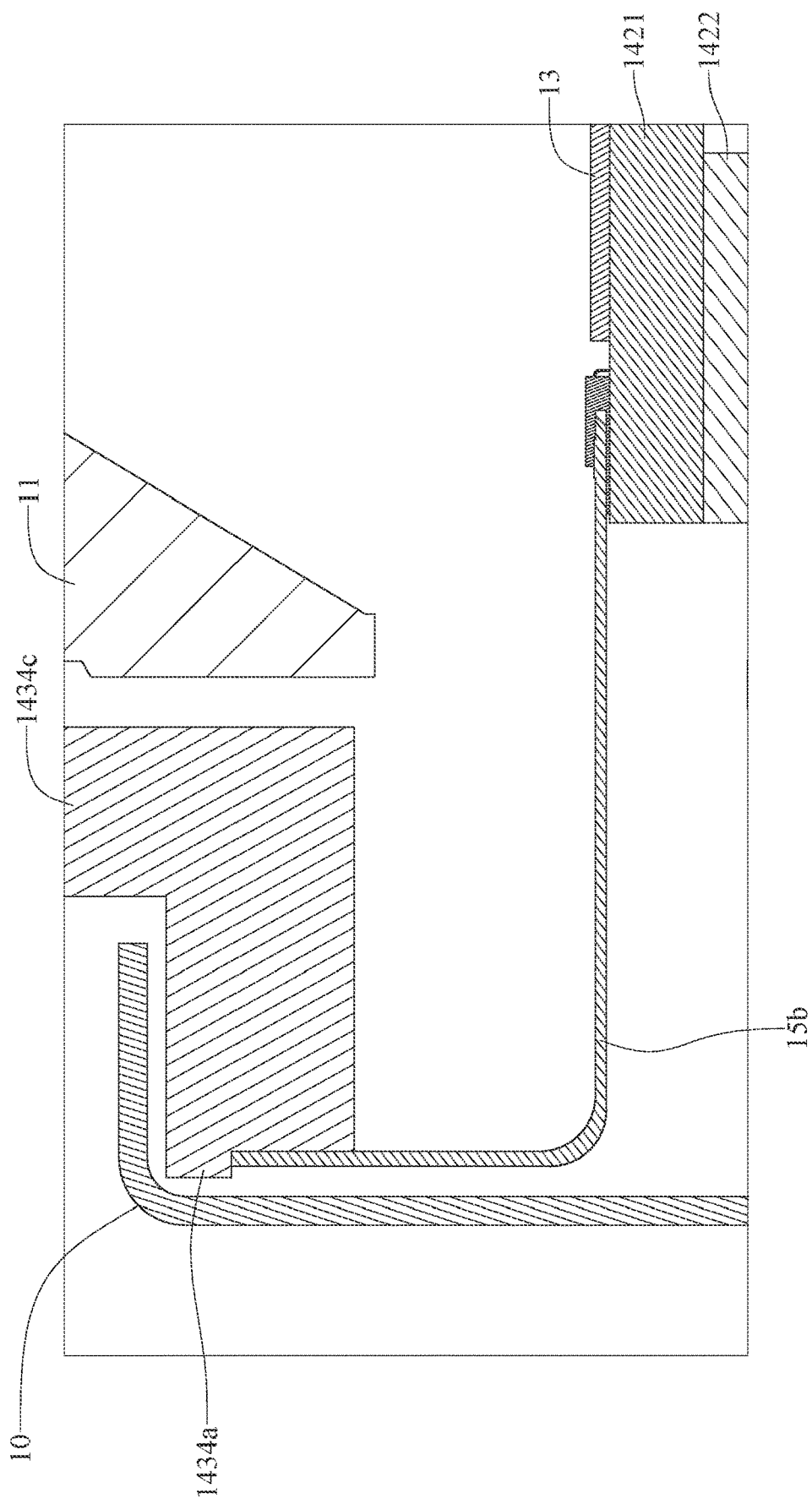
FIG. 15 is an enlarged view of region QQ of the camera module in FIG. 14.

Please refer to FIG. 1 to FIG. 15, where FIG. 1 is a perspective view of the camera module according to the 1st embodiment of the present disclosure, FIG. 2 is a perspective view of the camera module in FIG. 1 that has been partially sectioned, FIG. 3 is a perspective view of the camera module in FIG. 1 in which a casing has been removed, FIG. 4 is another perspective view of the camera module in FIG. 3 in which the casing has been removed, FIG. 5 is an exploded view of the camera module in FIG. 1, FIG. 6 is another exploded view of the camera module in FIG. 5, FIG. 7 is a top view of the camera module in FIG. 1, FIG. 8 is a cross-sectional view of the camera module along a line A-A in FIG. 7, FIG. 9 is an enlarged view of region MM of the camera module in FIG. 8, FIG. 10 is an enlarged view of region NN of the camera module in FIG. 8, FIG. 11 is a cross-sectional view of the camera module along a line B-B in FIG. 7, FIG. 12 is an enlarged view of region OO of the camera module in FIG. 11, FIG. 13 is an enlarged view of region PP of the camera module in FIG. 11, FIG. 14 is a cross-sectional view of the camera module along a line C-C in FIG. 7, and FIG. 15 is an enlarged view of region QQ of the camera module in FIG. 14.

A camera module 1 provided in this embodiment includes a casing 10, an imaging lens 11, a variable through hole mechanism 12, an image sensor 13, an image sensor actuating module 14 and a flexible printed circuit 15.

The imaging lens 11 is at least partially disposed in the casing 10. The imaging lens 11 has an optical axis 110. The imaging lens 11 includes an optical lens assembly 111. The optical axis 110 passes through the optical lens assembly 111. The optical lens assembly 111 includes a plurality of plastic lens elements 111a. Please be noted that some cross-sectional views in the present disclosure are formed along connected line segments in perspective views (for example, the line A-A in FIG. 7 is a polyline composed of connected line segments), so that some parts inside the imaging lens 11 shown in these cross-sectional views may be presented with slightly distortion with respect to its actual dimensions. Therefore, in order to prevent obscuring the features of the present disclosure, the parts inside the imaging lens 11 are only shown by hatch lines.

Figure 16:
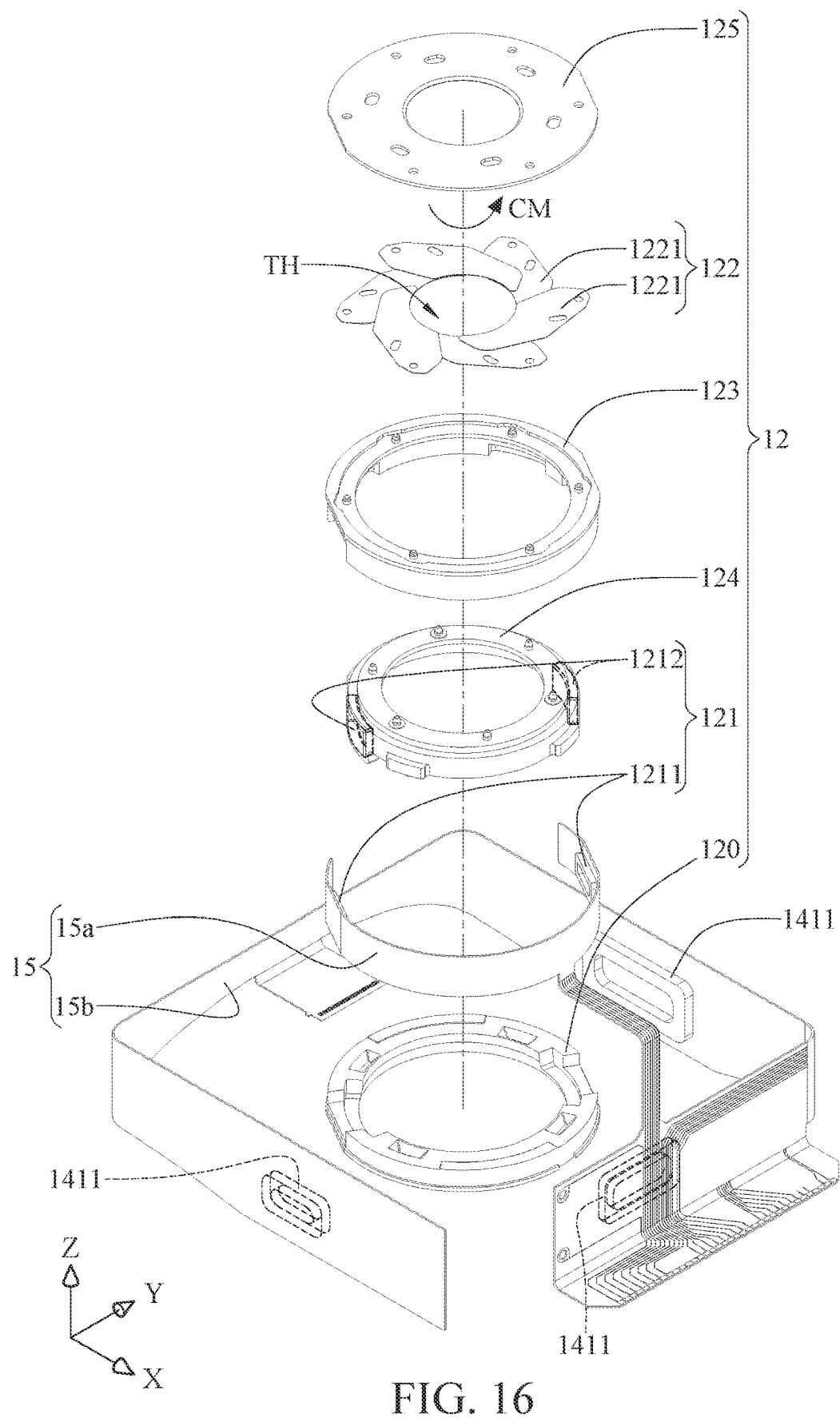
FIG. 16 is an exploded view of a variable through hole mechanism and a flexible printed circuit of the camera module in FIG. 1.
Figure 17:
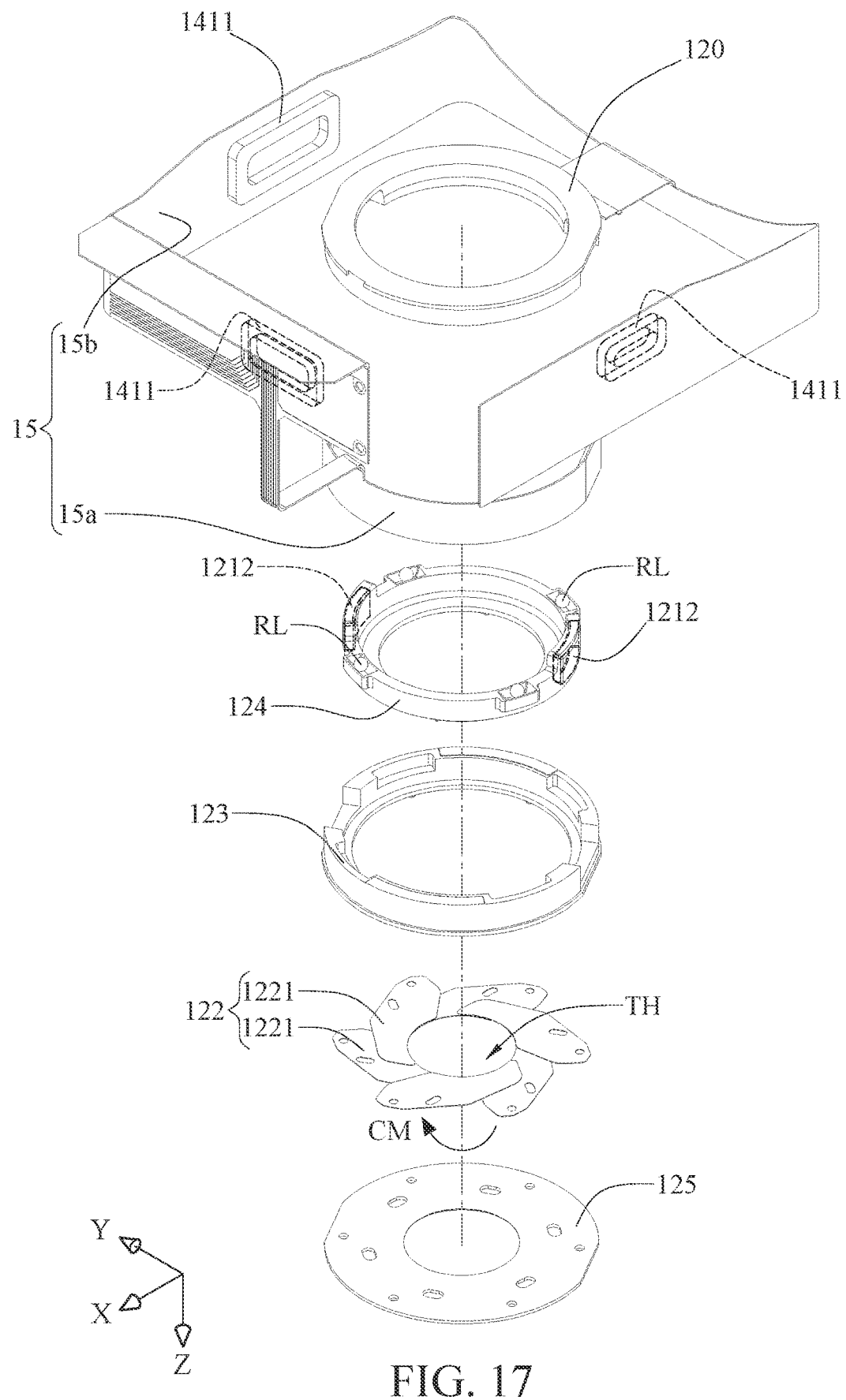
FIG. 17 is another exploded view of the variable through hole mechanism and the flexible printed circuit of the camera module in FIG. 16.

Please further refer to FIG. 16 and FIG. 17, where FIG. 16 is an exploded view of a variable through hole mechanism and a flexible printed circuit of the camera module in FIG. 1, and FIG. 17 is another exploded view of the variable through hole mechanism and the flexible printed circuit of the camera module in FIG. 16.

The variable through hole mechanism 12 is disposed corresponding to the imaging lens 11. The variable through hole mechanism 12 is able to adjust an amount of light into the imaging lens 11. It can be also considered that the variable through hole mechanism 12 provides a variable aperture value, such that the camera module 1 can efficiently correspond to variable photographing scenarios with different requirements of light incident amounts.

The variable through hole mechanism 12 includes a substrate 120, a first driving mechanism 121, a light-blocking assembly 122, a fixed element 123, a movable element 124 and a cover 125. The first driving mechanism 121 is located at a side of the substrate 120. The first driving mechanism 121 includes two first coils 1211 and two first magnets 1212. The first coils 1211 are disposed on the flexible printed circuit 15. The first magnets 1212 are disposed opposite to the first coils 1211, as shown in FIG. 9. The light-blocking assembly 122 includes a plurality of light-blocking sheets 1221 that are stacked with each other along a circumferential direction CM about the optical axis 110 to form a light-passable hole TH with a variable aperture. The fixed element 123 is disposed on the substrate 120 and connected to the light-blocking assembly 122. The movable element 124 is rotatably disposed on the substrate 120 via rollers RL and connected to the light-blocking assembly 122, and the first magnet 1212 is disposed on the movable element 124 to be disposed opposite to the first coils 1211. The cover 125 is disposed at a side of the light-blocking assembly 122 away from the fixed element 123 and the movable element 124. The first driving mechanism 121 is able to rotate the movable element 124 along the circumferential direction CM with respect to the fixed element 123 so as to drive the light-blocking assembly 122 to adjust the variable aperture of the light-passable hole TH.

Figure 18:
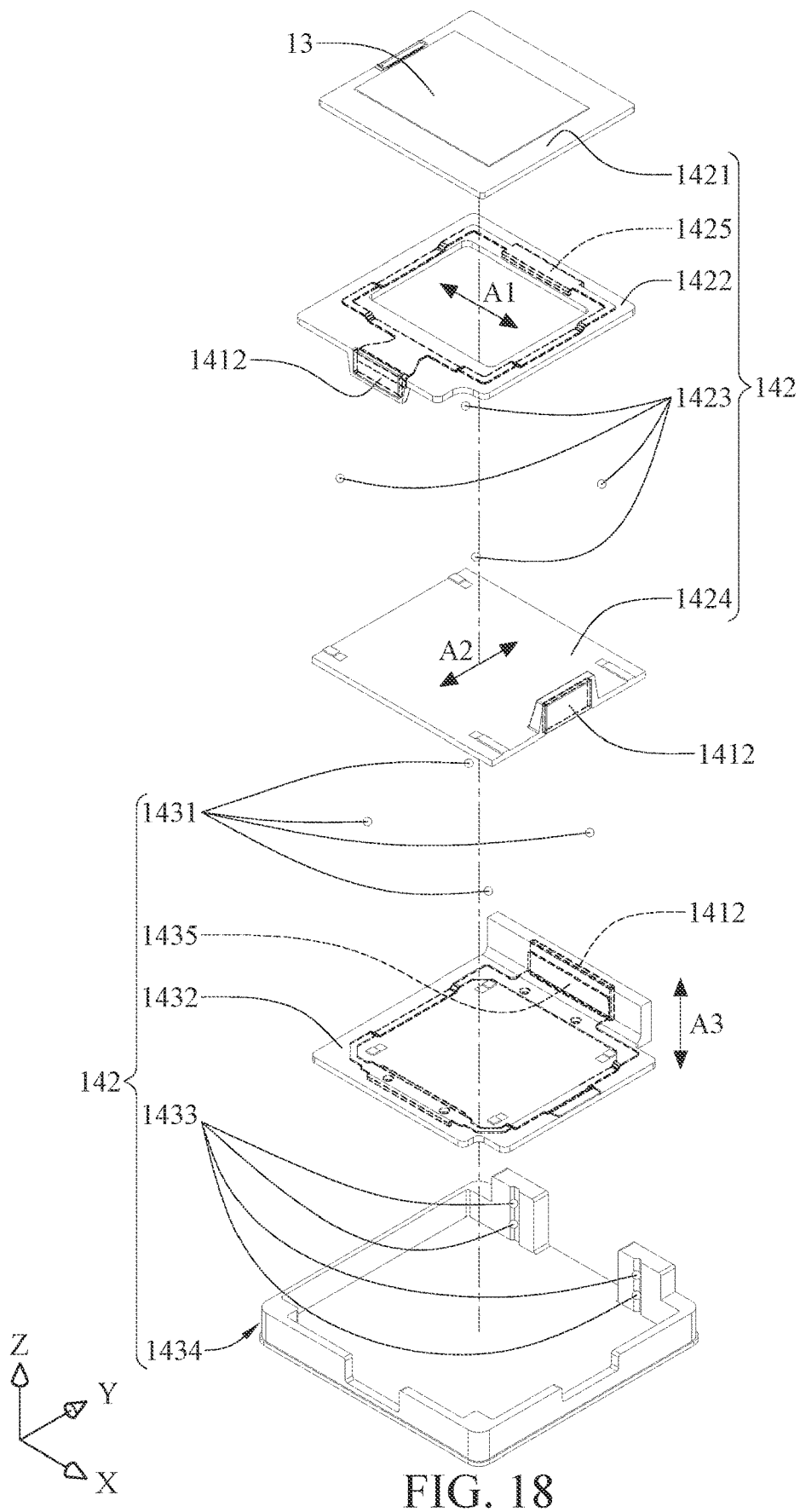
FIG. 18 is an exploded view of an image sensor actuating module of the camera module in FIG. 1.
Figure 19:
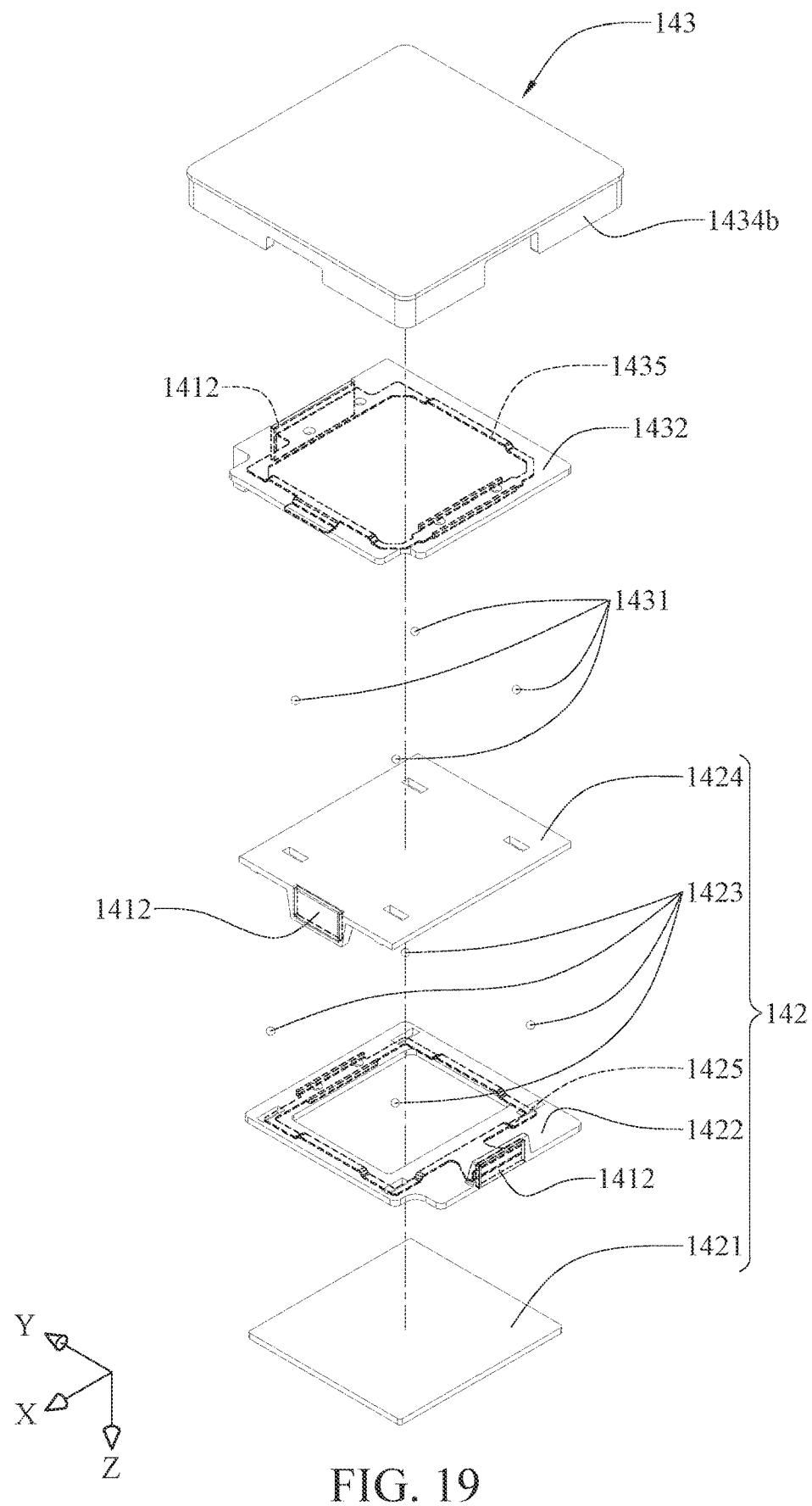
FIG. 19 is another explode view of the image sensor actuating module of the camera module in FIG. 18.

Please further refer to FIG. 18 and FIG. 19, where FIG. 18 is an exploded view of an image sensor actuating module of the camera module in FIG. 1, and FIG. 19 is another explode view of the image sensor actuating module of the camera module in FIG. 18.

The image sensor 13 is disposed inside the casing 10. The image sensor 13 is disposed on the optical axis 110. The image sensor 13 is able to convert imaging light passing through the imaging lens 11 into an image signal.

The image sensor actuating module 14 is able to move the image sensor 13 along a direction parallel to or perpendicular to the optical axis 110. In this embodiment, if the optical axis 110 is the Z-axis, the direction perpendicular to the optical axis 110 is any direction on an X-Y plane defined by the X-axis and the Y-axis, and the image sensor 13 can be moved along a direction parallel to the Z-axis or any direction on the X-Y plane.

The image sensor actuating module 14 includes a second driving mechanism 141, an image stabilization module 142 and an image focus module 143. The second driving mechanism 141 includes three second coils 1411 and three second magnets 1412. The second coils 1411 are disposed at three sides of the flexible printed circuit 15, as shown in FIG. 16 and FIG. 17. The second magnets 1412 are disposed opposite to the second coils 1411, as shown in FIG. 10, FIG. 12, and FIG. 13. The image stabilization module 142 and the image focus module 143 are disposed corresponding to each other along the optical axis 110.

The image stabilization module 142 is able to move the image sensor 13 along the direction perpendicular to the optical axis 110. Specifically, the image stabilization module 142 includes an image sensor carrier 1421, a first movable plate 1422, a plurality of first rolling supporters 1423, a second movable plate 1424 and a first ferromagnetic element 1425. The image sensor carrier 1421 carries the image sensor 13, and there is no relative displacement between the image sensor carrier 1421 and the image sensor 13. The first movable plate 1422 is coupled to the image sensor carrier 1421, and one second magnet 1412 is disposed on the first movable plate 1422, such that the second driving mechanism 141 is able to move the first movable plate 1422 along the direction perpendicular to the optical axis 110 with respect to the imaging lens 11 (e.g., the direction A1 denoted in FIG. 18, which is a direction parallel to the X-axis). The first rolling supporters 1423 are rollably disposed on the first movable plate 1422. The second movable plate 1424 is connected to the first movable plate 1422 via the first rolling supporters 1423, and another second magnet 1412 is disposed on the second movable plate 1424, such that the second driving mechanism 141 is able to move the second movable plate 1424 along the direction perpendicular to the optical axis 110 with respect to the first movable plate 1422 (e.g., the direction A2 denoted in FIG. 18, which is a direction parallel to the Y-axis). The first ferromagnetic element 1425 is formed together with the first movable plate 1422 through an insert molding process.

The image focus module 143 is able to move the image sensor 13 along the direction parallel to the optical axis 110. Specifically, the image focus module 143 includes a plurality of second rolling supporters 1431, a base 1432, a plurality of third rolling supporters 1433, a frame 1434 and a second ferromagnetic element 1435. The second rolling supporters 1431 are rollably disposed on the second movable plate 1424. The base 1432 is connected to the second movable plates 1424 via the second rolling supporters 1431, and the other one second magnet 1412 is disposed on the base 1432, such that the second driving mechanism 141 is able to move the base 1432 along the direction parallel to the optical axis 110 with respect to the imaging lens 11 (e.g., the direction A3 denoted in FIG. 18, which is a direction parallel to the Z-axis). The third rolling supporters 1433 are rollably disposed on the base 1432. The frame 1434 is connected to the base 1432 via the third rolling supporters 1433. The second ferromagnetic element 1435 is formed together with the base 1432 through an insert molding process. The second ferromagnetic element 1435 is disposed opposite to the second magnet 1412 on the base 1432.

The frame 1434 is formed by coupling an upper cover 1434a and a lower cover 1434b. The lower cover 1434b is in physical contact with the third rolling supporters 1433. The frame 1434 has a mounting structure 1434c. The mounting structure 1434c is located at the upper cover 1434a. The mounting structure 1434c is able to mount the imaging lens 11, such that there is no relative displacement between the imaging lens 11 and the frame 1434, and the frame 1434 also has no relative displacement inside the camera module 1. Accordingly, the imaging lens 11 can have no relative displacement inside the camera module 1, or it can be considered that the imaging lens 11 can be relatively fixed inside the camera module 1.

Figure 20:
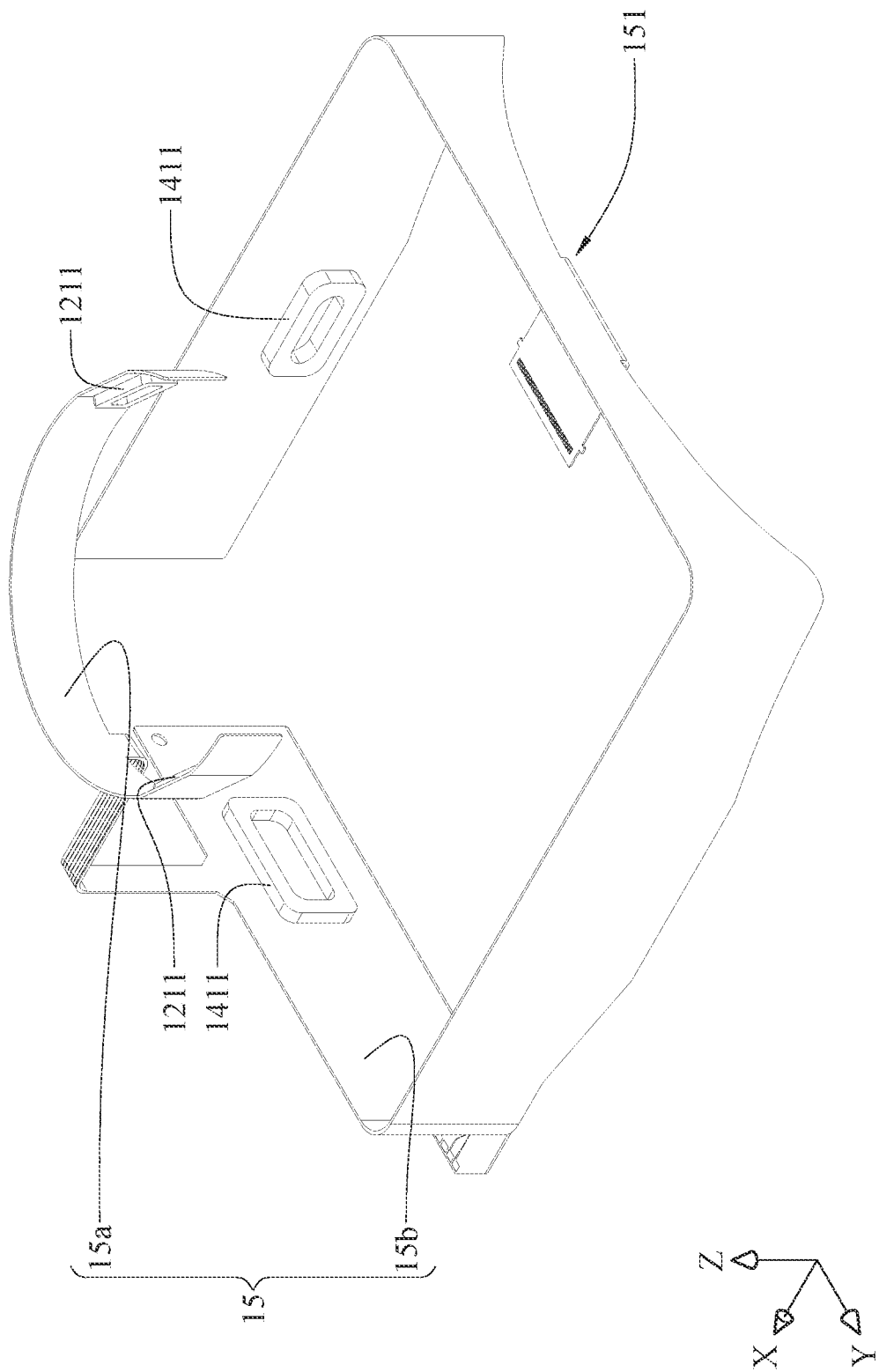
FIG. 20 is a perspective view of the flexible printed circuit, first coils and second coils of the camera module in FIG. 1.
Figure 21:
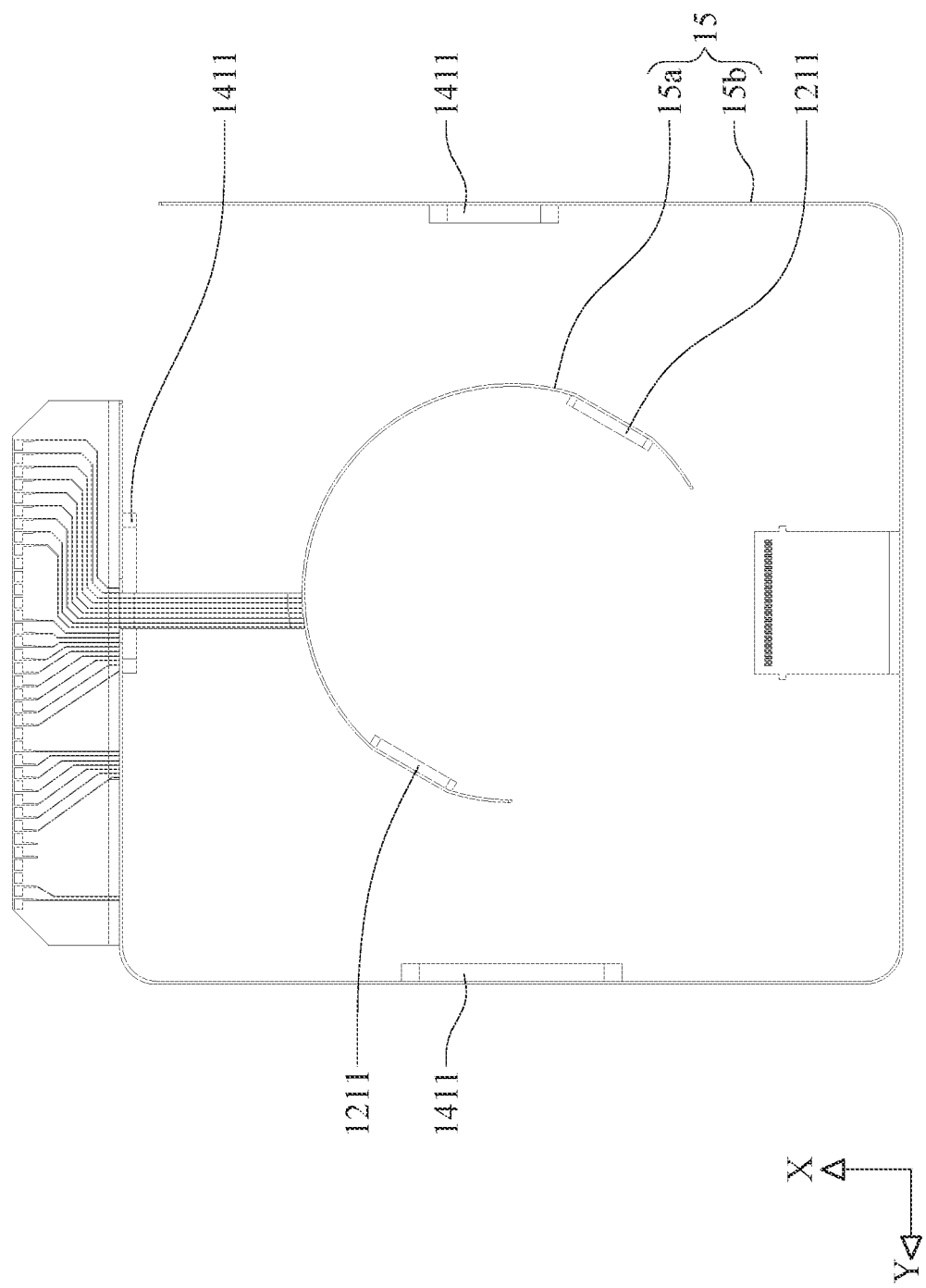
FIG. 21 is a top view of the flexible printed circuit, the first coils and the second coils of the camera module in FIG. 20.
Figure 22:
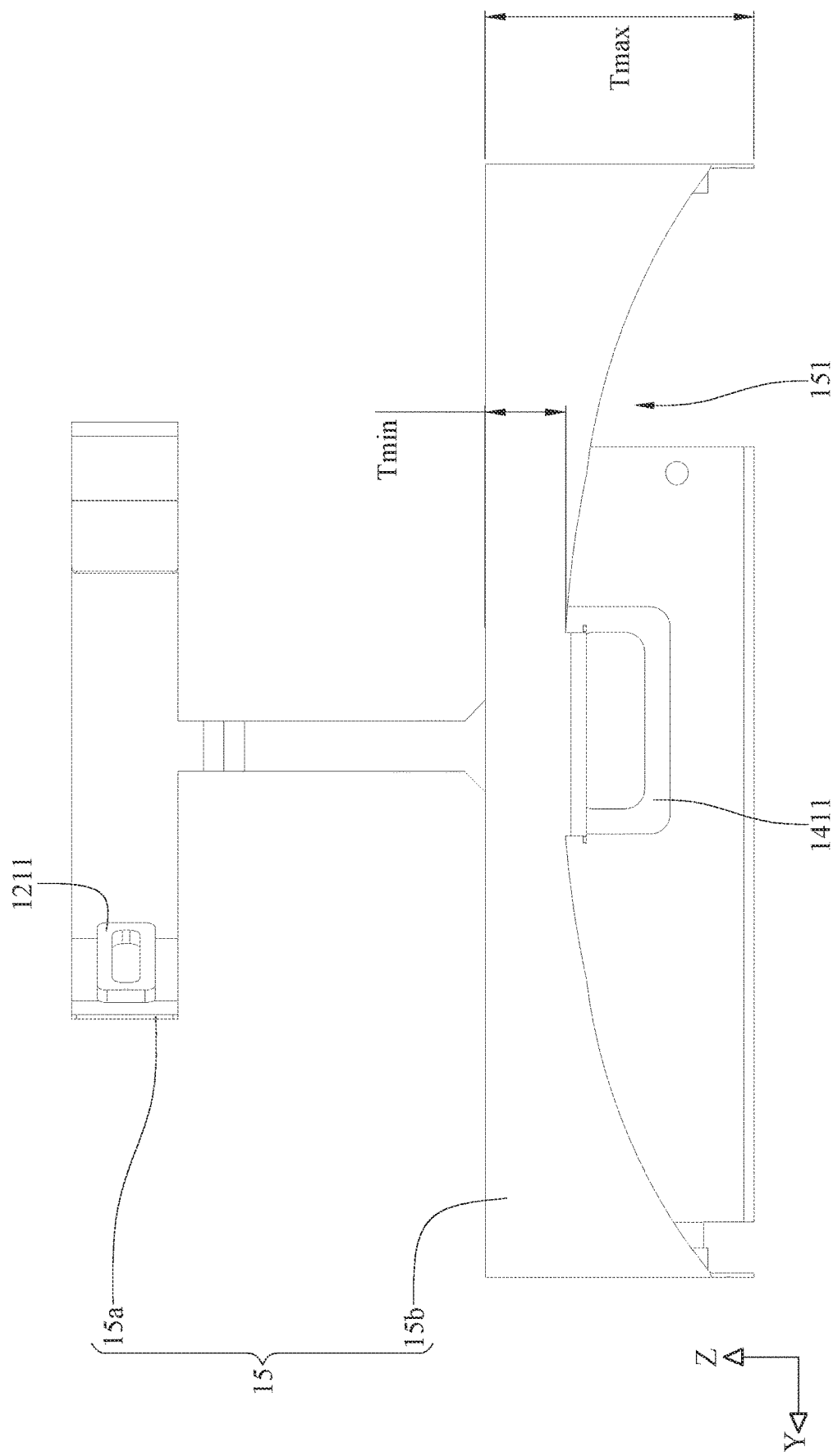
FIG. 22 is a front view of the flexible printed circuit, the first coils and the second coils of the camera module in FIG. 20.
Figure 23:
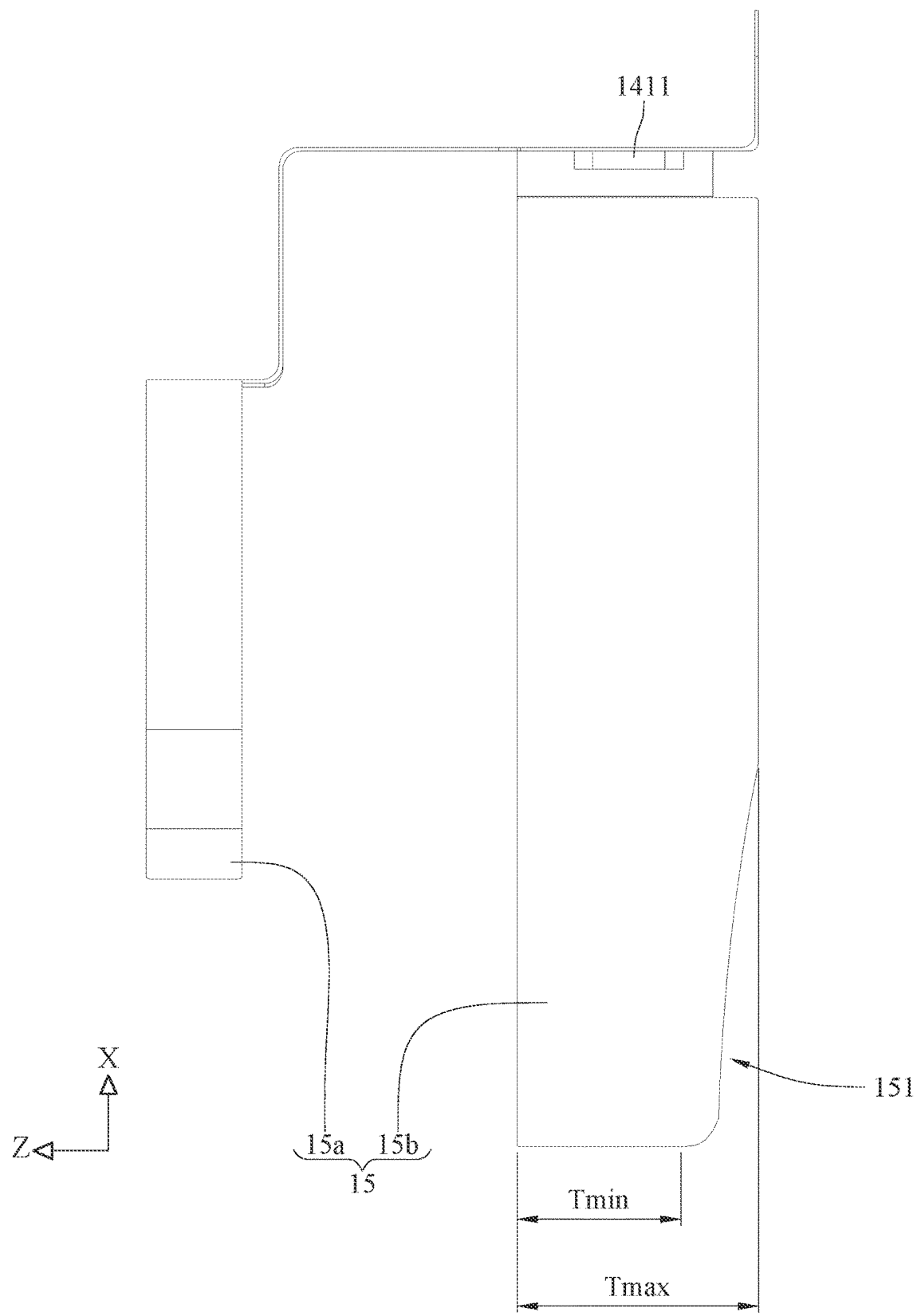
FIG. 23 is a side view of the flexible printed circuit, the first coils and the second coils of the camera module in FIG. 20.

Please further refer to FIG. 20 to FIG. 23, where FIG. 20 is a perspective view of the flexible printed circuit, first coils and second coils of the camera module in FIG. 1, FIG. 21 is a top view of the flexible printed circuit, the first coils and the second coils of the camera module in FIG. 20, FIG. 22 is a front view of the flexible printed circuit, the first coils and the second coils of the camera module in FIG. 20, and FIG. 23 is a side view of the flexible printed circuit, the first coils and the second coils of the camera module in FIG. 20.

The flexible printed circuit 15 is electrically connected to the variable through hole mechanism 12 and the image sensor actuating module 14, and the first coils 1211 of the first driving mechanism 121 and the second coils 1411 of the second driving mechanism 141 are disposed on the flexible printed circuit 15. The flexible printed circuit 15 is electrically connected to the variable through hole mechanism 12, the image sensor 13 and the image sensor actuating module 14. The flexible printed circuit 15 includes a first part 15a and the second part 15b that are connected to each other. The first part 15a is located adjacent to the variable through hole mechanism 12. The second part 15b is located adjacent to the image sensor actuating module 14. The first part 15a is located closer to the optical axis 110 than the second part 15b.

When a height of the flexible printed circuit 15 along the direction parallel to the optical axis 110 is Hf (as shown in FIG. 14), and a height of the imaging lens 11 along the direction parallel to the optical axis 110 is Hi (as shown in FIG. 11), the following conditions are satisfied: Hf=13.44 [mm]; Hi=9.04 [mm]; and Hf/Hi=1.49.

The flexible printed circuit 15 has a tapered part 151. The tapered part 151 tapers off along the direction parallel to the optical axis 110, as shown in FIG. 22 and FIG. 23. When a maximum thickness of the tapered part 151 along the direction parallel to the optical axis 110 is Tmax, and a minimum thickness of the tapered part 151 along the direction parallel to the optical axis 110 is Tmin, the following conditions are satisfied: Tmax=5.3 [mm]; Tmin=1.59 [mm] and 3.6 [mm]; and Tmax/Tmin=3.33 and 1.47.

2nd Embodiment

Figure 24:
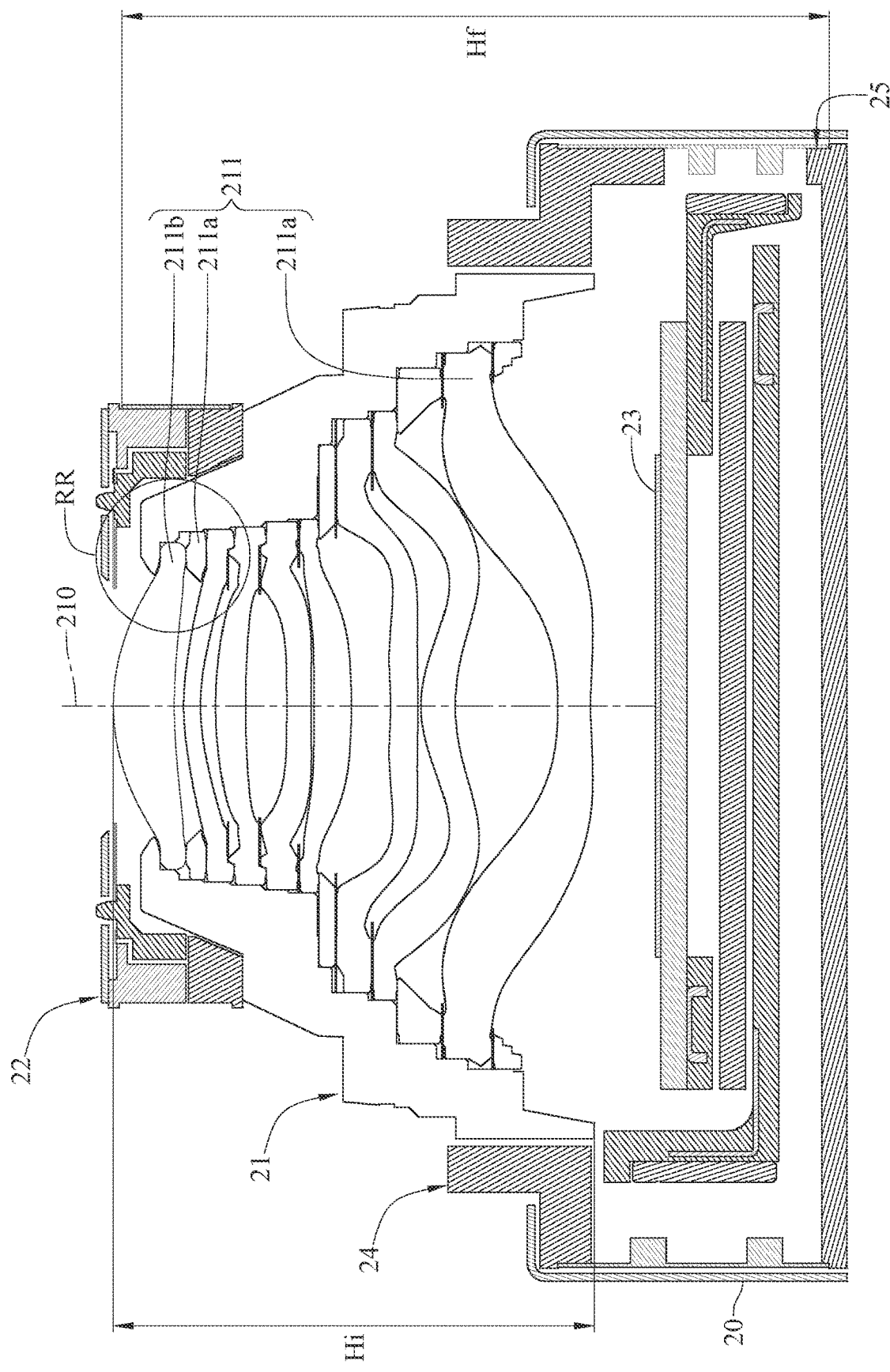
FIG. 24 is a cross-sectional view of a camera module according to the 2nd embodiment of the present disclosure.
Figure 25:
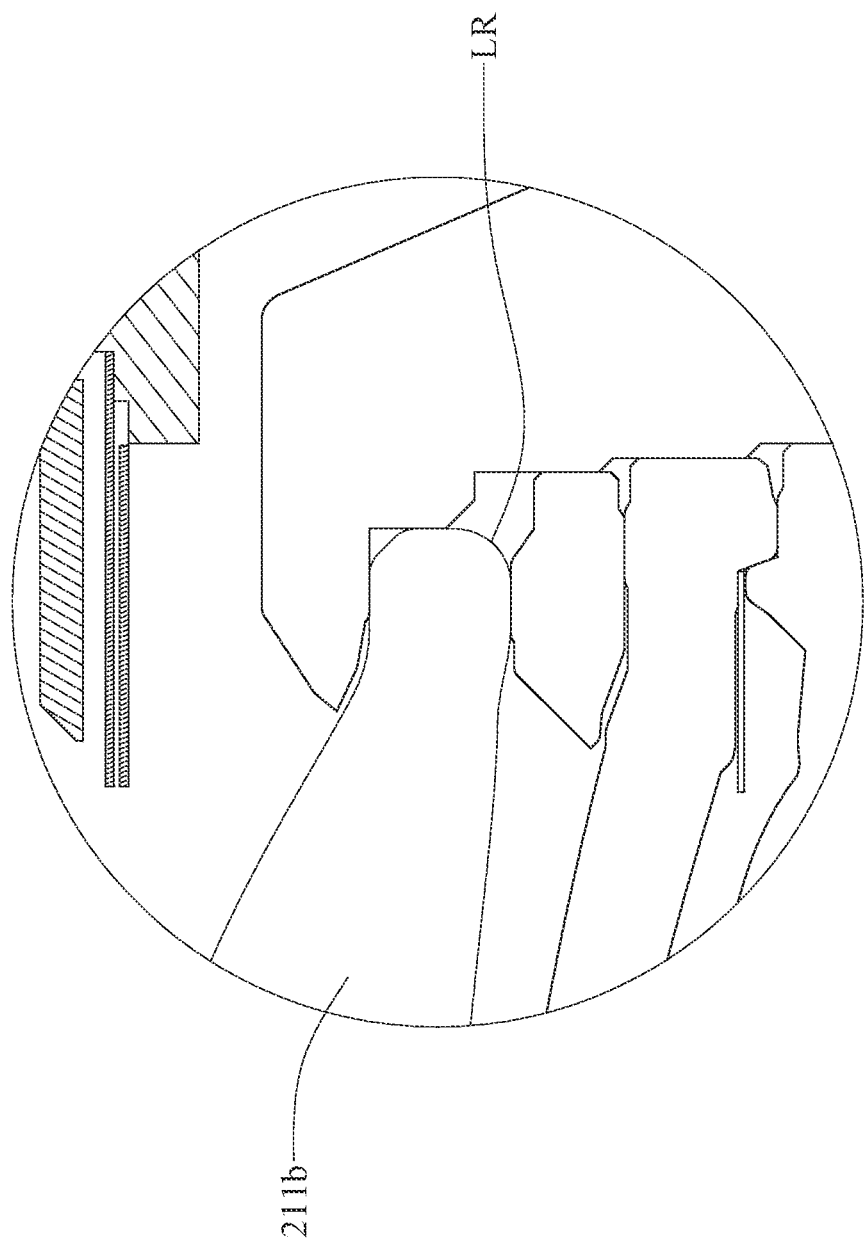
FIG. 25 is an enlarged view of region RR of the camera module in FIG. 24.

Please refer to FIG. 24 to FIG. 25, where FIG. 24 is a cross-sectional view of a camera module according to the 2nd embodiment of the present disclosure, and FIG. 25 is an enlarged view of region RR of the camera module in FIG. 24. Please be noted that the present embodiment is similar to the first embodiment. Therefore, only differences between the present embodiment and the first embodiment, as well as necessary descriptions, will be illustrated hereinafter.

A camera module 2 provided in this embodiment includes a casing 20, an imaging lens 21, a variable through hole mechanism 22, an image sensor 23, an image sensor actuating module 24 and a flexible printed circuit 25.

The imaging lens 21 is at least partially disposed in the casing 20. The imaging lens 21 has an optical axis 210. The imaging lens 21 includes an optical lens assembly 211. The optical axis 210 passes through the optical lens assembly 211. The optical lens assembly 211 includes seven plastic lens elements 211a and one glass lens element 211b that is located at an object side of the plastic lens elements 211a. When a number of the plastic lens elements 211a is Np, and a number of the glass lens element is Ng, the following conditions are satisfied: Np=7; Ng=1; and Ng<Np.

The glass lens element 211b is a molded glass lens element. The glass lens element 211b is provided without gate trace at an outer diameter surface thereof and has a rounded appearance at an edge line thereof, as the rounded corner (fillet) LR of the glass lens element 211b shown in FIG. 25.

The variable through hole mechanism 22 is disposed corresponding to the imaging lens 21. The variable through hole mechanism 22 is able to adjust an amount of light into the imaging lens 21. It can be also considered that the variable through hole mechanism 22 provides a variable aperture value, such that the camera module 2 can efficiently correspond to variable photographing scenarios with different requirements of light incident amounts.

The image sensor 23 is disposed inside the casing 20. The image sensor 23 is disposed on the optical axis 210. The image sensor 23 is able to convert imaging light passing through the imaging lens 21 into an image signal.

The image sensor actuating module 24 is able to move the image sensor 23 along a direction parallel to or perpendicular to the optical axis 210.

The flexible printed circuit 25 is electrically connected to the variable through hole mechanism 22 and the image sensor actuating module 24. The flexible printed circuit 25 is electrically connected to the variable through hole mechanism 22, the image sensor 23 and the image sensor actuating module 24.

When a height of the flexible printed circuit 25 along the direction parallel to the optical axis 210 is Hf, and a height of the imaging lens 21 along the direction parallel to the optical axis 210 is Hi, the following conditions are satisfied: Hf=13.81 [mm]; Hi=9.39 [mm]; and Hf/Hi=1.47.

3rd Embodiment

Figure 26:
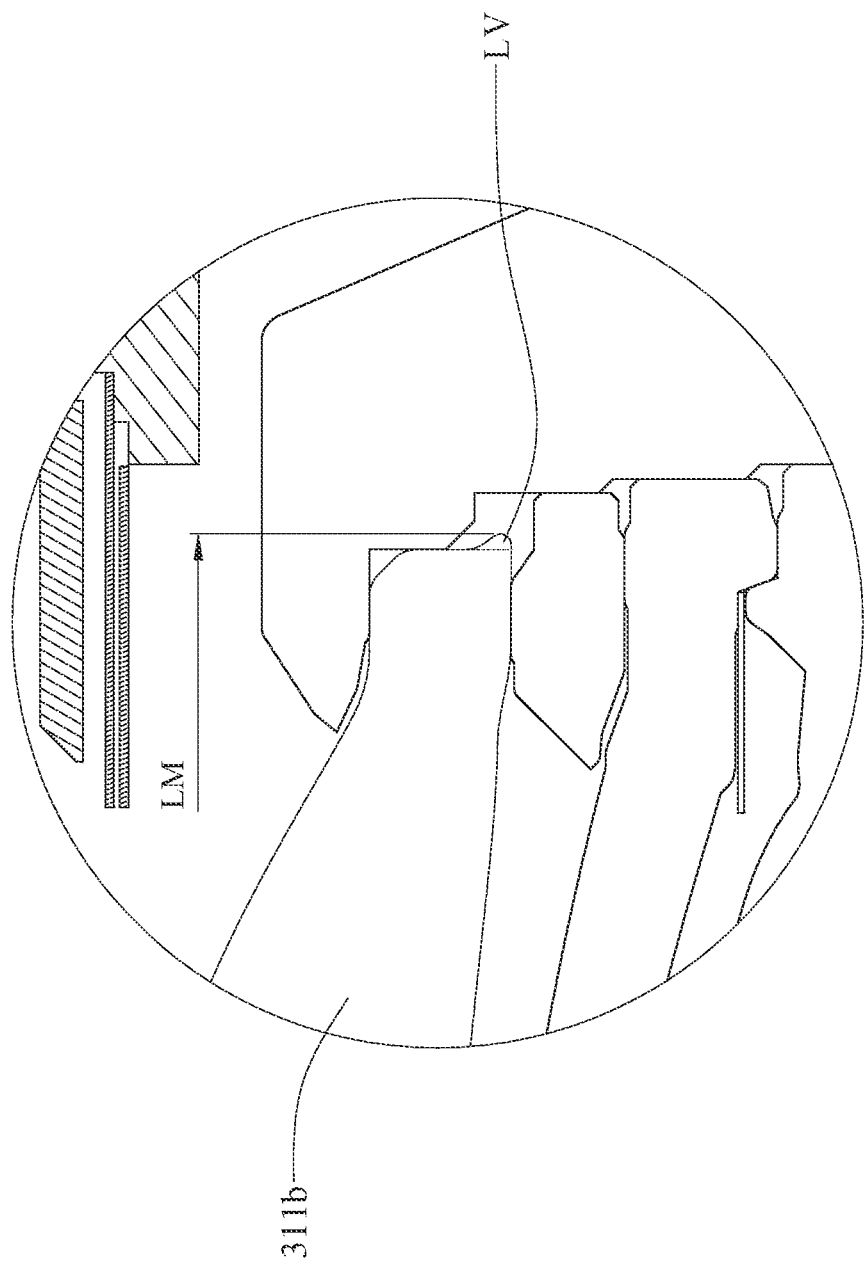
FIG. 26 is a partial and cross-sectional view of a camera module according to the 3rd embodiment of the present disclosure.

Please refer to FIG. 26, which is a partial and cross-sectional view of a camera module according to the 3rd embodiment of the present disclosure. Please be noted that the present embodiment is similar to the second embodiment. Therefore, only differences between the present embodiment and the second embodiment, as well as necessary descriptions, will be illustrated hereinafter.

The glass lens element 311b has a vestiger LV at an outer diameter surface thereof, such that a maximum outer diameter LM of the glass lens element 311b, observed from outside, is located on the vestiger LV, as the vestiger LV and the maximum outer diameter LM of the glass lens element 311b shown in FIG. 26.

4th Embodiment

Figure 27:
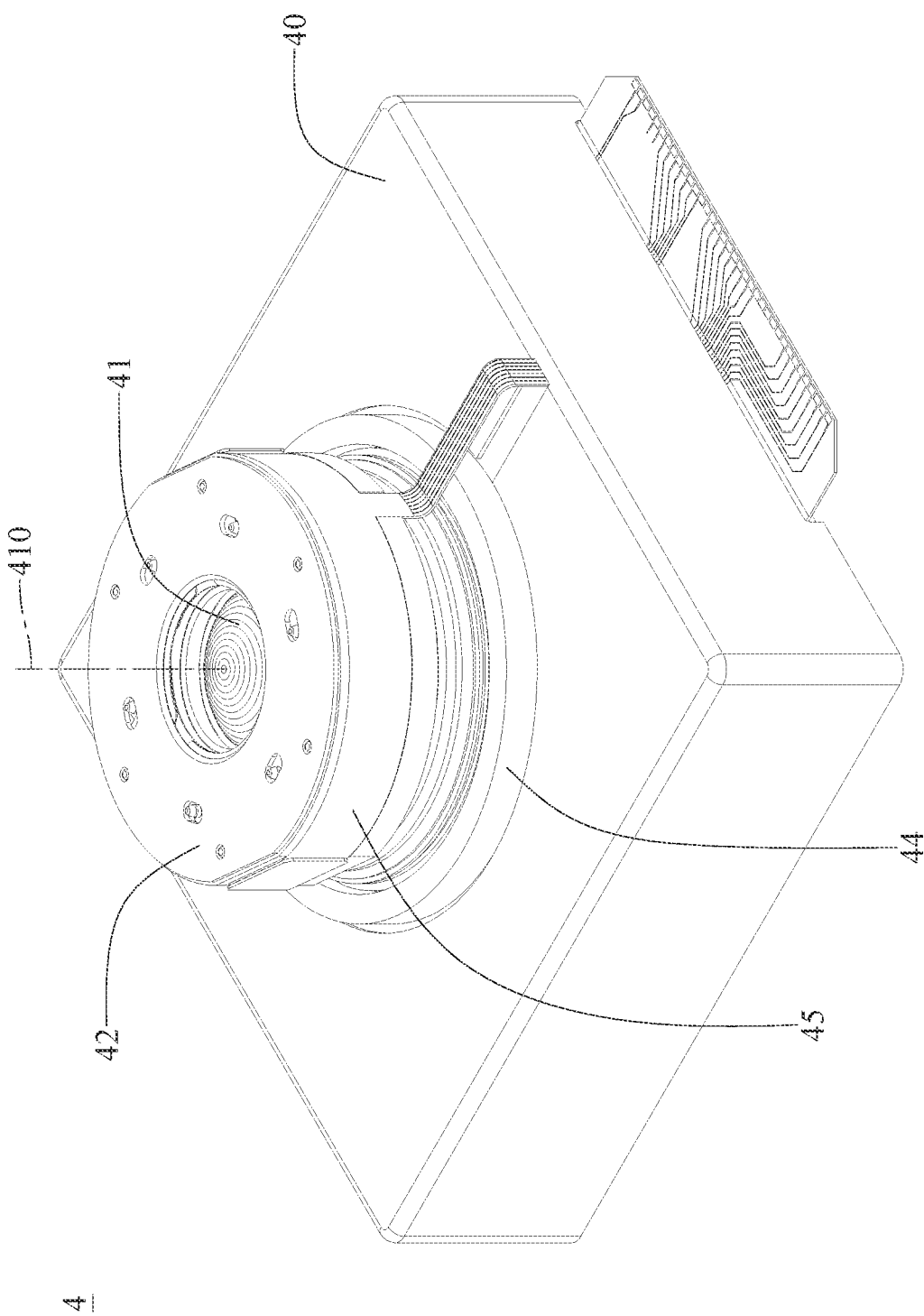
FIG. 27 is a perspective view of a camera module according to the 4th embodiment of the present disclosure.
Figure 28:
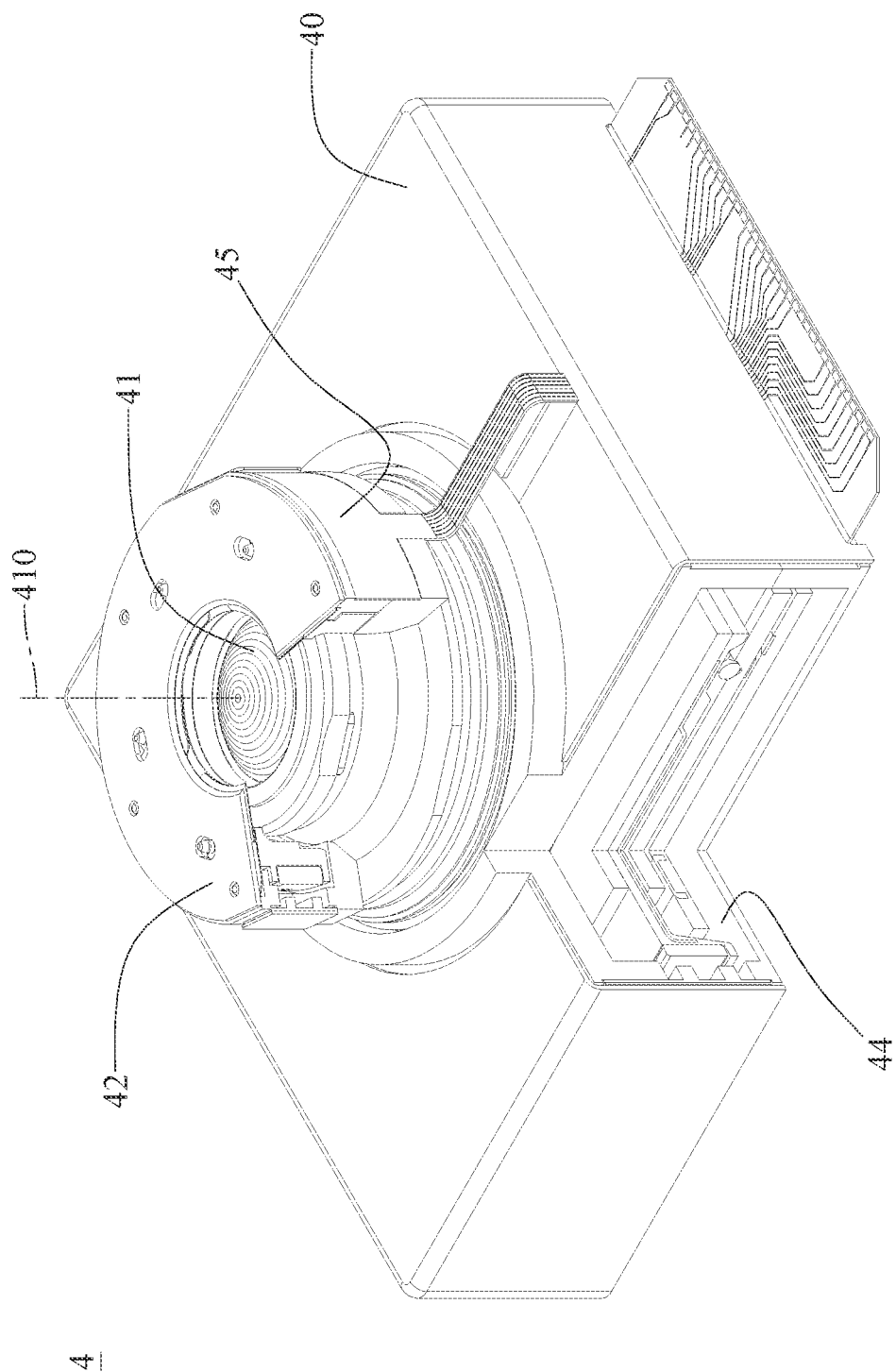
FIG. 28 is a perspective view of the camera module in FIG. 27 that has been partially sectioned.
Figure 29:
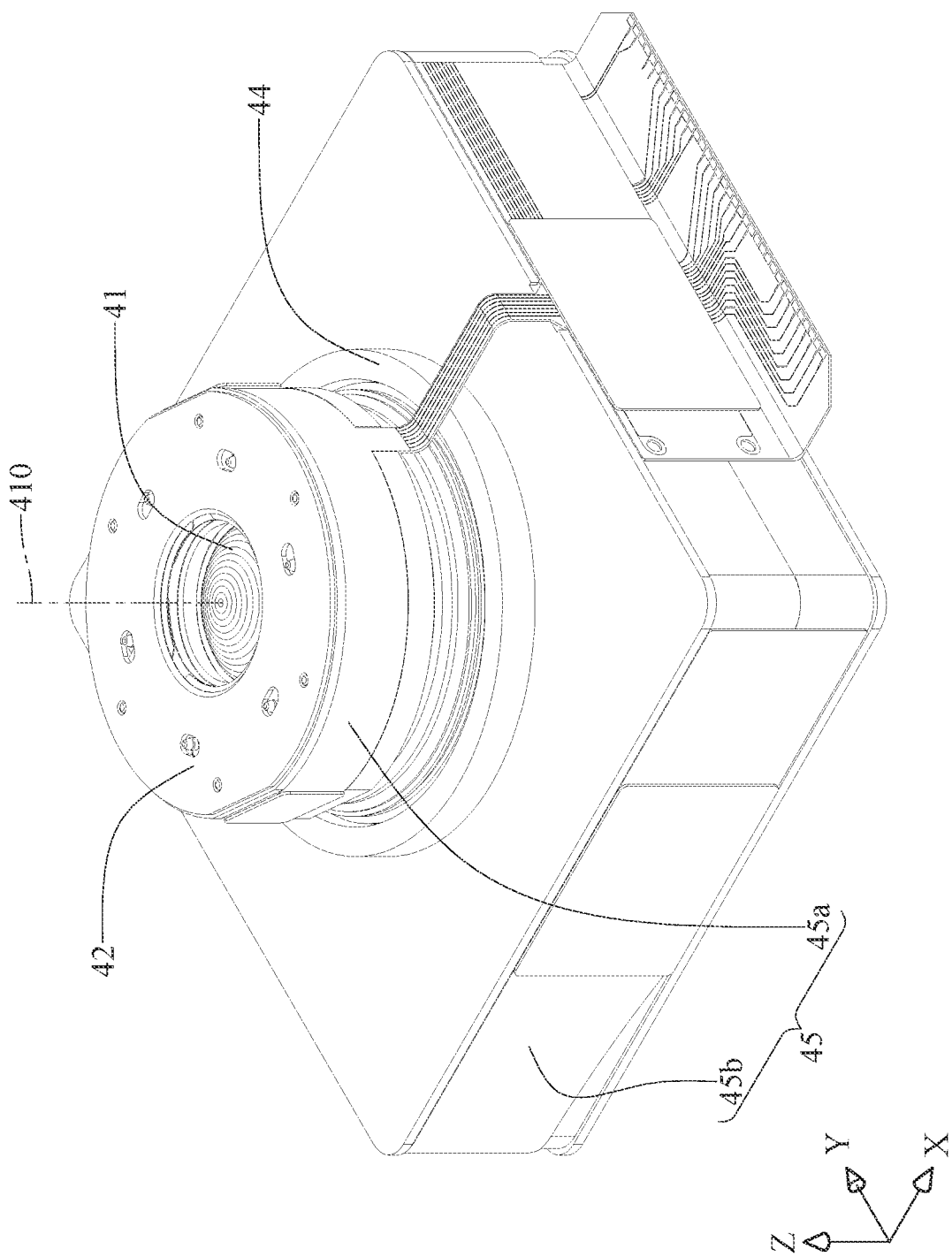
FIG. 29 is a perspective view of the camera module in FIG. 27 in which a casing has been removed.
Figure 30:
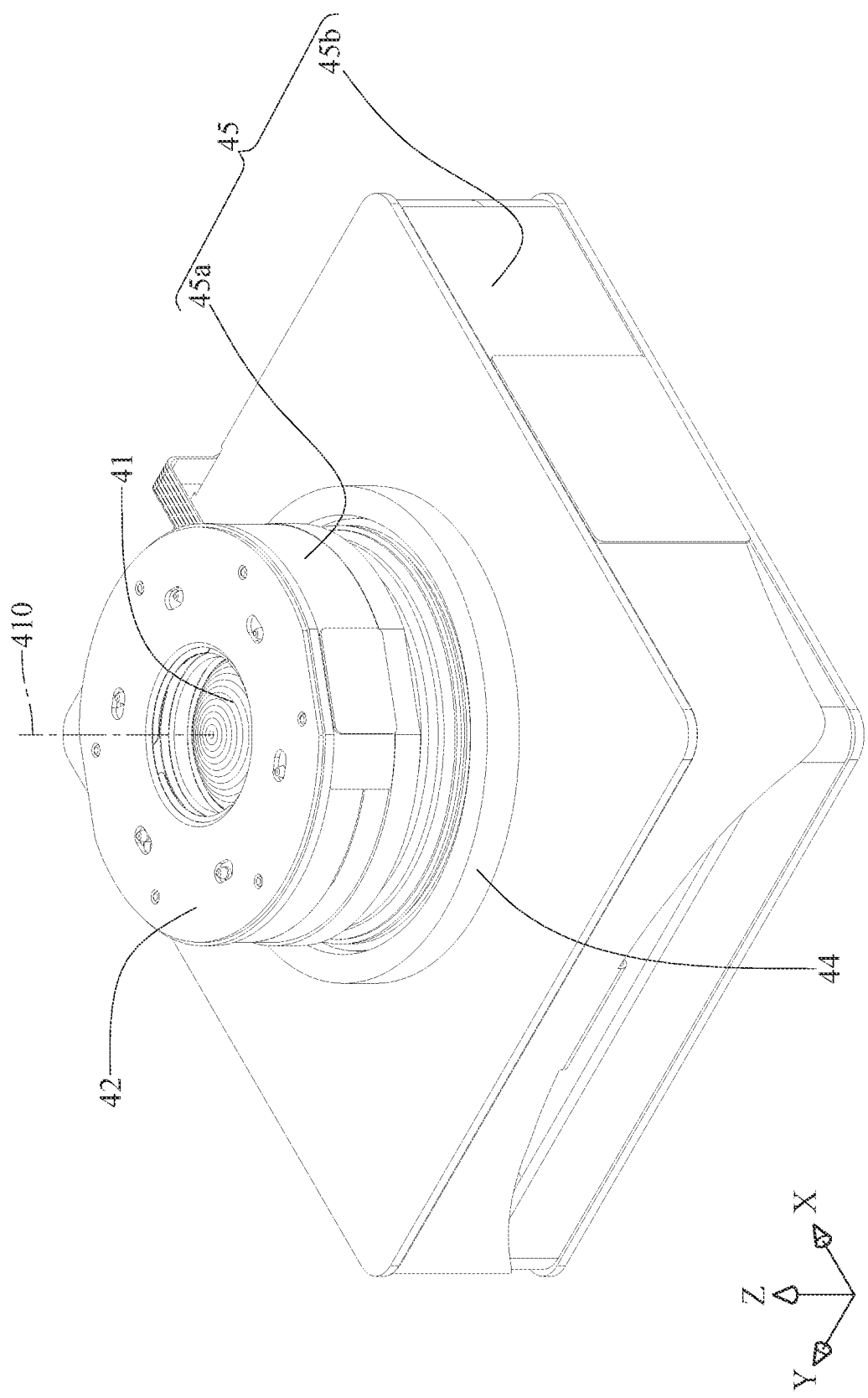
FIG. 30 is another perspective view of the camera module in FIG. 29 in which the casing has been removed.
Figure 31:
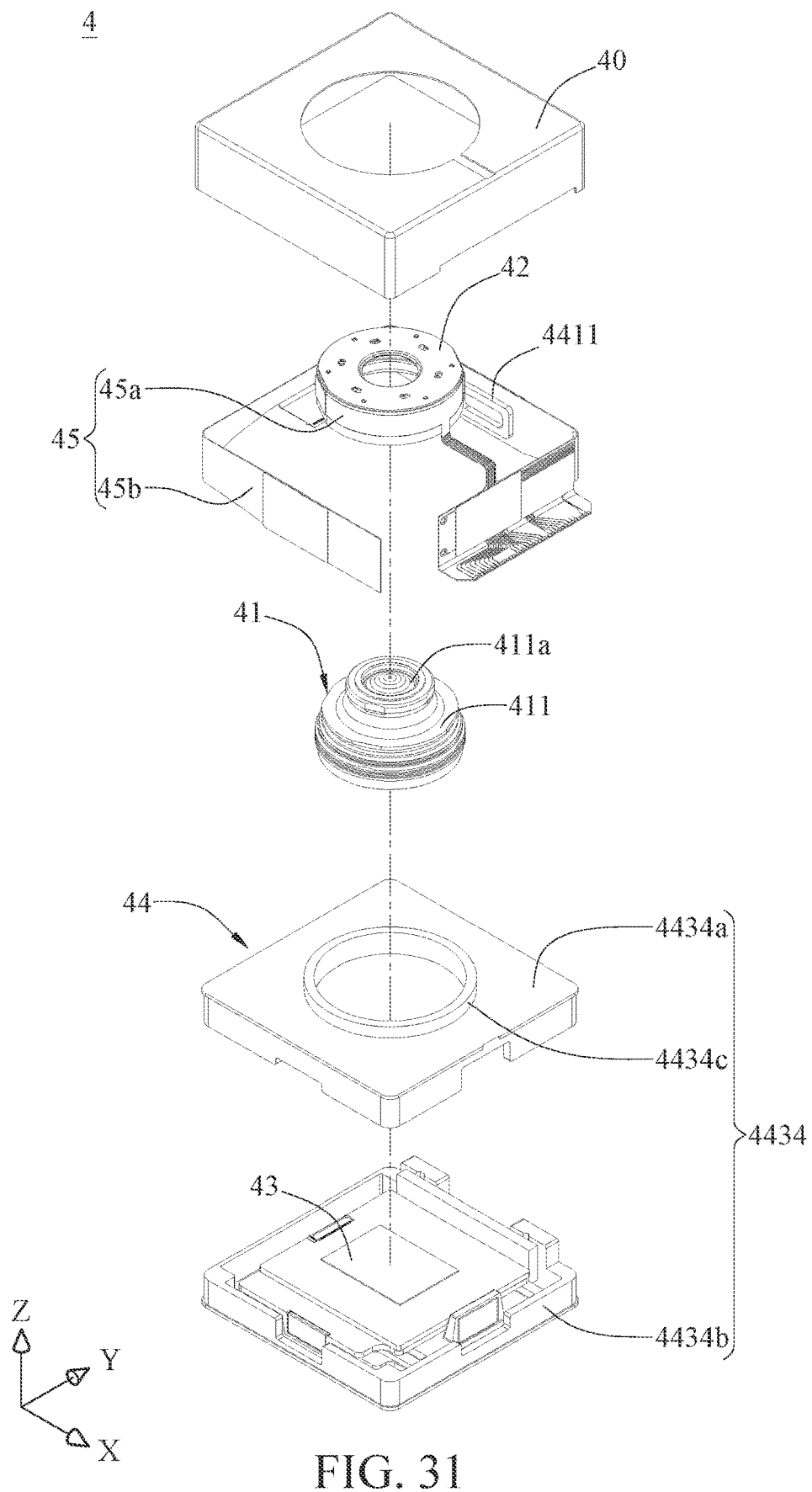
FIG. 31 is an exploded view of the camera module in FIG. 27.
Figure 32:
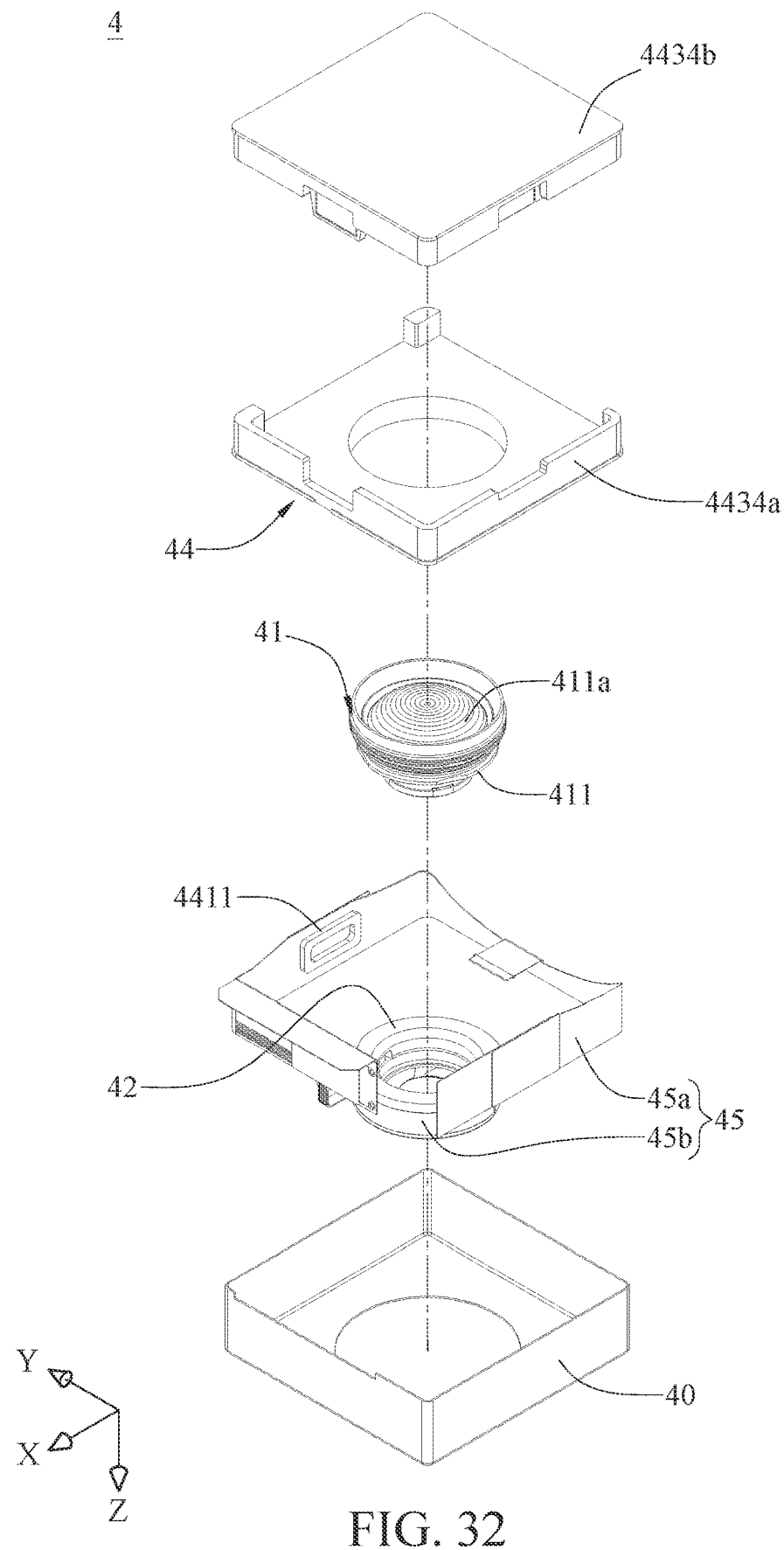
FIG. 32 is another exploded view of the camera module in FIG. 31.
Figure 33:
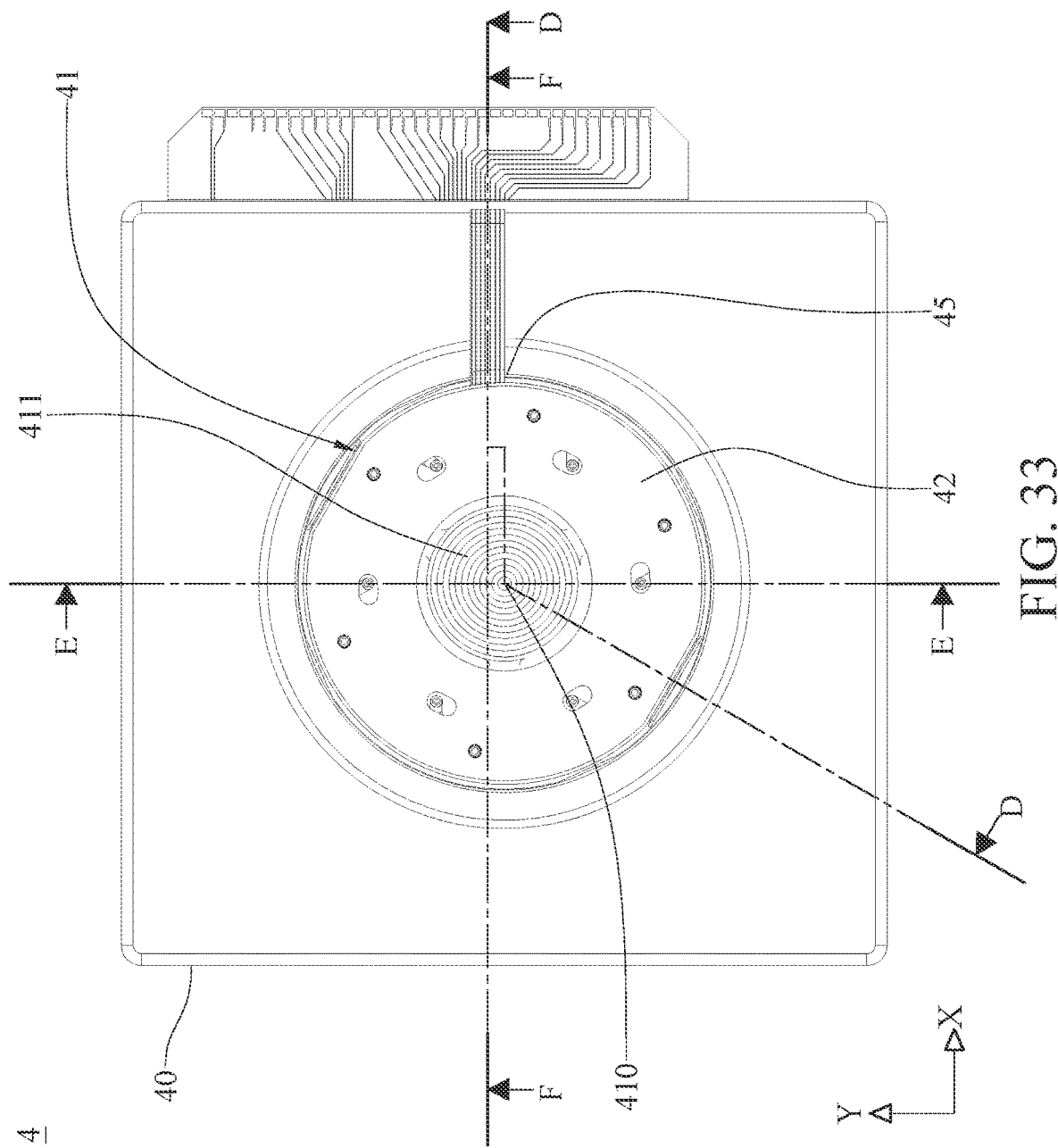
FIG. 33 is a top view of the camera module in FIG. 27.
Figure 34:
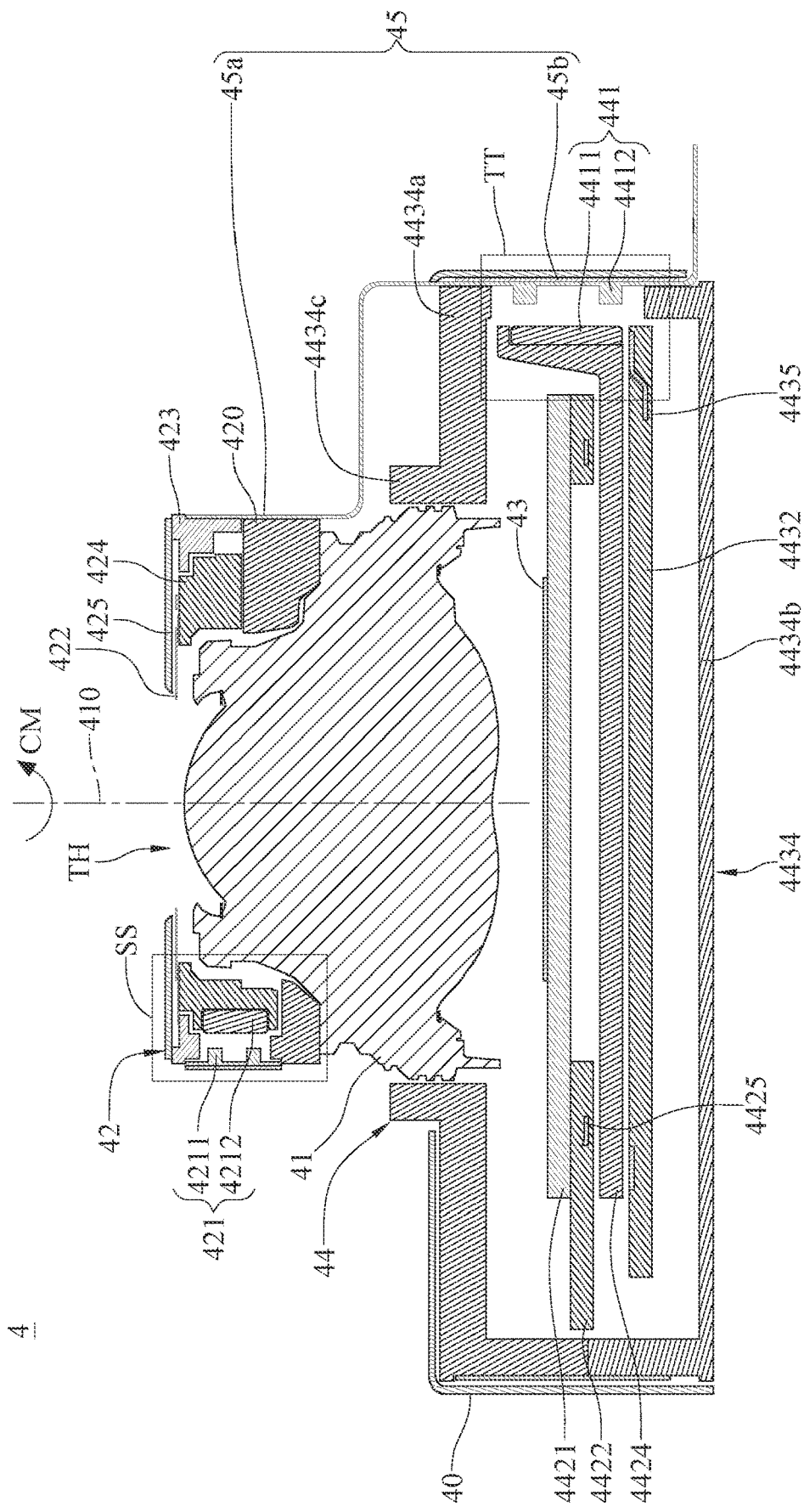
FIG. 34 is a cross-sectional view of the camera module along a line D-D in FIG. 33.
Figure 35:
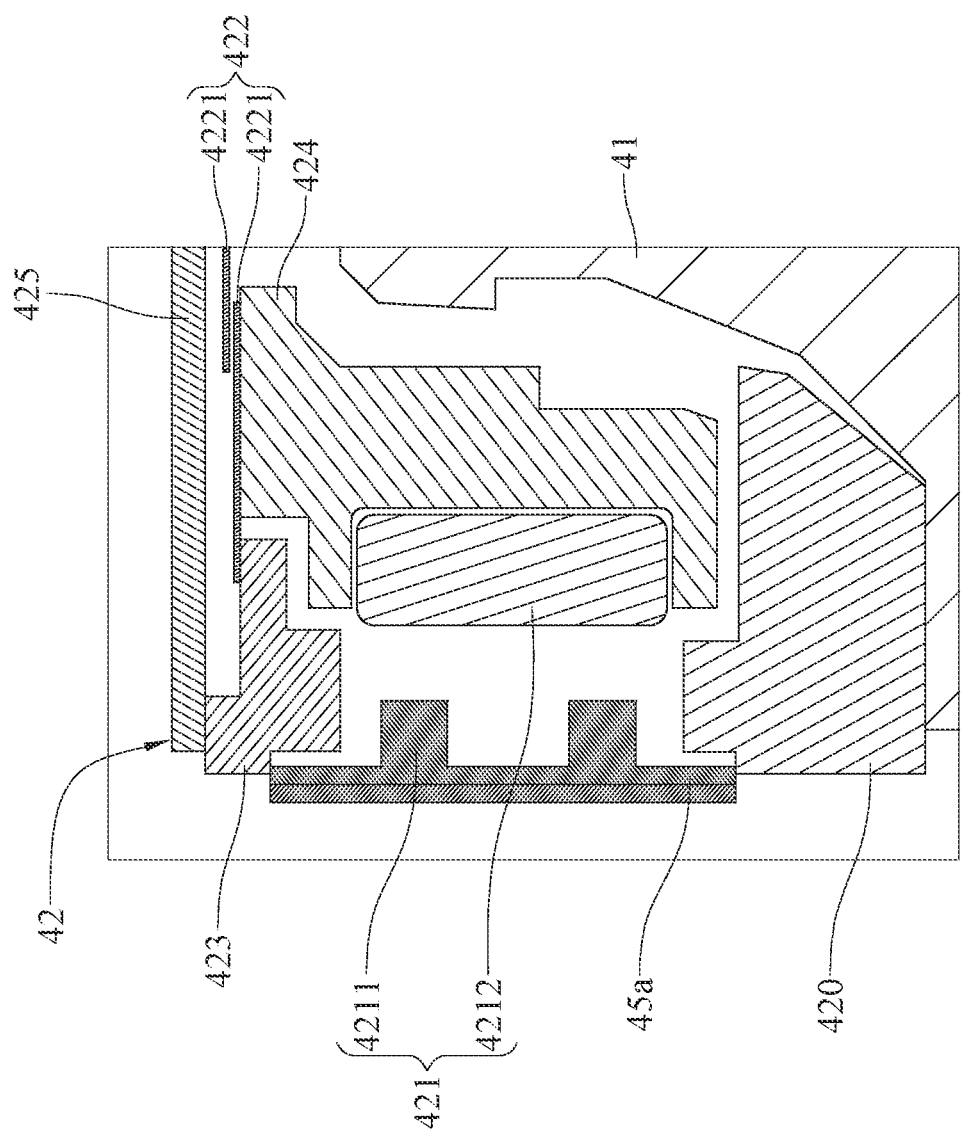
FIG. 35 is an enlarged view of region SS of the camera module in FIG. 34.
Figure 36:
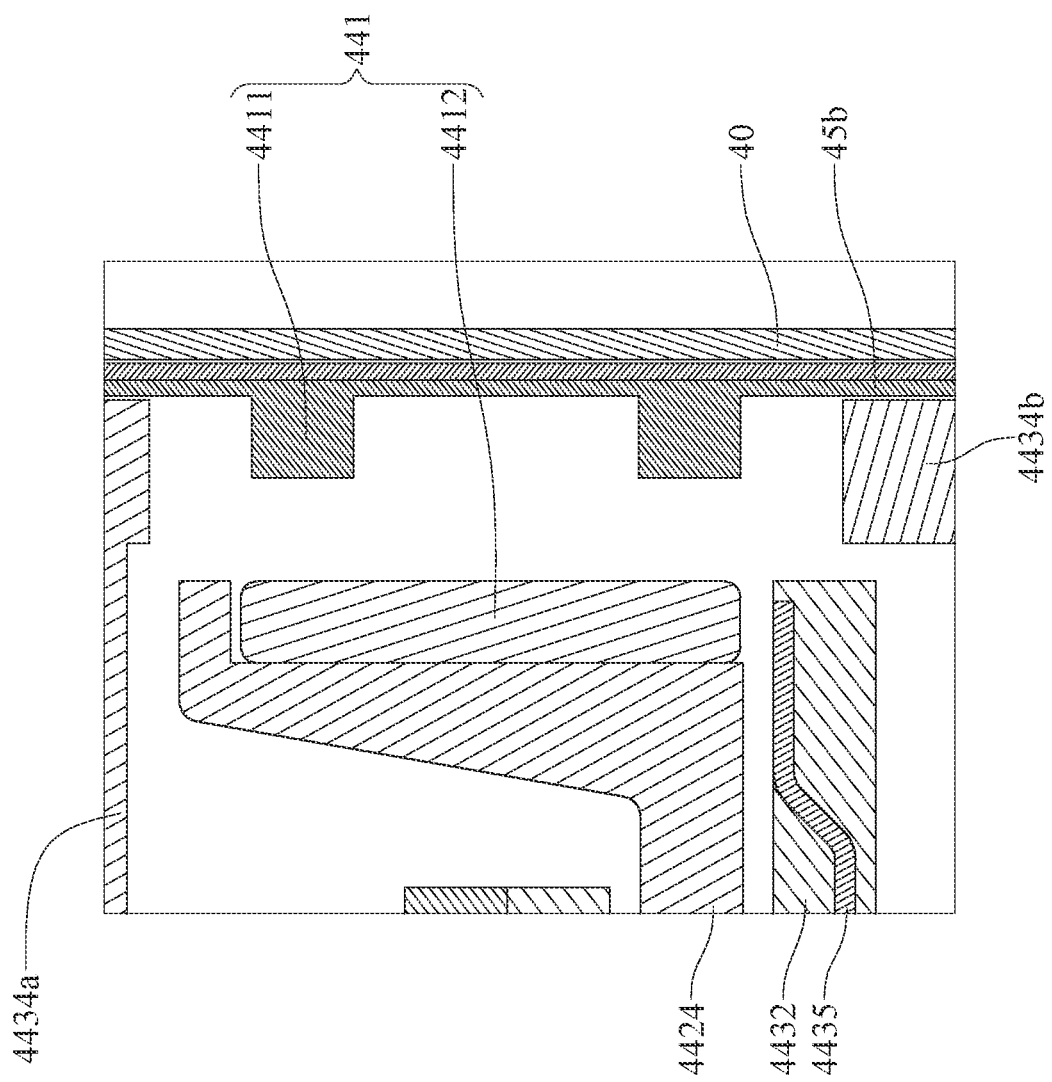
FIG. 36 is an enlarged view of region TT of the camera module in FIG. 34.
Figure 37:
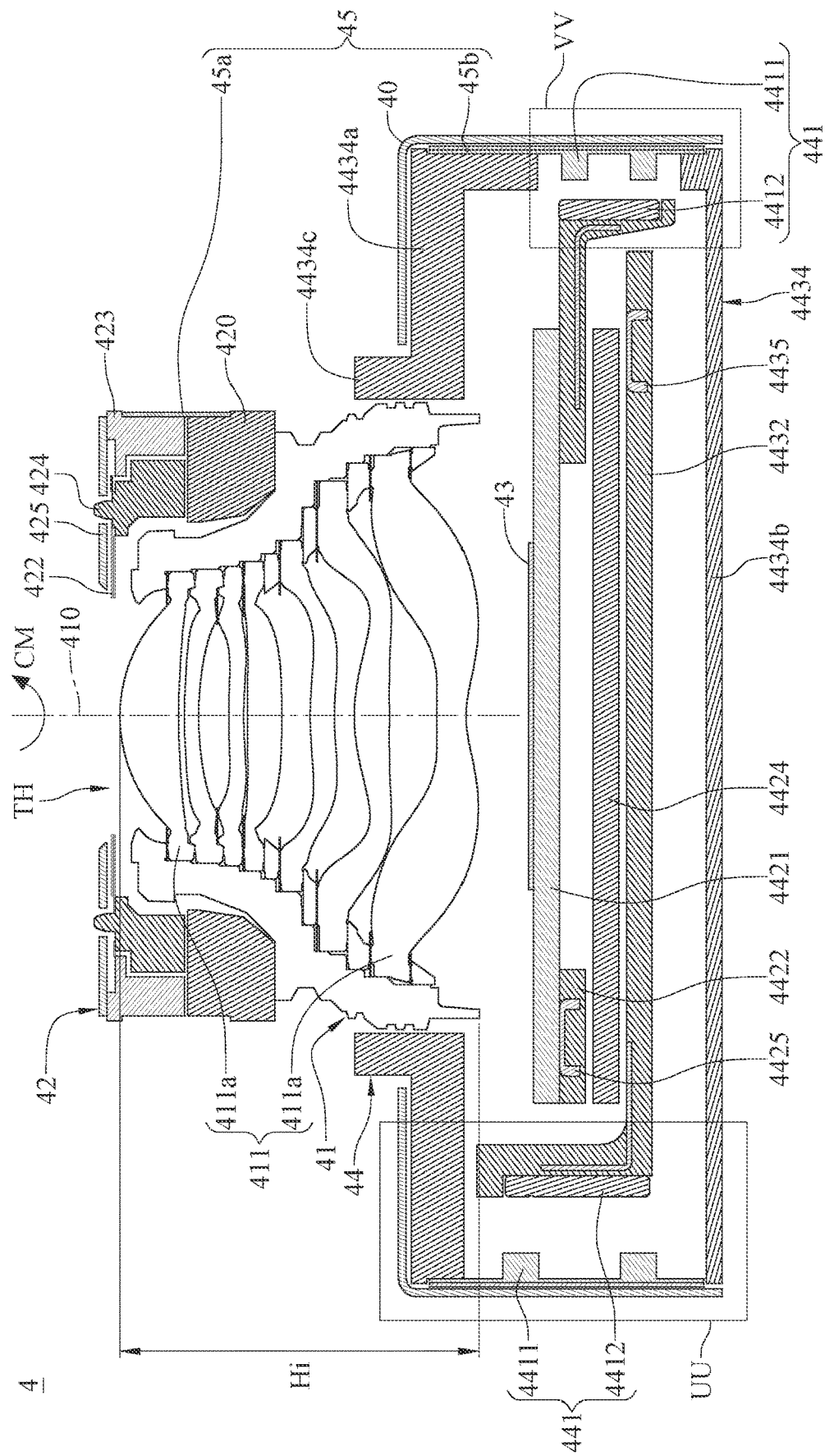
FIG. 37 is a cross-sectional view of the camera module along a line E-E in FIG. 33.
Figure 38:
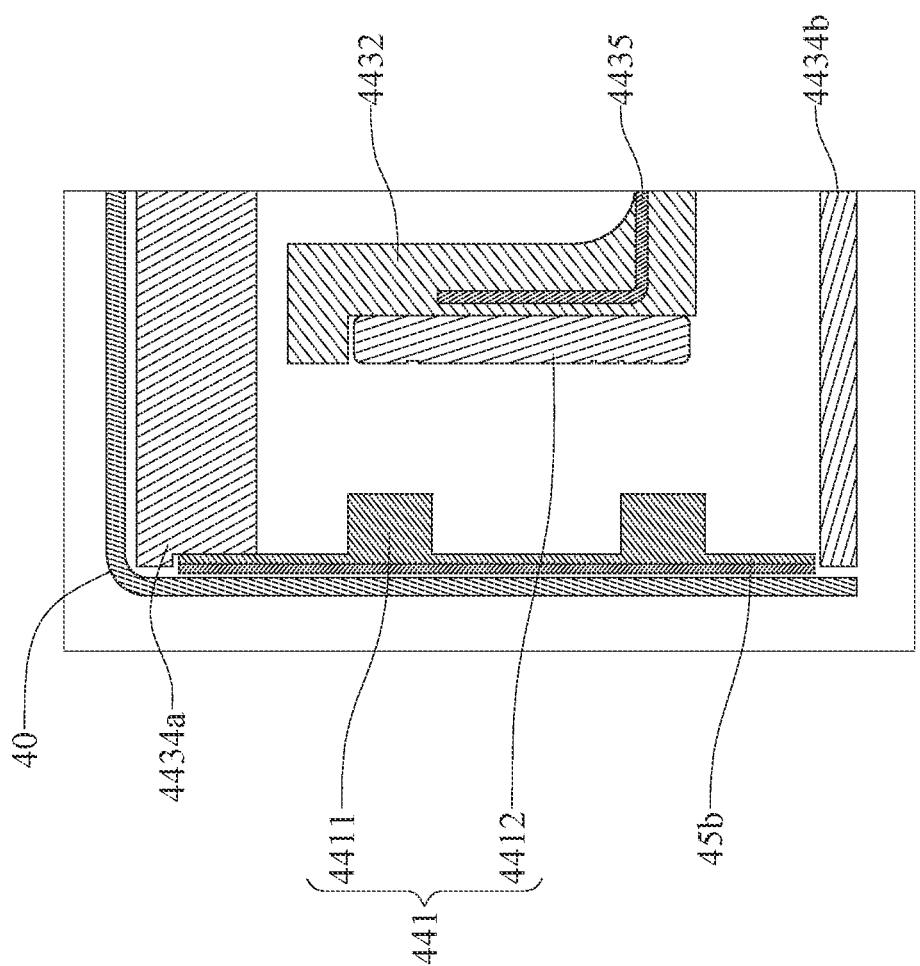
FIG. 38 is an enlarged view of region UU of the camera module in FIG. 37.
Figure 39:
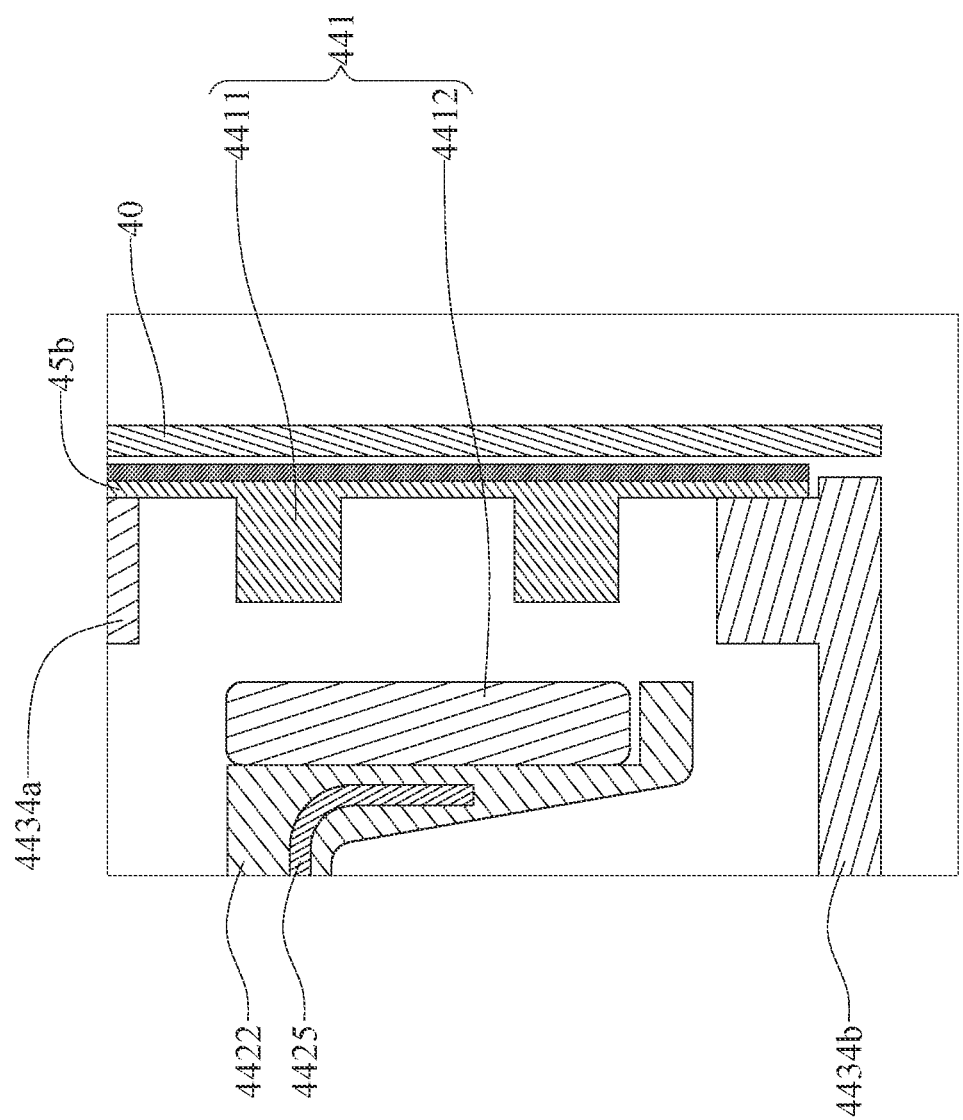
FIG. 39 is an enlarged view of region VV of the camera module in FIG. 37.
Figure 40:
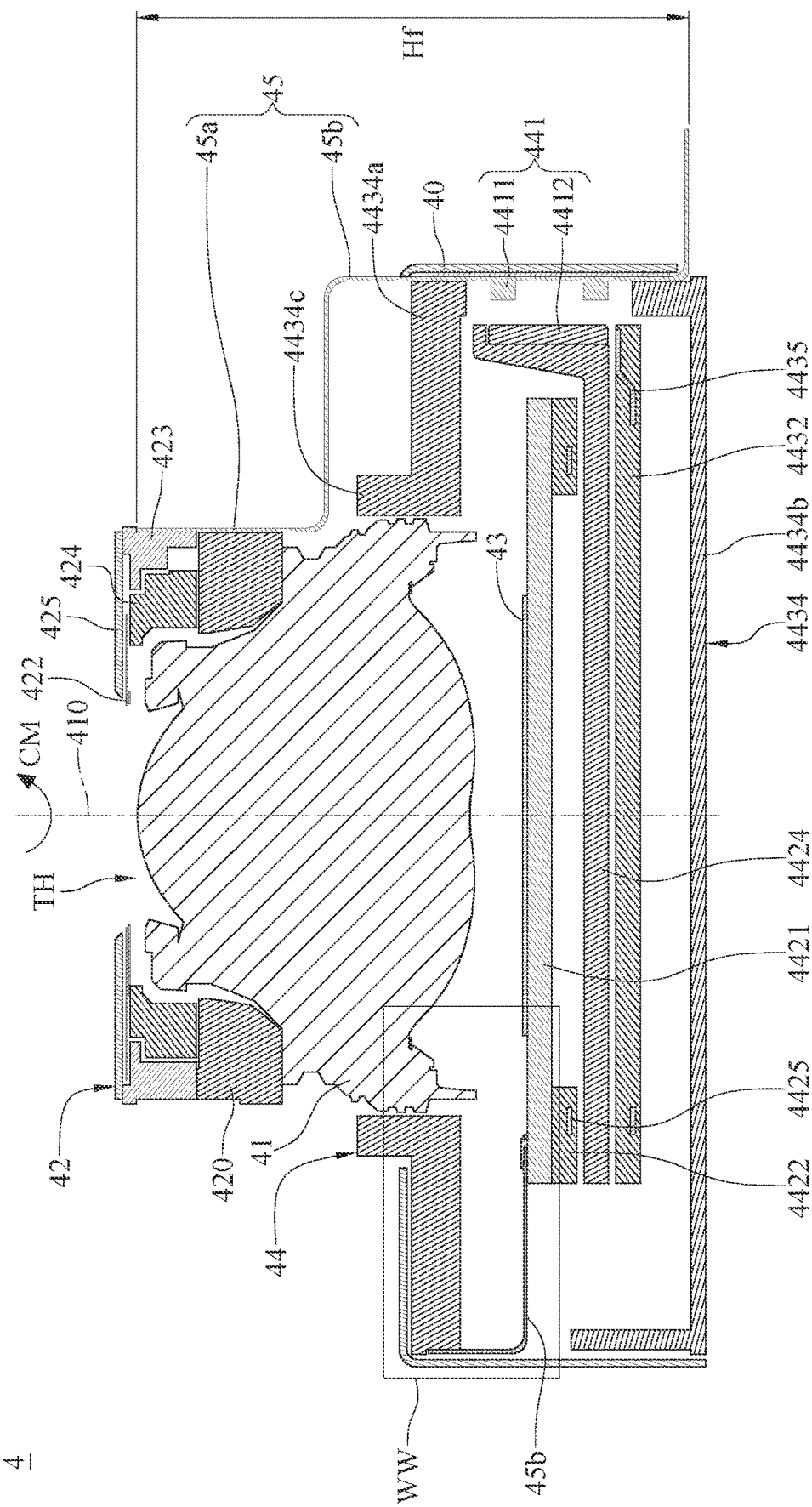
FIG. 40 is a cross-sectional view of the camera module along a line F-F in FIG. 33.
Figure 41:
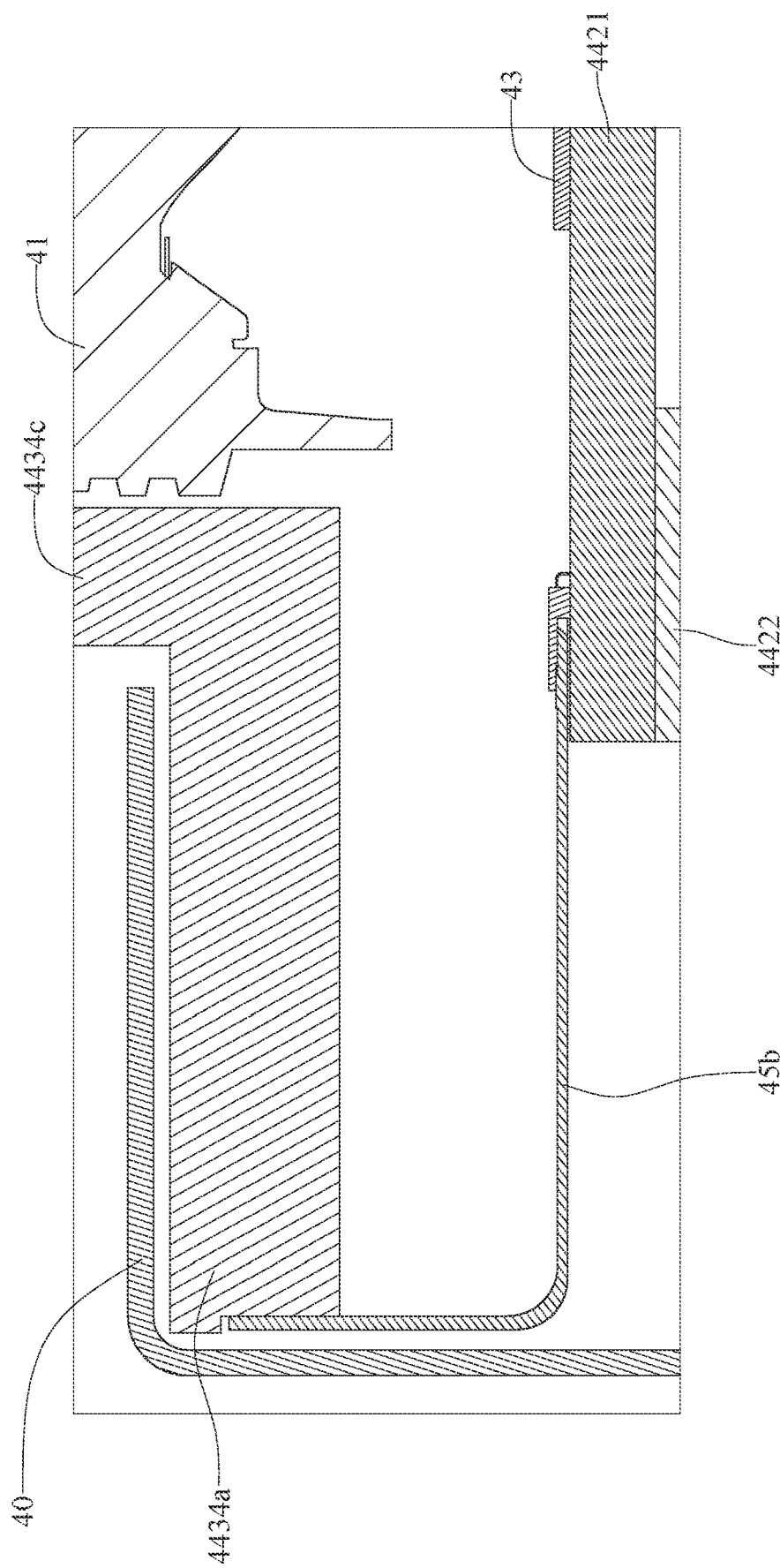
FIG. 41 is an enlarged view of region WW of the camera module in FIG. 40.

Please refer to FIG. 27 to FIG. 41, where FIG. 27 is a perspective view of a camera module according to the 4th embodiment of the present disclosure, FIG. 28 is a perspective view of the camera module in FIG. 27 that has been partially sectioned, FIG. 29 is a perspective view of the camera module in FIG. 27 in which a casing has been removed, FIG. 30 is another perspective view of the camera module in FIG. 29 in which the casing has been removed, FIG. 31 is an exploded view of the camera module in FIG. 27, FIG. 32 is another exploded view of the camera module in FIG. 31, FIG. 33 is a top view of the camera module in FIG. 27, FIG. 34 is a cross-sectional view of the camera module along a line D-D in FIG. 33, FIG. 35 is an enlarged view of region SS of the camera module in FIG. 34, FIG. 36 is an enlarged view of region TT of the camera module in FIG. 34, FIG. 37 is a cross-sectional view of the camera module along a line E-E in FIG. 33, FIG. 38 is an enlarged view of region UU of the camera module in FIG. 37, FIG. 39 is an enlarged view of region VV of the camera module in FIG. 37, FIG. 40 is a cross-sectional view of the camera module along a line F-F in FIG. 33, and FIG. 41 is an enlarged view of region WW of the camera module in FIG. 40.

A camera module 4 provided in this embodiment includes a casing 40, an imaging lens 41, a variable through hole mechanism 42, an image sensor 43, an image sensor actuating module 44 and a flexible printed circuit 45.

The imaging lens 41 is at least partially disposed in the casing 40. The imaging lens 41 has an optical axis 410. The imaging lens 41 includes an optical lens assembly 411. The optical axis 410 passes through the optical lens assembly 411. The optical lens assembly 411 includes a plurality of plastic lens elements 411a. Please be noted that some cross-sectional views in the present disclosure are formed along connected line segments in perspective views (for example, the line D-D in FIG. 33 is a polyline composed of connected line segments), so that some parts inside the imaging lens 41 shown in these cross-sectional views may be presented with slightly distortion with respect to its actual dimensions. Therefore, in order to prevent obscuring the features of the present disclosure, the parts inside the imaging lens 41 are only shown by hatch lines.

Figure 42:
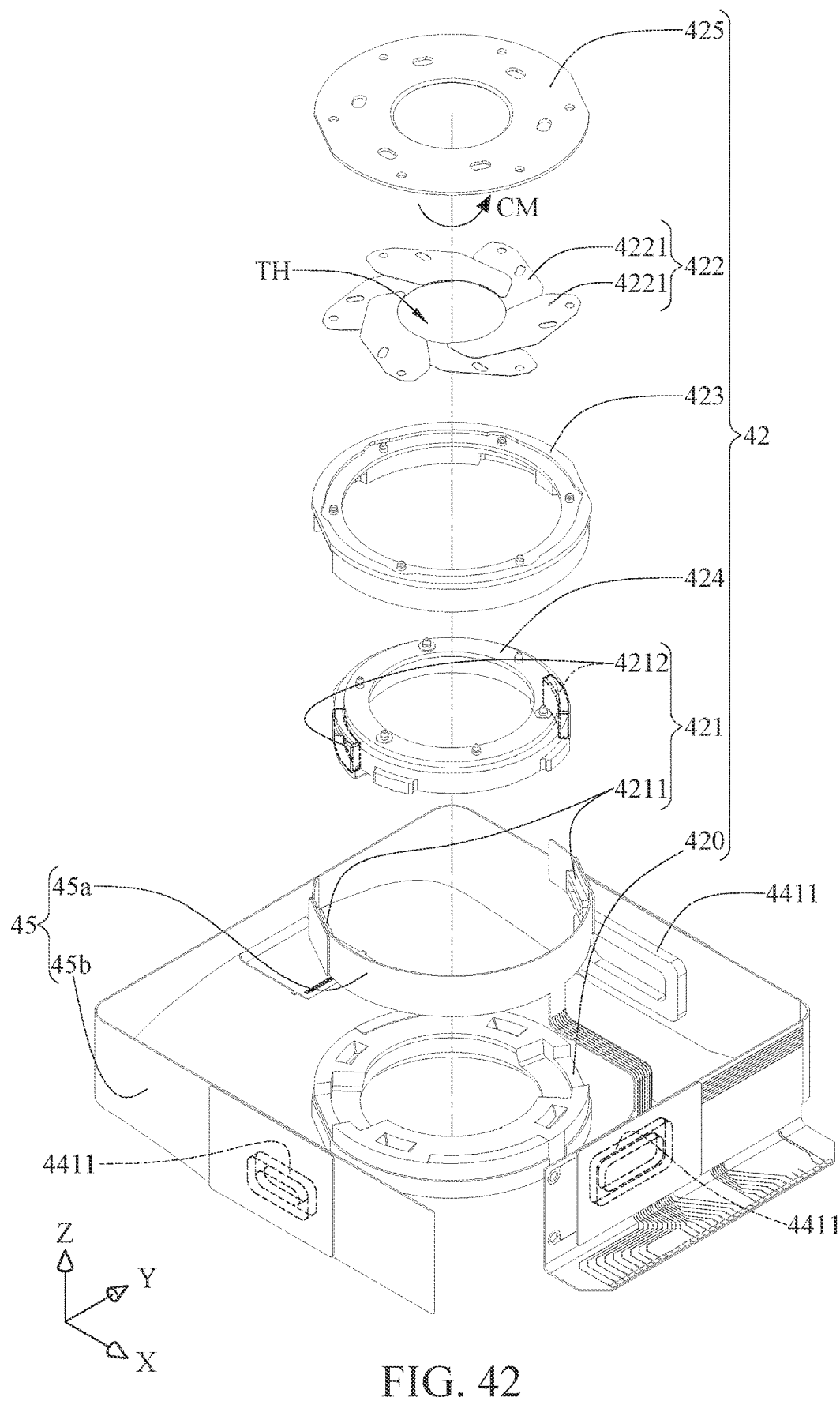
FIG. 42 is an exploded view of a variable through hole mechanism and a flexible printed circuit of the camera module in FIG. 27.
Figure 43:
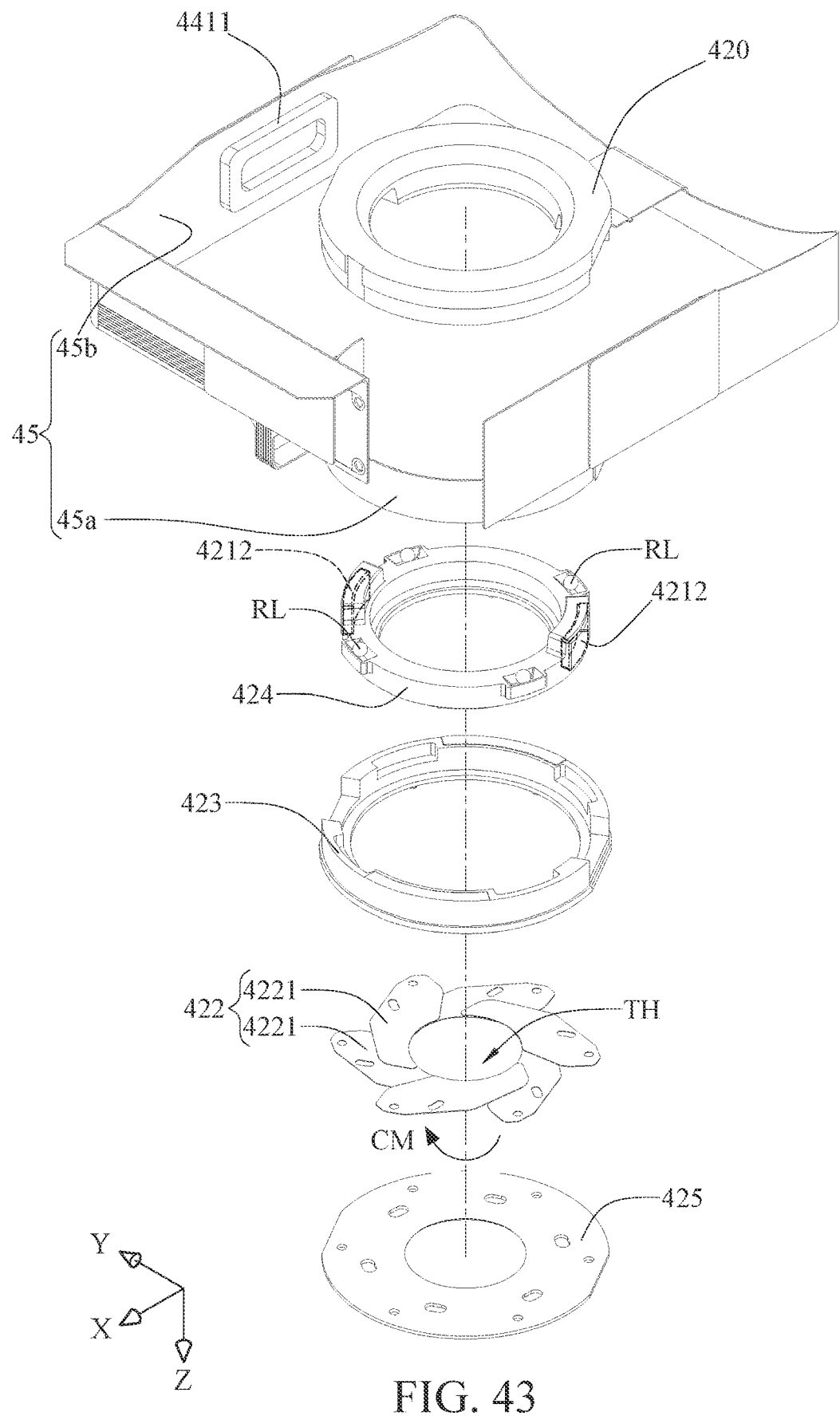
FIG. 43 is another exploded view of the variable through hole mechanism and the flexible printed circuit of the camera module in FIG. 42.

Please further refer to FIG. 42 and FIG. 43, where FIG. 42 is an exploded view of a variable through hole mechanism and a flexible printed circuit of the camera module in FIG. 27, and FIG. 43 is another exploded view of the variable through hole mechanism and the flexible printed circuit of the camera module in FIG. 42.

The variable through hole mechanism 42 is disposed corresponding to the imaging lens 41. The variable through hole mechanism 42 is able to adjust an amount of light into the imaging lens 41. It can be also considered that the variable through hole mechanism 42 provides a variable aperture value, such that the camera module 4 can efficiently correspond to variable photographing scenarios with different requirements of light incident amounts.

The variable through hole mechanism 42 includes a substrate 420, a first driving mechanism 421, a light-blocking assembly 422, a fixed element 423, a movable element 424 and a cover 425. The first driving mechanism 421 is located at a side of the substrate 420. The first driving mechanism 421 includes two first coils 4211 and two first magnets 4212. The first coils 4211 are disposed on the flexible printed circuit 45. The first magnets 4212 are disposed opposite to the first coils 4211, as shown in FIG. 35. The light-blocking assembly 422 includes a plurality of light-blocking sheets 4221 that are stacked with each other along a circumferential direction CM about the optical axis 410 to form a light-passable hole TH with a variable aperture. The fixed element 423 is disposed on the substrate 420 and connected to the light-blocking assembly 422. The movable element 424 is rotatably disposed on the substrate 420 via rollers RL and connected to the light-blocking assembly 422, and the first magnet 4212 is disposed on the movable element 424 to be disposed opposite to the first coils 4211. The cover 425 is disposed at a side of the light-blocking assembly 422 away from the fixed element 423 and the movable element 424. The first driving mechanism 421 is able to rotate the movable element 424 along the circumferential direction CM with respect to the fixed element 423 so as to drive the light-blocking assembly 422 to adjust the variable aperture of the light-passable hole TH.

Figure 44:
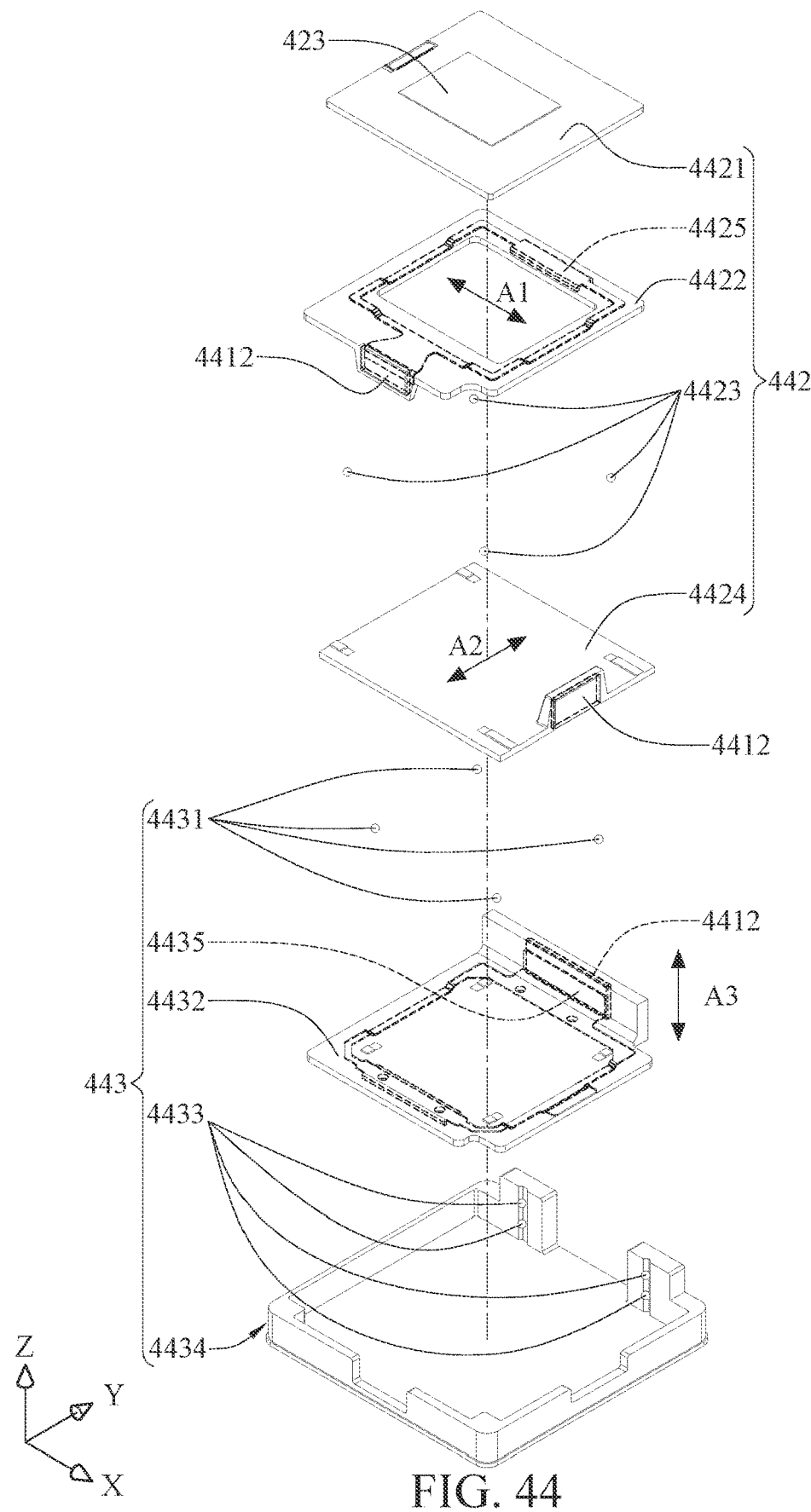
FIG. 44 is an exploded view of an image sensor actuating module of the camera module in FIG. 27.
Figure 45:
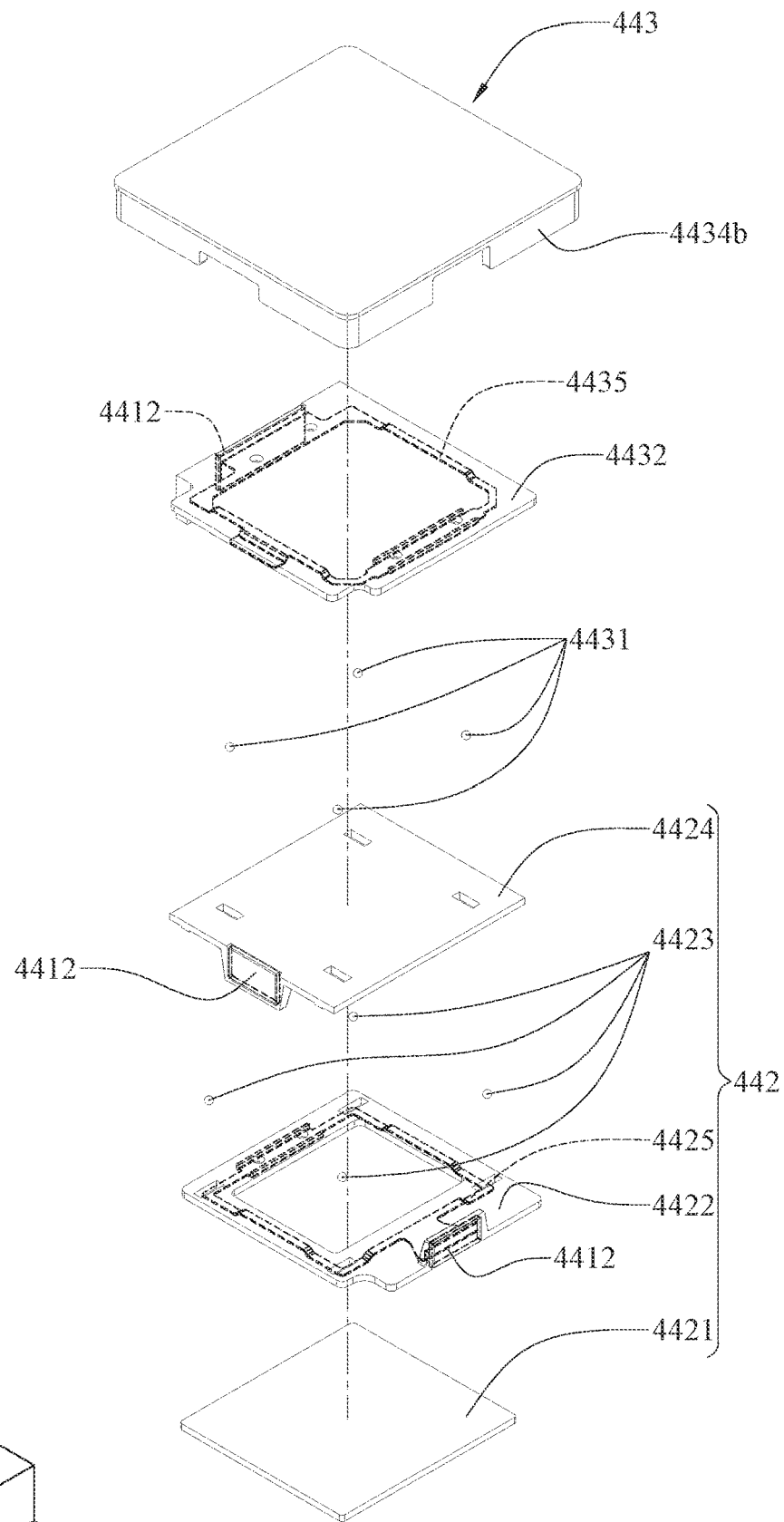
FIG. 45 is another exploded view of the image sensor actuating module of the camera module in FIG. 44.

Please further refer to FIG. 44 and FIG. 45, where FIG. 44 is an exploded view of an image sensor actuating module of the camera module in FIG. 27, and FIG. 45 is another exploded view of the image sensor actuating module of the camera module in FIG. 44.

The image sensor 43 is disposed inside the casing 40. The image sensor 43 is disposed on the optical axis 410. The image sensor 43 is able to convert imaging light passing through the imaging lens 41 into an image signal.

The image sensor actuating module 44 is able to move the image sensor 43 along a direction parallel to or perpendicular to the optical axis 410. In this embodiment, if the optical axis 410 is the Z-axis, the direction perpendicular to the optical axis 410 is any direction on an X-Y plane defined by the X-axis and the Y-axis, and the image sensor 43 can be moved along a direction parallel to the Z-axis or any direction on the X-Y plane.

The image sensor actuating module 44 includes a second driving mechanism 441, an image stabilization module 442 and an image focus module 443. The second driving mechanism 441 includes three second coils 4411 and three second magnets 4412. The second coils 4411 are disposed at three sides of the flexible printed circuit 45, as shown in FIG. 42 and FIG. 43. The second magnets 4412 are disposed opposite to the second coils 4411, as shown in FIG. 36, FIG. 38, and FIG. 39. The image stabilization module 442 and the image focus module 443 are disposed corresponding to each other along the optical axis 410.

The image stabilization module 442 is able to move the image sensor 43 along the direction perpendicular to the optical axis 410. Specifically, the image stabilization module 442 includes an image sensor carrier 4421, a first movable plate 4422, a plurality of first rolling supporters 4423, a second movable plate 4424 and a first ferromagnetic element 4425. The image sensor carrier 4421 carries the image sensor 43, and there is no relative displacement between the image sensor carrier 4421 and the image sensor 43. The first movable plate 4422 is coupled to the image sensor carrier 4421, and one second magnet 4412 is disposed on the first movable plate 4422, such that the second driving mechanism 441 is able to move the first movable plate 4422 along the direction perpendicular to the optical axis 410 with respect to the imaging lens 41 (e.g., the direction A1 denoted in FIG. 44, which is a direction parallel to the X-axis). The first rolling supporters 4423 are rollably disposed on the first movable plate 4422. The second movable plate 4424 is connected to the first movable plate 4422 via the first rolling supporters 4423, and another second magnet 4412 is disposed on the second movable plate 4424, such that the second driving mechanism 441 is able to move the second movable plate 4424 along the direction perpendicular to the optical axis 410 with respect to the first movable plate 4422 (e.g., the direction A2 denoted in FIG. 44, which is a direction parallel to the Y-axis). The first ferromagnetic element 4425 is formed together with the first movable plate 4422 through an insert molding process.

The image focus module 443 is able to move the image sensor 43 along the direction parallel to the optical axis 410. Specifically, the image focus module 443 includes a plurality of second rolling supporters 4431, a base 4432, a plurality of third rolling supporters 4433, a frame 4434 and a second ferromagnetic element 4435. The second rolling supporters 4431 are rollably disposed on the second movable plate 4424. The base 4432 is connected to the second movable plates 4424 via the second rolling supporters 4431, and the other one second magnet 4412 is disposed on the base 4432, such that the second driving mechanism 441 is able to move the base 4432 along the direction parallel to the optical axis 410 with respect to the imaging lens 41 (e.g., the direction A3 denoted in FIG. 44, which is a direction parallel to the Z-axis). The third rolling supporters 4433 are rollably disposed on the base 4432. The frame 4434 is connected to the base 4432 via the third rolling supporters 4433. The second ferromagnetic element 4435 is formed together with the base 4432 through an insert molding process. The second ferromagnetic element 4435 is disposed opposite to the second magnet 4412 on the base 4432.

The frame 4434 is formed by coupling an upper cover 4434a and a lower cover 4434b. The lower cover 4434b is in physical contact with the third rolling supporters 4433. The frame 4434 has a mounting structure 4434c. The mounting structure 4434c is located at the upper cover 4434a. The mounting structure 4434c is able to mount the imaging lens 41, such that there is no relative displacement between the imaging lens 41 and the frame 4434, and the frame 4434 also has no relative displacement inside the camera module 4. Accordingly, the imaging lens 41 can have no relative displacement inside the camera module 4, or it can be considered that the imaging lens 41 can be relatively fixed inside the camera module 4.

Figure 46:
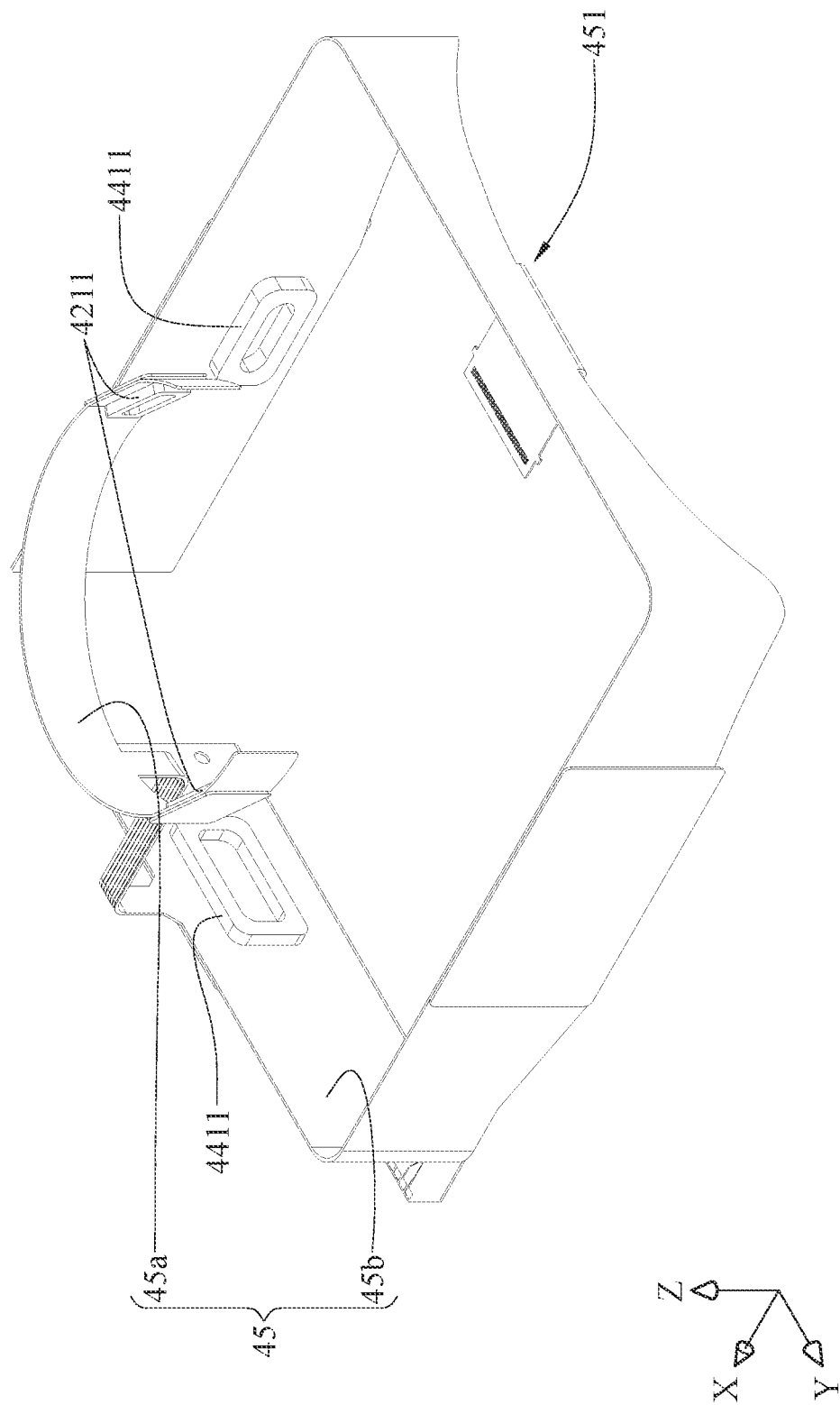
FIG. 46 is a perspective view of the flexible printed circuit, first coils and second coils of the camera module in FIG. 27.
Figure 47:
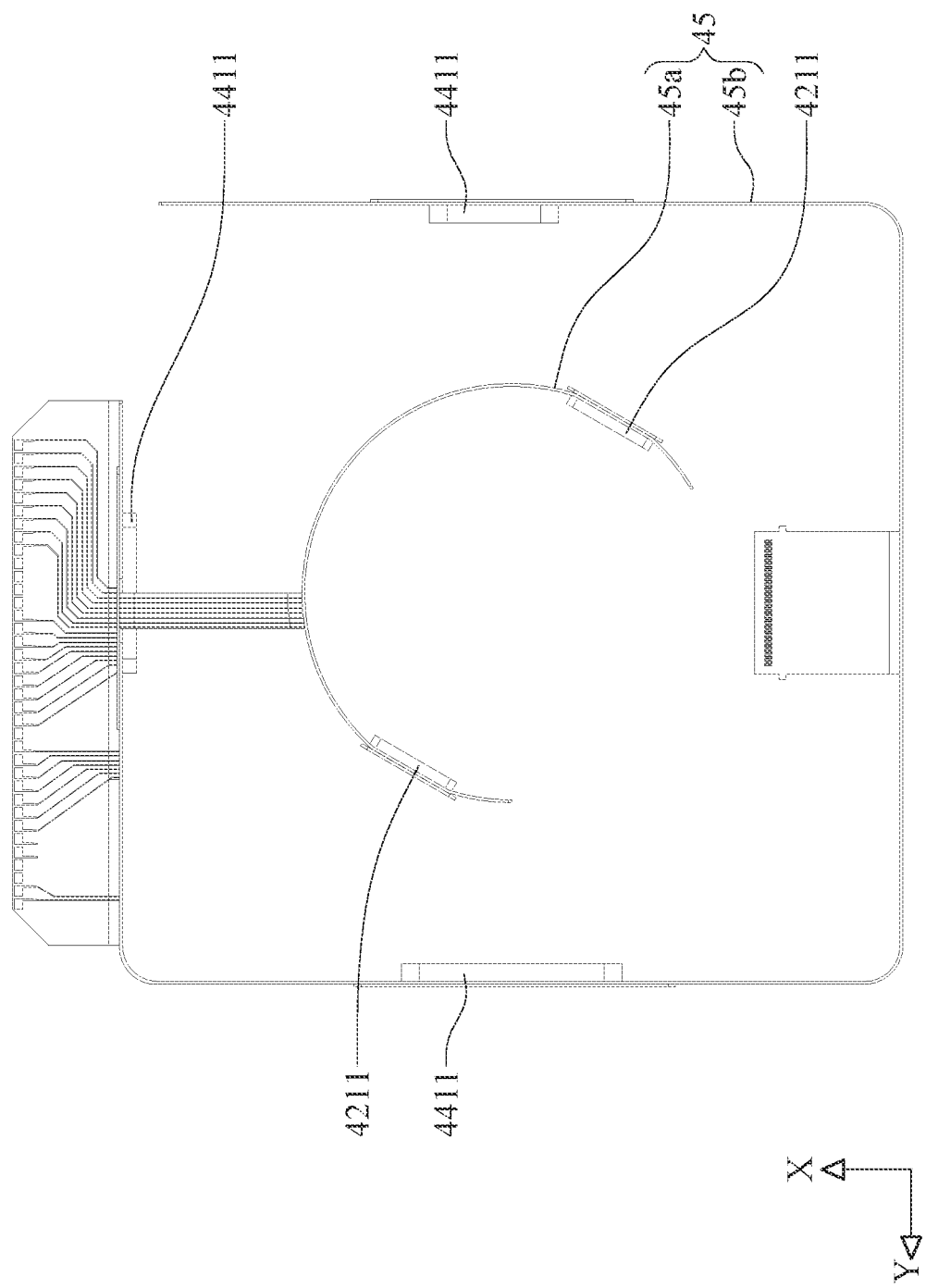
FIG. 47 is a top view of the flexible printed circuit, the first coils and the second coils of the camera module in FIG. 46.
Figure 48:
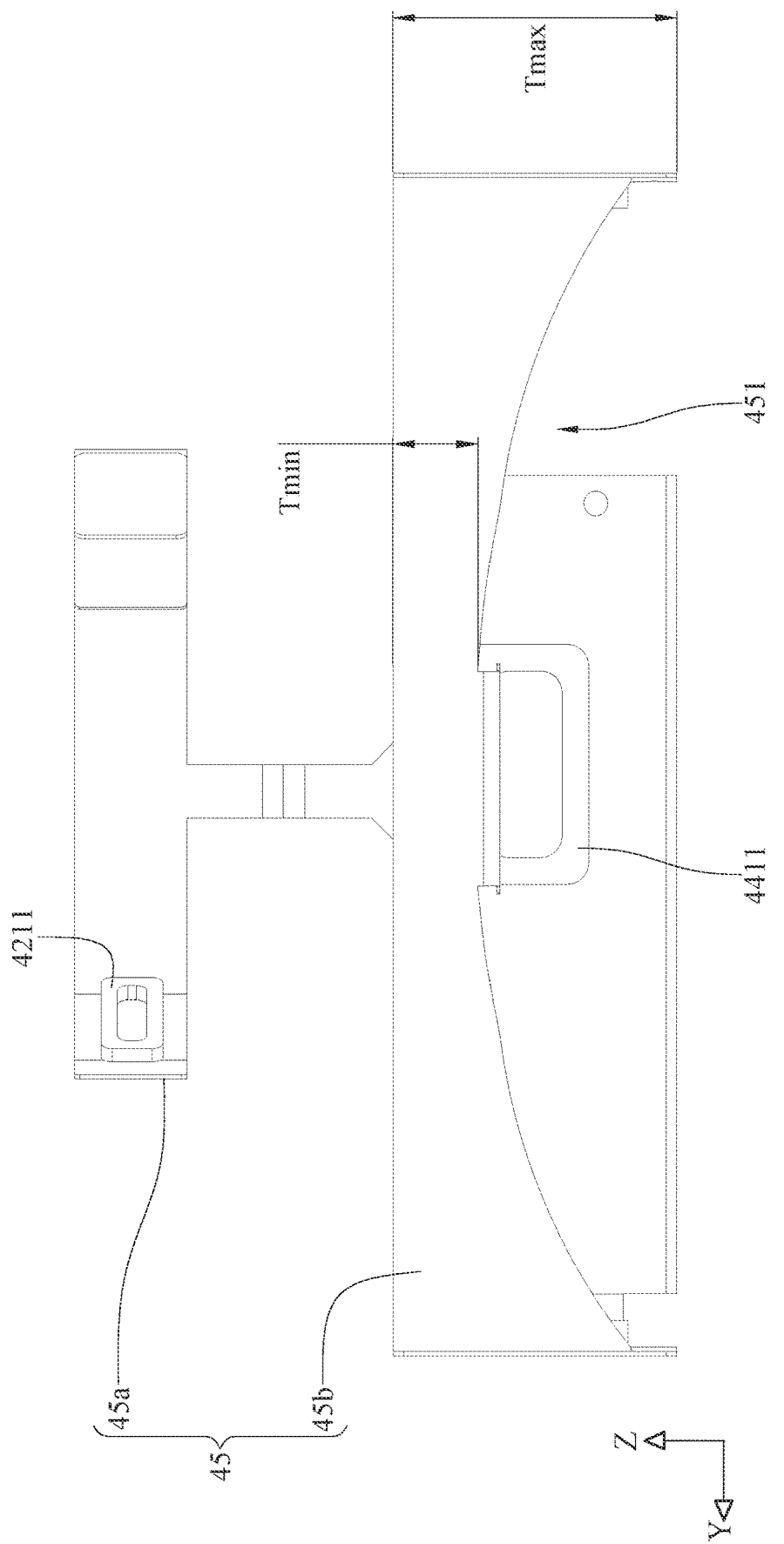
FIG. 48 is a front view of the flexible printed circuit, the first coils and the second coils of the camera module in FIG. 46.
Figure 49:
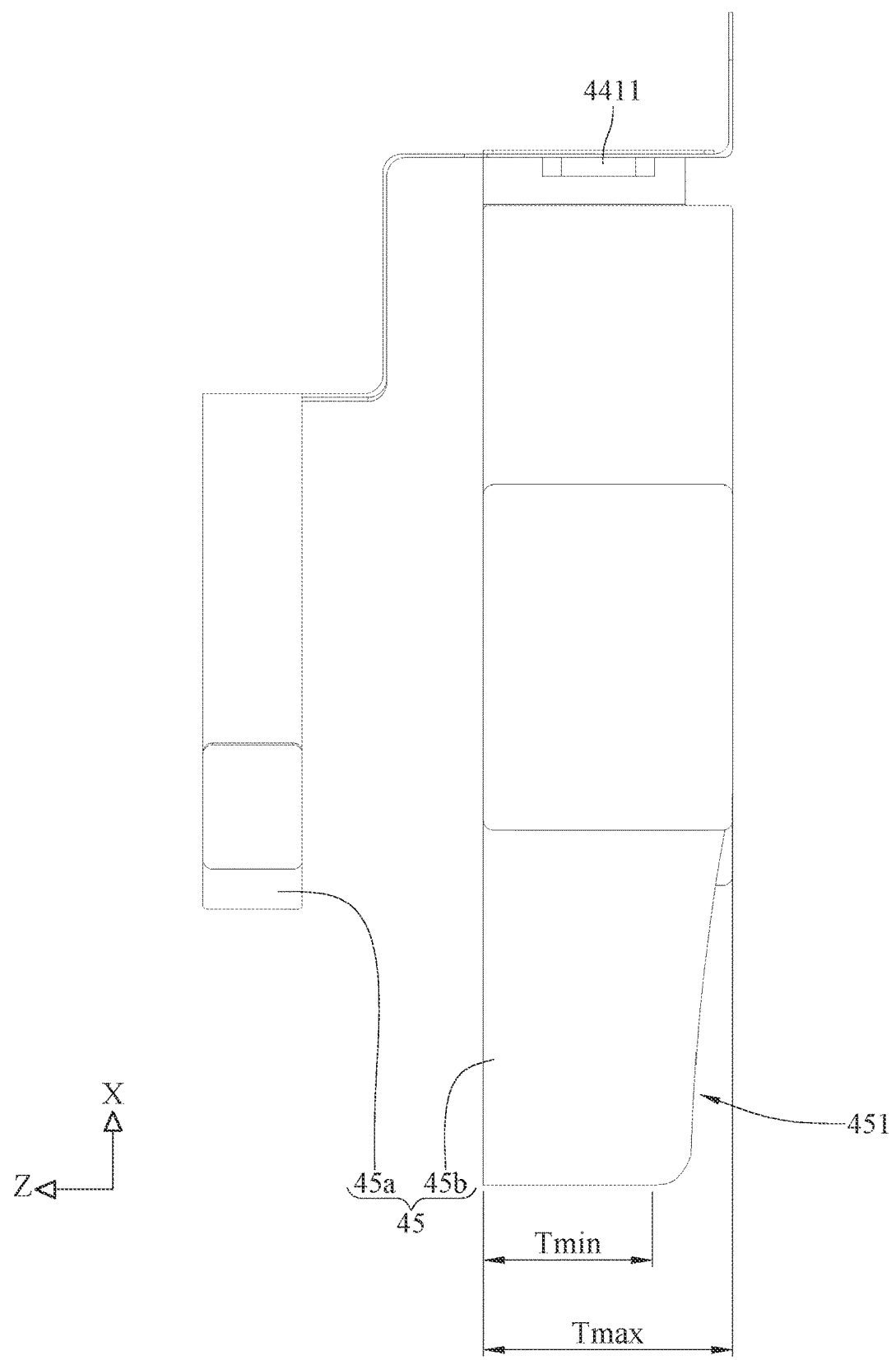
FIG. 49 is a side view of the flexible printed circuit, the first coils and the second coils of the camera module in FIG. 46.

Please further refer to FIG. 46 to FIG. 49, where FIG. 46 is a perspective view of the flexible printed circuit, first coils and second coils of the camera module in FIG. 27, FIG. 47 is a top view of the flexible printed circuit, the first coils and the second coils of the camera module in FIG. 46, FIG. 48 is a front view of the flexible printed circuit, the first coils and the second coils of the camera module in FIG. 46, and FIG. 49 is a side view of the flexible printed circuit, the first coils and the second coils of the camera module in FIG. 46.

The flexible printed circuit 45 is electrically connected to the variable through hole mechanism 42 and the image sensor actuating module 44, and the first coils 4211 of the first driving mechanism 421 and the second coils 4411 of the second driving mechanism 441 are disposed on the flexible printed circuit 45. The flexible printed circuit 45 is electrically connected to the variable through hole mechanism 42, the image sensor 43 and the image sensor actuating module 44. The flexible printed circuit 45 includes a first part 45a and the second part 45b that are connected to each other. The first part 45a is located adjacent to the variable through hole mechanism 42. The second part 45b is located adjacent to the image sensor actuating module 44. The first part 45a is located closer to the optical axis 410 than the second part 45b.

When a height of the flexible printed circuit 45 along the direction parallel to the optical axis 410 is Hf (as shown in FIG. 40), and a height of the imaging lens 41 along the direction parallel to the optical axis 410 is Hi (as shown in FIG. 37), the following conditions are satisfied: Hf=11.25 [mm]; Hi=6.95 [mm]; and Hf/Hi=1.62.

The flexible printed circuit 45 has a tapered part 451. The tapered part 451 tapers off along the direction parallel to the optical axis 410, as shown in FIG. 48 and FIG. 49. When a maximum thickness of the tapered part 451 along the direction parallel to the optical axis 410 is Tmax, and a minimum thickness of the tapered part 451 along the direction parallel to the optical axis 410 is Tmin, the following conditions are satisfied: Tmax=5.3 [mm]; Tmin=1.59 [mm], and 3.6 [mm]; and Tmax/Tmin=3.33 and 1.47.

5th Embodiment

Figure 50:
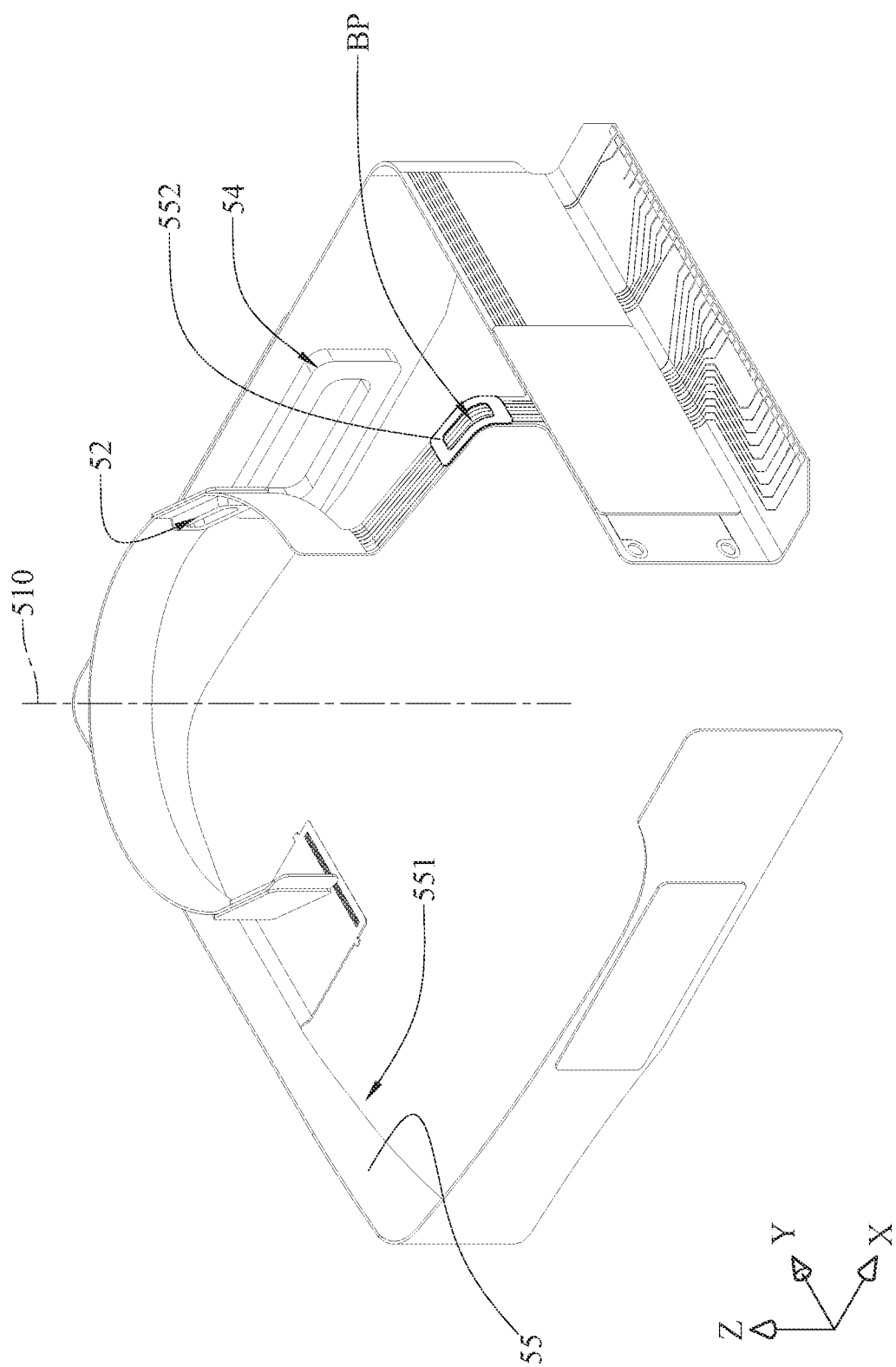
FIG. 50 is a perspective view of a flexible printed circuit, first coils and second coils of a camera module according to the 5th embodiment of the present disclosure.
Figure 51:
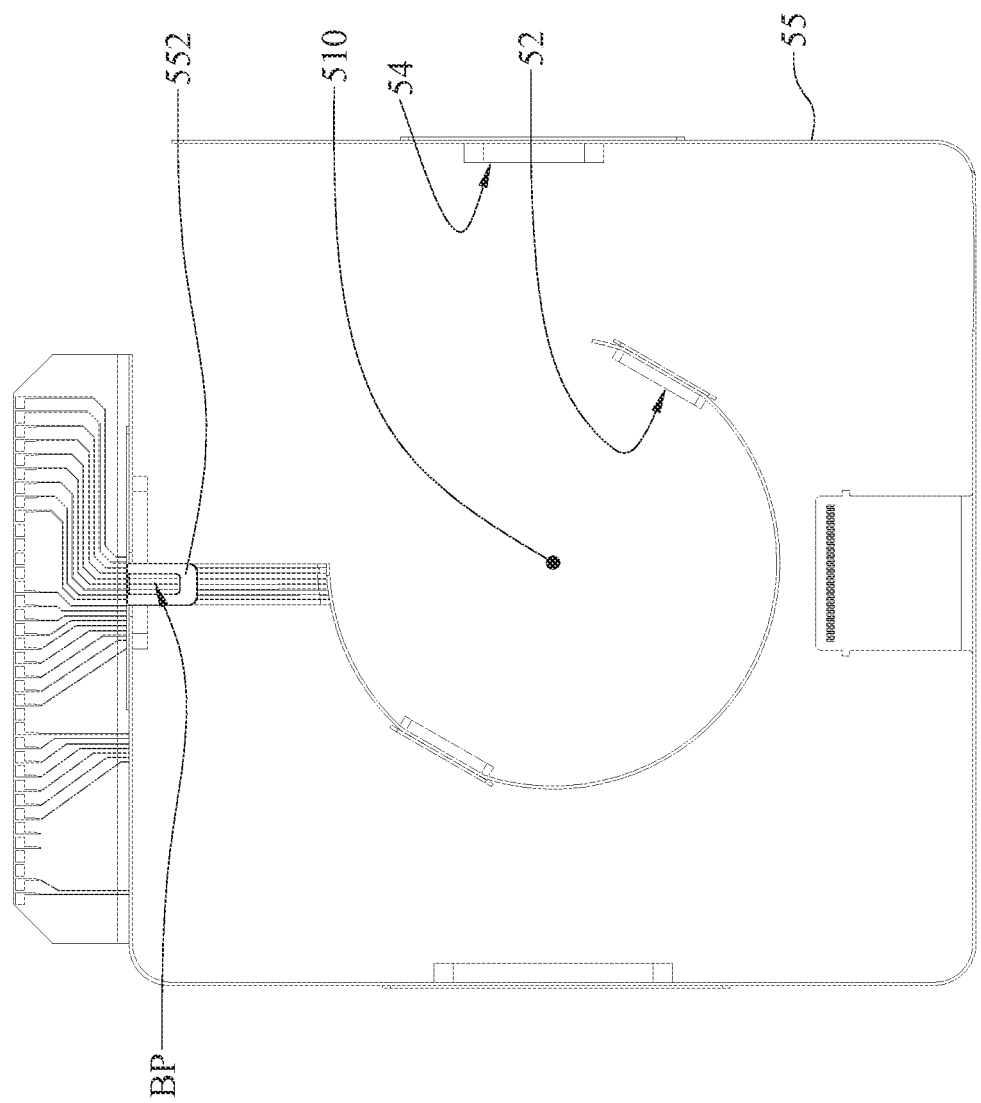
FIG. 51 is a top view of the flexible printed circuit, the first coils and the second coils of the camera module in FIG. 50.
Figure 52:
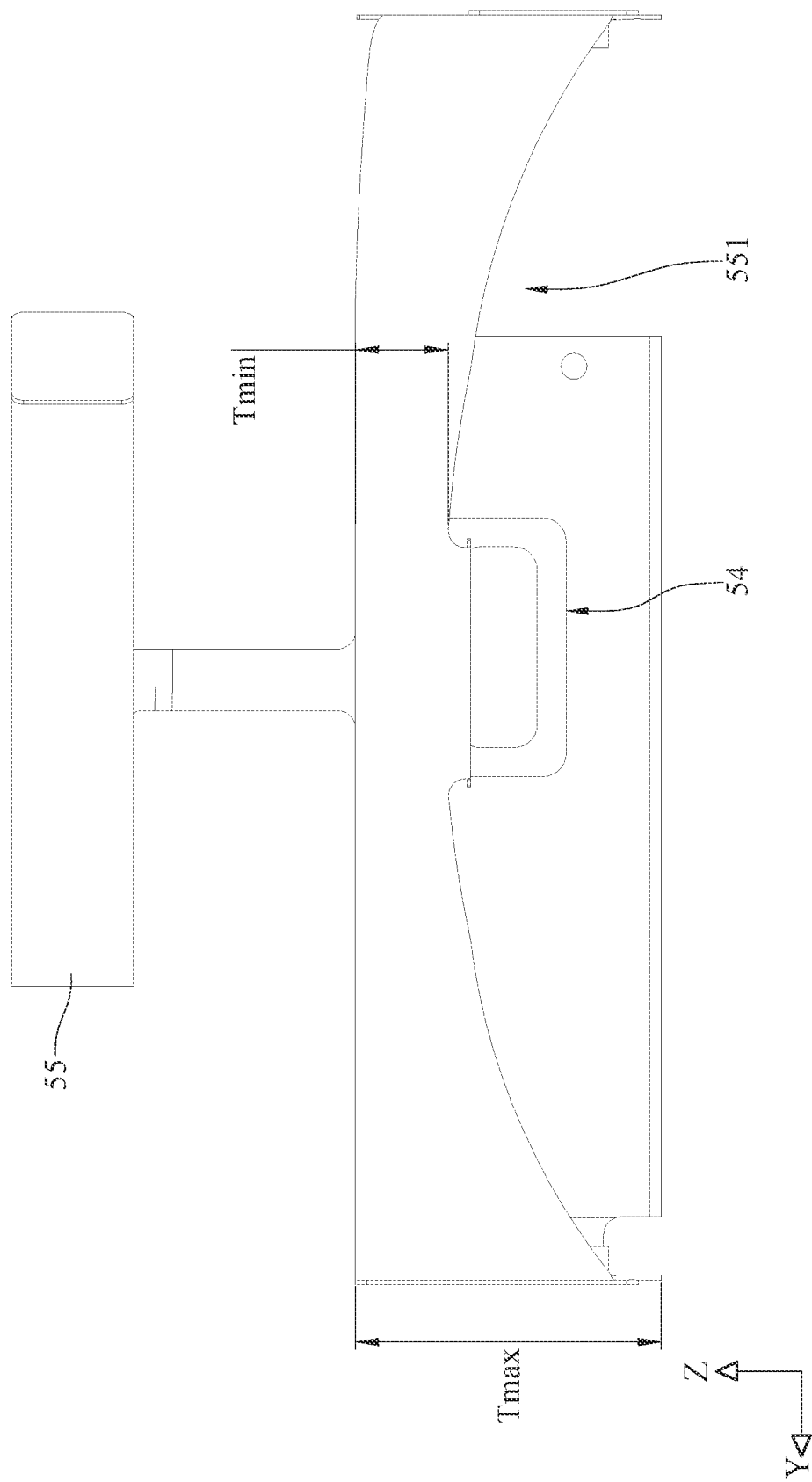
FIG. 52 is a front view of the flexible printed circuit, the first coils and the second coils of the camera module in FIG. 50.
Figure 53:
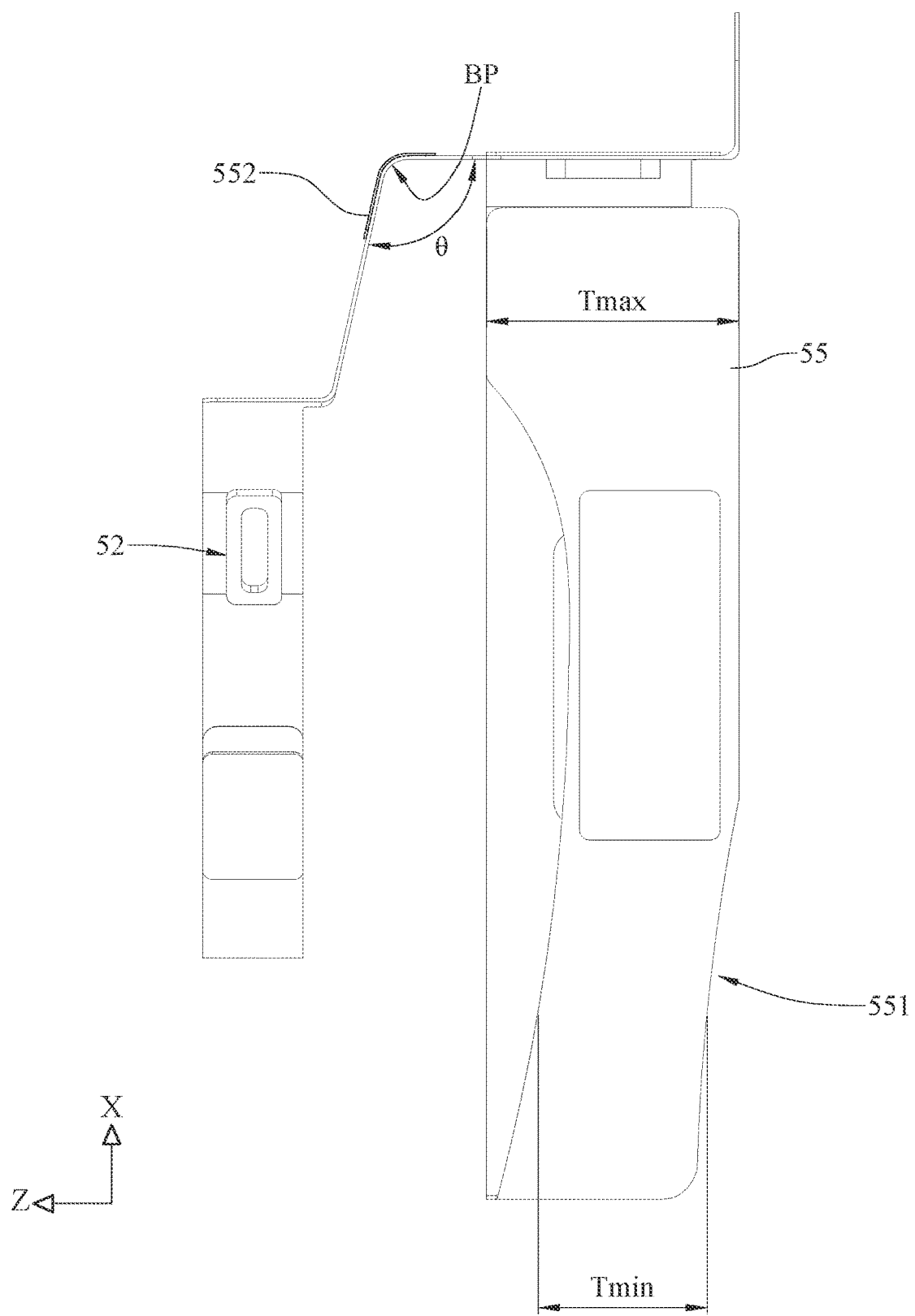
FIG. 53 is a side view of the flexible printed circuit, the first coils and the second coils of the camera module in FIG. 50.

Please refer to FIG. 50 to FIG. 53, where FIG. 50 is a perspective view of a flexible printed circuit, first coils and second coils of a camera module according to the 5th embodiment of the present disclosure, FIG. 51 is a top view of the flexible printed circuit, the first coils and the second coils of the camera module in FIG. 50, FIG. 52 is a front view of the flexible printed circuit, the first coils and the second coils of the camera module in FIG. 50, and FIG. 53 is a side view of the flexible printed circuit, the first coils and the second coils of the camera module in FIG. 50. Please be noted that the present embodiment is similar to the fourth embodiment. Therefore, only differences between the present embodiment and the fourth embodiment, as well as necessary descriptions, will be illustrated hereinafter.

In this embodiment, the flexible printed circuit 55 has a tapered part 551. The tapered part 551 tapers off along the direction parallel to the optical axis 510, as shown in FIG. 52 and FIG. 53. When a maximum thickness of the tapered part 551 along the direction parallel to the optical axis 510 is Tmax, and a minimum thickness of the tapered part 551 along the direction parallel to the optical axis 510 is Tmin, the following conditions are satisfied: Tmax=5.3 [mm]; Tmin=1.61 [mm] and 3.54 [mm]; and Tmax/Tmin=3.29 and 1.50.

The flexible printed circuit 55 further has an enhanced structure 552 at a bending position BP located between the variable through hole mechanism 52 and the image sensor actuating module 54, as shown in FIG. 50, FIG. 51 and FIG. 53. A bending angle θ of the flexible printed circuit 55 is 102.6 degrees, as shown in FIG. 53.

6th Embodiment

Figure 54:
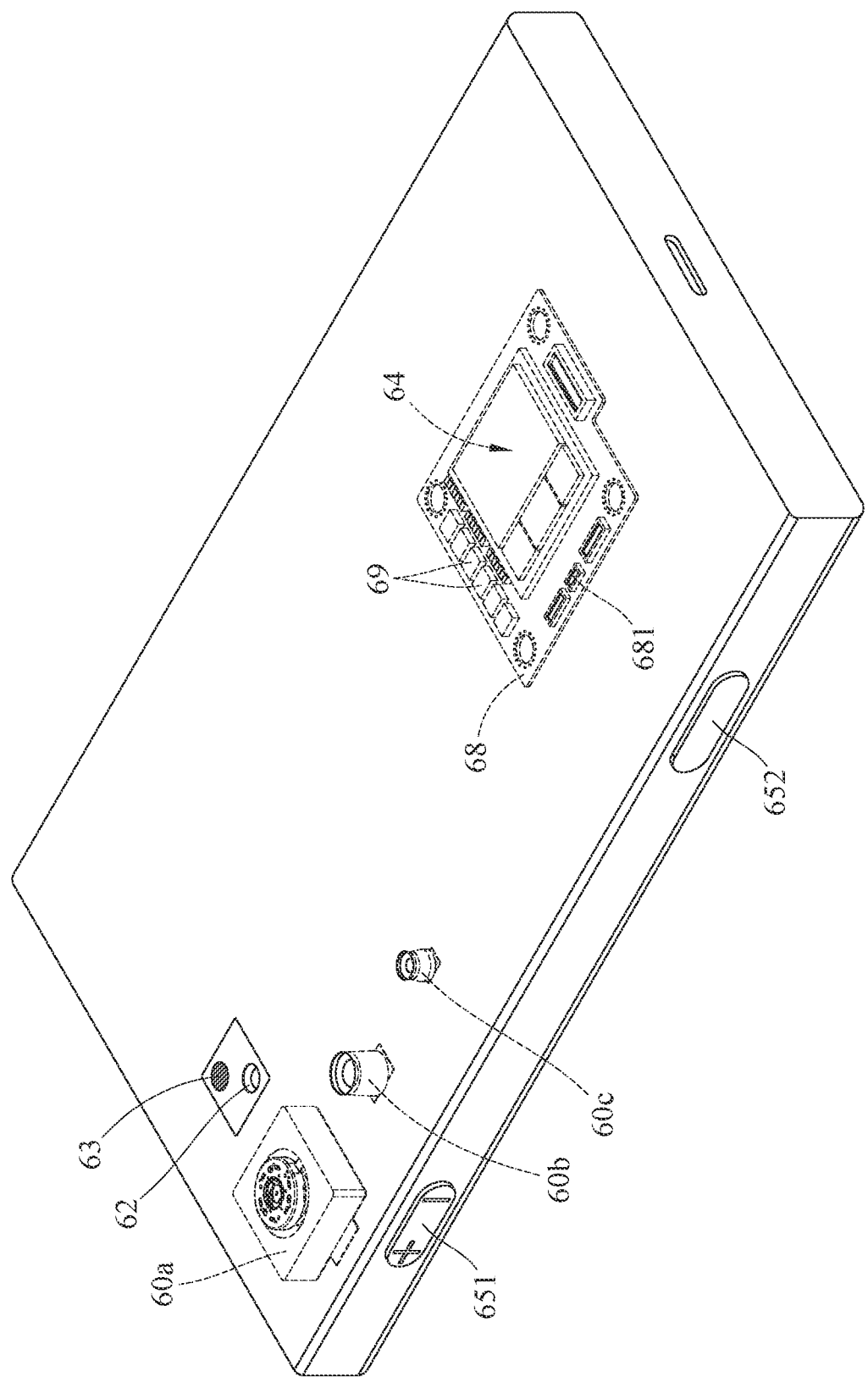
FIG. 54 is one perspective view of an electronic device according to the 6th embodiment of the present disclosure.
Figure 55:
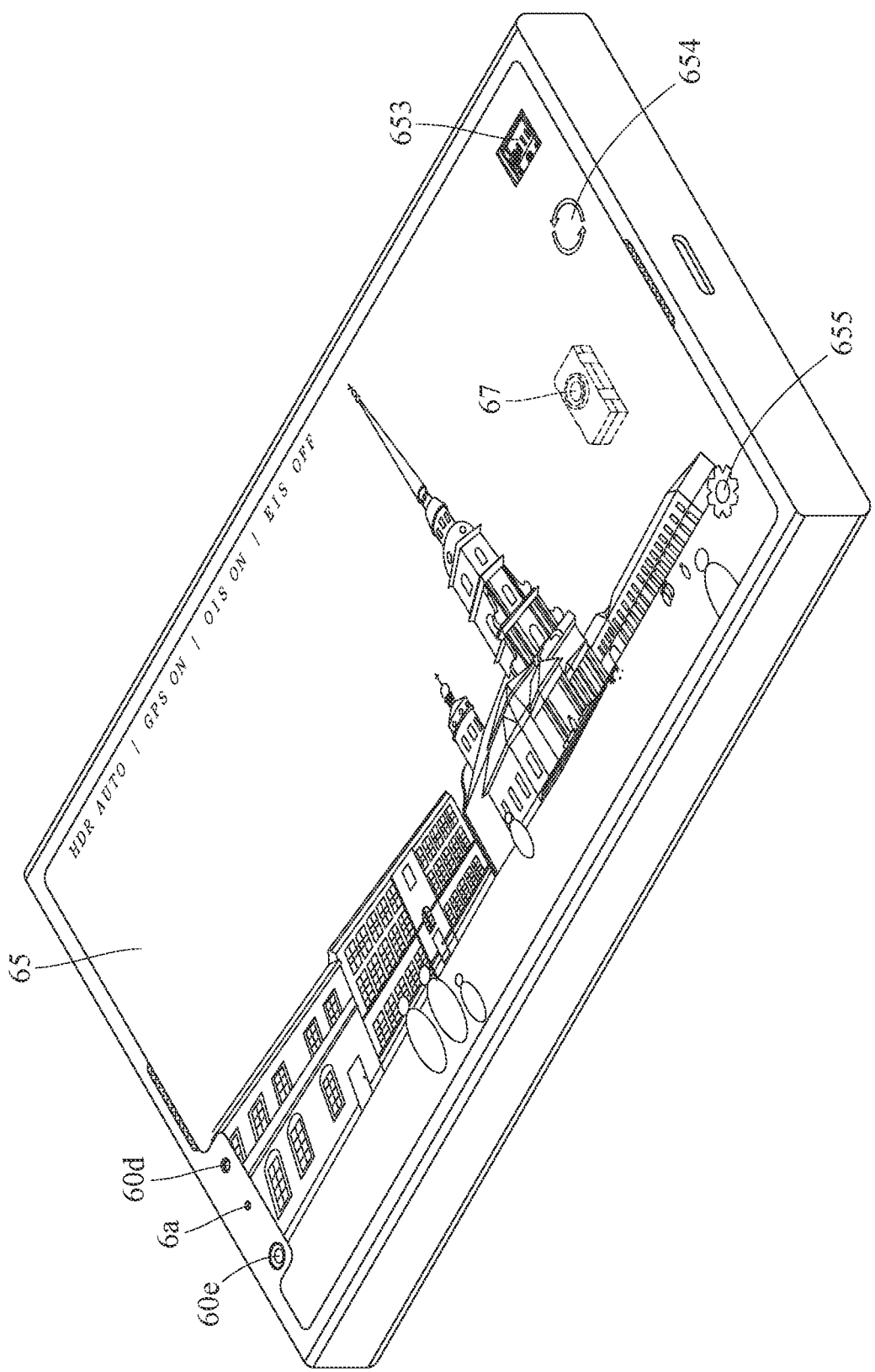
FIG. 55 is another perspective view of the electronic device in FIG. 54.
Figure 56:
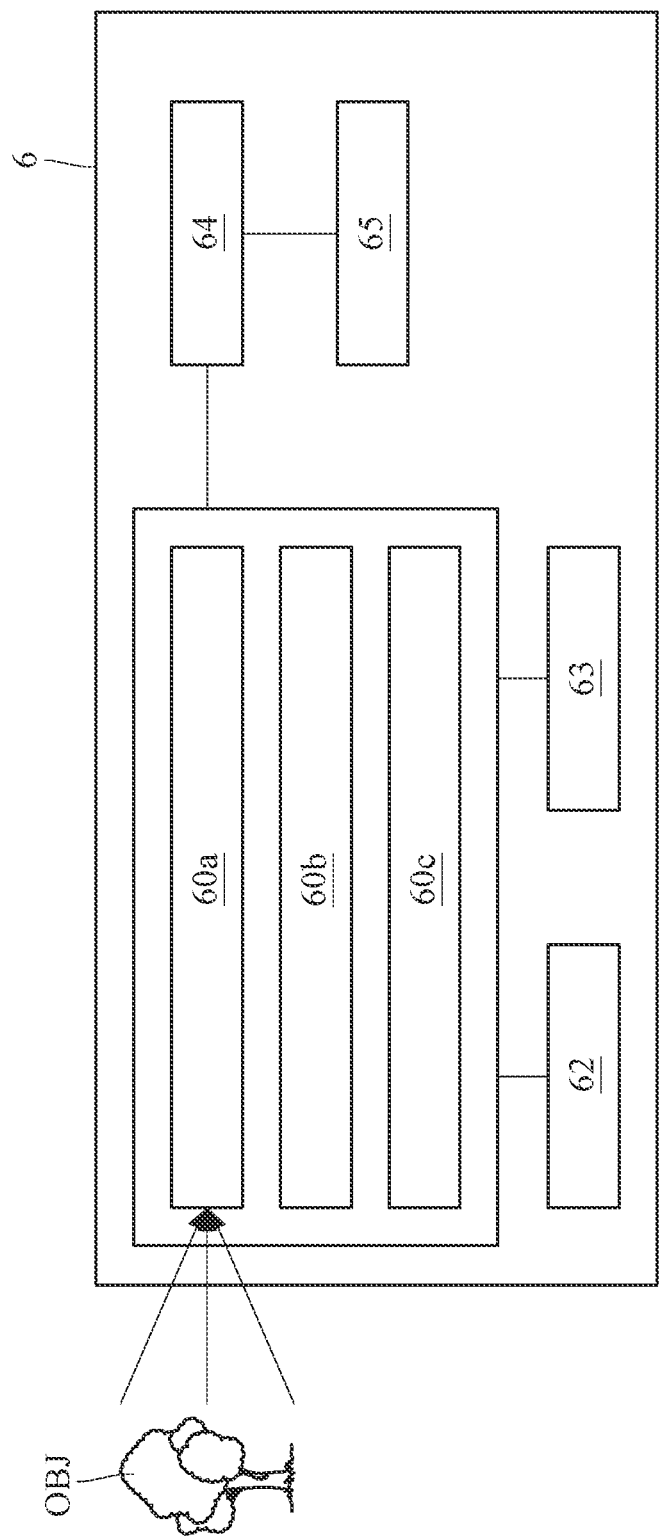
FIG. 56 is a block diagram of the electronic device in FIG. 54.

Please refer to FIG. 54 to FIG. 56, where FIG. 54 is one perspective view of an electronic device according to the 6th embodiment of the present disclosure, FIG. 55 is another perspective view of the electronic device in FIG. 54, and FIG. 56 is a block diagram of the electronic device in FIG. 54.

In this embodiment, an electronic device 6 is a mobile device such as a computer, a smartphone, a smart wearable device, a camera drone, or a driving recorder and displayer, and the present disclosure is not limited thereto. The electronic device 6 includes a variable aperture camera module 60a, a wide-angle camera module 60b, a macro-photo camera module 60c, a compact camera module 60d, a ToF (time of flight) camera module 60e, a flash module 62, a focus assist module 63, an image signal processor (not numbered), a display module 65, an image software processor (not numbered) and a biometric identification device 67. In addition, the variable aperture camera module 60a is, for example, the camera module 1 as disclosed in the 1st embodiment, but the present disclosure is not limited thereto. Each of the camera modules 60b, 60c, 60d and 60e may be one of the camera modules as disclosed in the above embodiments of the present disclosure.

The camera module 60a, the camera module 60b and the camera module 60c are disposed on the same side of the electronic device 6. The camera module 60d, the camera module 60e and the display module 65 are disposed on the opposite side of the electronic device 6. The display module 65 can be a user interface, such that the camera module 60d and the camera module 60e can be front-facing cameras of the electronic device 6 for taking selfies, but the present disclosure is not limited thereto.

Figure 57:
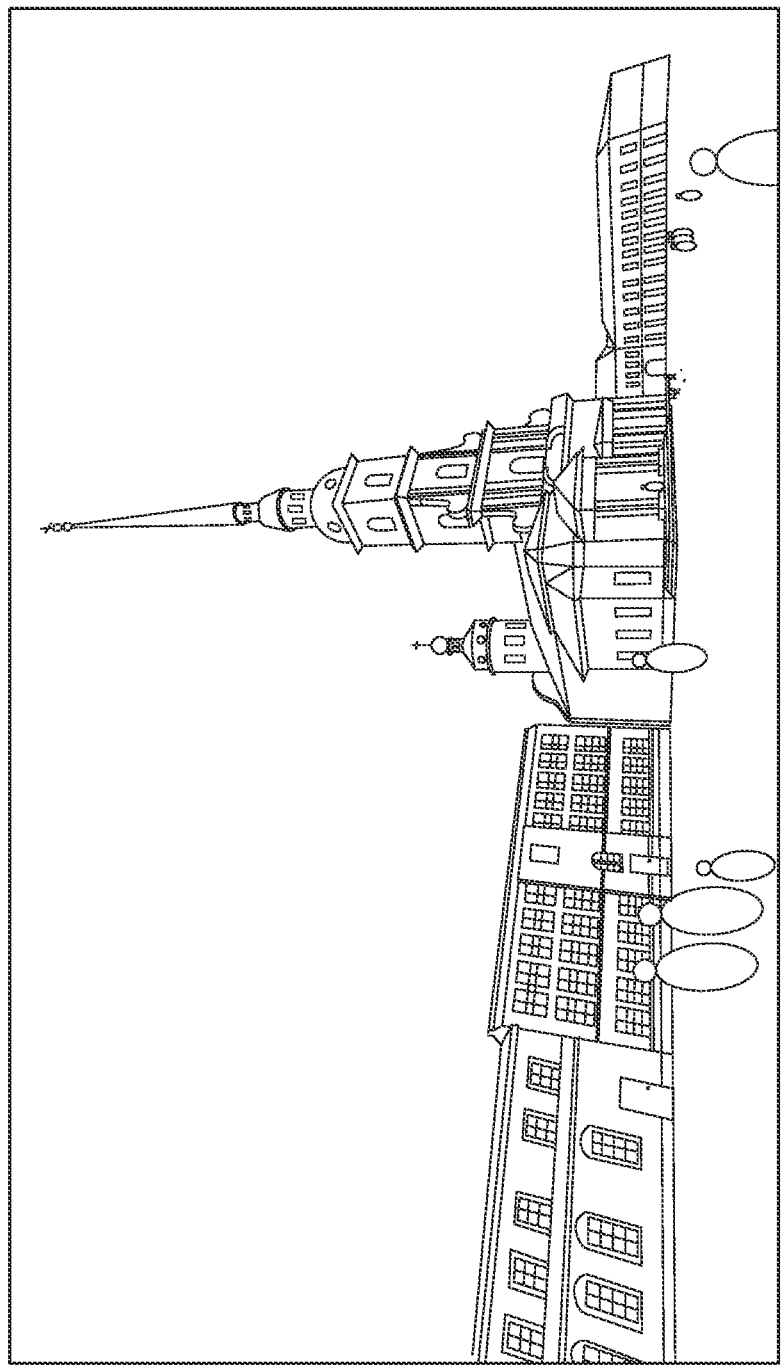
FIG. 57 shows an image captured by the electronic device using a wide-angle camera module in FIG. 54.
Figure 58:
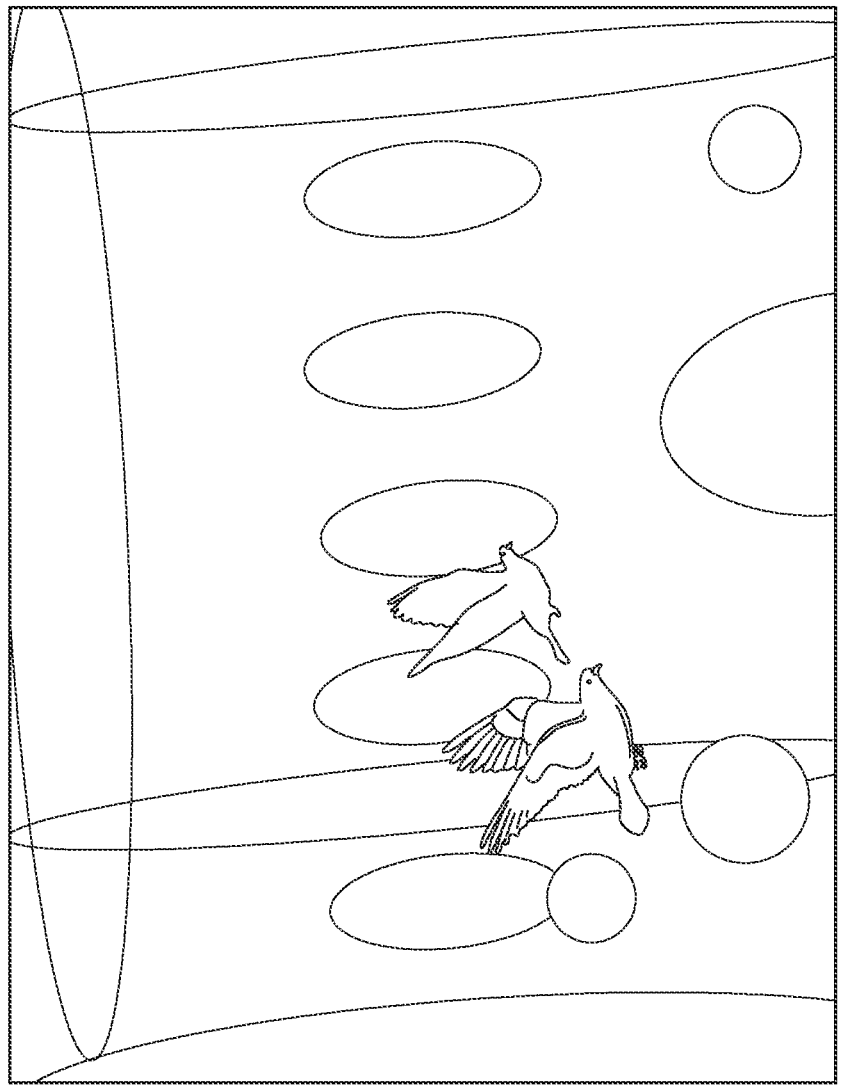
FIG. 58 shows an image captured by the electronic device using a camera module having a variable aperture stop in FIG. 54 with an f-number of 1.4.

In this embodiment, the camera module 60a, the camera module 60b and the camera module 60c have different fields of view, such that the electronic device 6 can have various magnification ratios so as to meet the requirement of optical zoom functionality. For example, the wide-angle camera module 60b has a relatively large field of view, and the image captured by the wide-angle camera module 60b can refer to FIG. 57, which shows an image captured by the electronic device 6 with a wide-angle camera module 60b, and the captured image as shown in FIG. 57 includes the whole cathedral, surrounding buildings and people in front of the cathedral. The captured image as shown in FIG. 57 has a relatively large field of view and depth of view, but it often has a relatively large degree of distortion. The image captured by the camera module 60a with a relatively small f-number can refer to FIG. 58, and the image captured by the camera module 60a with a relatively large f-number can refer to FIG. 59. FIG. 58 shows an image captured by the electronic device 6 with the camera module 60a with an f-number of 1.4, FIG. 24 shows an image captured by the electronic device 6 with the camera module 60a with an f-number of 5.6, and the captured images as shown in FIG.

Figure 59:
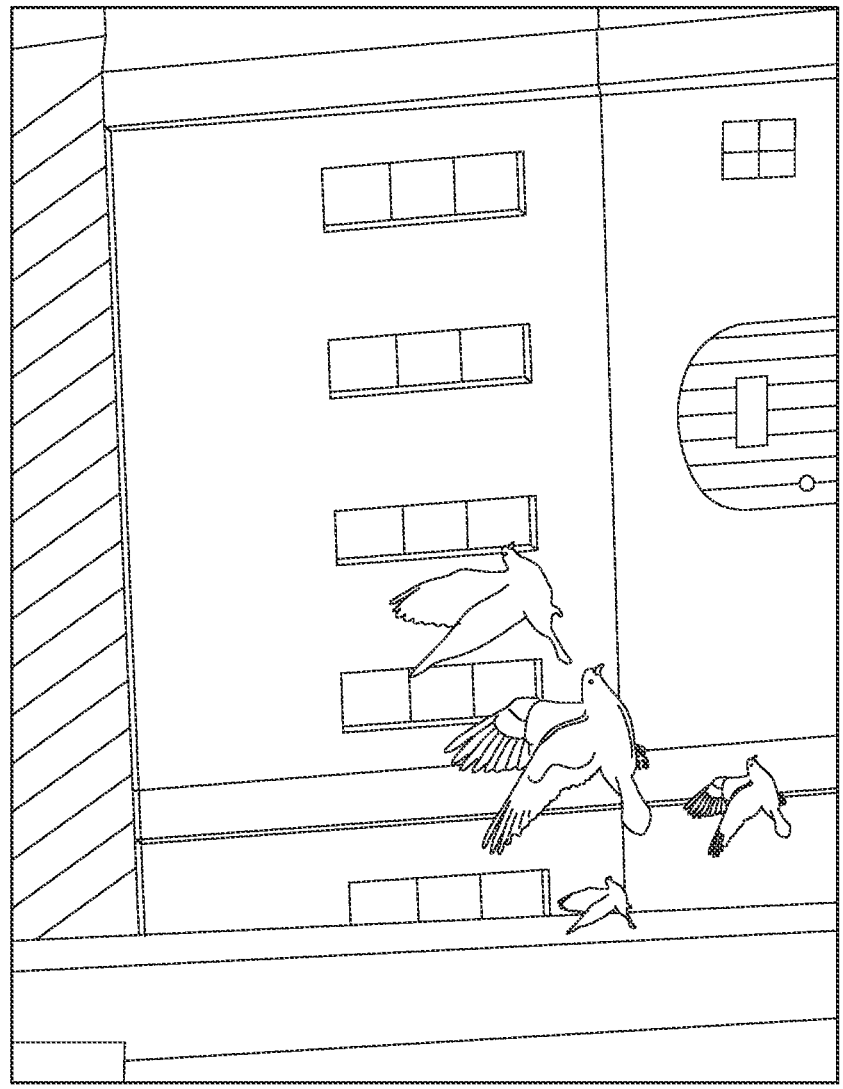
FIG. 59 shows an image captured by the electronic device using a camera module having a variable aperture stop in FIG. 54 with an f-number of 5.6.

58 and FIG. 59 include birds flying in front of the cathedral. As shown in FIG. 58, when the variable through hole mechanism 12 of the camera module 60a provides a relatively large light-passable hole TH, the image sensor 13 receives more light, but the background in the image is relatively blurry. As shown in FIG. 59, when the variable through hole mechanism 12 of the camera module 60a provides a relatively small light-passable hole TH, the image sensor 13 receives less light, but the background in the image is relatively clear. The captured images as shown in FIG. 58 and FIG. 59 have a relatively small field of view, and the camera module 60a can be used for shooting moving targets. For example, the auto-focus driving part can drive the lens carrier to quickly and continuously autofocus on the target, such that the captured image of the target would not be blurred due to deviation from the focusing position. When imaging, the camera module 60a can further perform optical zoom for imaged objects so as to obtain more remarkable images. In addition, the ToF camera module 60e can determine depth information of the imaged object. In this embodiment, the electronic device 6 includes multiple camera modules 60a, 60b, 60c, 60d, and 60e, but the present disclosure is not limited to the number and arrangement of camera modules.

When a user captures images of an object OBJ, light rays converge in the camera module 60a, the camera module 60b or the camera module 60c to generate images, and the flash module 62 is activated for light supplement. The focus assist module 63 detects the object distance of the imaged object OBJ to achieve fast auto focusing. The image signal processor is configured to optimize the captured image to improve image quality. The light beam emitted from the focus assist module 63 can be either conventional infrared or laser.

In addition, the light rays may converge in the camera module 60d or the camera module 60e to generate images. The electronic device 6 can include a reminder light 6a that can be illuminated to remind the user that the camera module 60d or the camera module 60e is working. The display module 65 can be a touch screen or collaborated with physical buttons such as a zoom button 651 and a shutter release button 652. The user is able to interact with the display module 65 and the image software processor having multiple functions to capture images and complete image processing. The image processed by the image software processor can be displayed on the display module 65. The user can replay the previously captured image through an image playback button 653 of the display module 65, can choose a suitable camera module for shooting through a camera module switching button 654 of the display module 65, and can properly adjust shooting parameters according to current shooting situations through an integrated menu button 655 of the display module 65.

Further, the electronic device 6 further includes a circuit board 68 and a plurality of electronic components 69 disposed on the circuit board 68. The camera modules 60a, 60b, 60c, 60d, and 60e are electrically connected to the electronic component 69 via connectors 681 on the circuit board 68. The electronic components 69 can include a signal emitting module and can transmit image(s) to other electronic device or a cloud storage via the signal emitting module. The signal emitting module can be a wireless fidelity (WiFi) module, a Bluetooth module, an infrared module, a network service module or an integrated module for transmitting various signals mentioned above, and the present disclosure is not limited thereto.

The electronic components 69 can also include a storage unit, a random access memory for storing image information, a gyroscope, and a position locator for facilitating the navigation or positioning of the electronic device 6. In this embodiment, the image signal processor, the image software processor and the random access memory are integrated into a single chip system 64, but the present disclosure is not limited thereto. In some other embodiments, the electronic components can also be integrated in the camera module or can also be disposed on one of the circuit boards. In addition, the user can use the biometric identification device 67 to turn on or unlock the electronic device 6.

The smartphone in this embodiment is only exemplary for showing the camera module of the present disclosure installed in the electronic device 6, and the present disclosure is not limited thereto. The camera module can be optionally applied to optical systems with a movable focus. Furthermore, the camera modules 1-5 feature good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module, comprising:
   an imaging lens, having an optical axis;
   a variable through hole mechanism, disposed corresponding to the imaging lens, wherein the variable through hole mechanism is configured to adjust an amount of light into the imaging lens, and the variable through hole mechanism comprises:
     a first driving mechanism, comprising at least one first coil and at least one first magnet that are disposed opposite to each other;
   an image sensor, disposed on the optical axis, wherein the image sensor is configured to convert imaging light passing through the imaging lens into an image signal;
   an image sensor actuating module, configured to move the image sensor along a direction parallel or perpendicular to the optical axis, wherein the image sensor actuating module comprises:
     a second driving mechanism, comprising at least one second coil and at least one second magnet that are disposed opposite to each other; and
   a flexible printed circuit, electrically connected to the variable through hole mechanism and the image sensor actuating module;

wherein the at least one first coil of the first driving mechanism and the at least one second coil of the second driving mechanism are disposed on the flexible printed circuit;

wherein a height of the flexible printed circuit along a direction parallel to the optical axis is Hf, a height of the imaging lens along the direction parallel to the optical axis is Hi, and the following condition is satisfied:

$$1 < Hf/Hi < 2.5.$$

2. The camera module according to claim 1, wherein the flexible printed circuit is electrically connected to the variable through hole mechanism, the image sensor and the image sensor actuating module.

3. The camera module according to claim 1, wherein the flexible printed circuit has a tapered part, a maximum thickness of the tapered part along a direction parallel to the optical axis is Tmax, a minimum thickness of the tapered part along the direction parallel to the optical axis is Tmin, and the following condition is satisfied:

$$1 < T\max/T\min < 4.5.$$

4. The camera module according to claim 3, wherein the maximum thickness of the tapered part along the direction parallel to the optical axis is Tmax, the minimum thickness of the tapered part along the direction parallel to the optical axis is Tmin, and the following condition is satisfied:

$$1.1 < T\max/T\min < 3.9.$$

5. The camera module according to claim 1, wherein the variable through hole mechanism further comprises:
- a light-blocking assembly, comprising a plurality of light-blocking sheets that are stacked with each other along a circumferential direction about the optical axis to form a light-passable hole with a variable aperture;
- a fixed element, connected to the light-blocking assembly; and
- a movable element, connected to the light-blocking assembly, wherein the at least one first magnet is disposed on the movable element to be disposed opposite to the at least one first coil.

6. The camera module according to claim 5, wherein the first driving mechanism is configured to rotate the movable element along the circumferential direction with respect to the fixed element so as to drive the light-blocking assembly to adjust the variable aperture of the light-passable hole.

7. The camera module according to claim 1, wherein the image sensor actuating module further comprises an image stabilization module and an image focus module that are disposed corresponding to each other.

8. The camera module according to claim 7, wherein the image stabilization module is configured to move the image sensor along a direction perpendicular to the optical axis, and the image stabilization module comprises:
- an image sensor carrier, carrying the image sensor;
- a first movable plate, coupled to the image sensor carrier, wherein the second driving mechanism moves the first movable plate along the direction perpendicular to the optical axis with respect to the imaging lens;
- at least one first rolling supporter, rollably disposed on the first movable plate;
- a second movable plate, connected to the first movable plate via the at least one first rolling supporter, wherein the second driving mechanism moves the second movable plate along the direction perpendicular to the optical axis with respect to the first movable plate; and
- a first ferromagnetic element, formed together with the first movable plate through an insert molding process.

9. The camera module according to claim 8, wherein the image focus module is configured to move the image sensor along the direction parallel to the optical axis, and the image focus module comprises:
- at least one second rolling supporter, rollably disposed on the second movable plate;
- a base, connected to the second movable plate via the at least one second rolling supporter, wherein the second driving mechanism moves the base along the direction parallel to the optical axis with respect to the imaging lens;
- at least one third rolling supporter, rollably disposed on the base;
- a frame, connected to the base via the at least one third rolling supporter; and
- a second ferromagnetic element, formed together with the base through an insert molding process.

10. The camera module according to claim 1, wherein the flexible printed circuit comprises a first part and a second part that are connected to each other, the first part is located adjacent to the variable through hole mechanism, the second part is located adjacent to the image sensor actuating module, and the first part is located closer to the optical axis than the second part.

11. The camera module according to claim 10, wherein the flexible printed circuit further has an enhanced structure at a bending position located between the variable through hole mechanism and the image sensor actuating module.

12. The camera module according to claim 1, wherein the imaging lens comprising:
- an optical lens assembly, comprising at least one plastic lens element and at least one glass lens element.

13. The camera module according to claim 12, wherein a number of the at least one plastic lens element is Np, a number of the at least one glass lens element is Ng, and the following condition is satisfied:

$$1 \leq Ng < Np \leq 12.$$

14. The camera module according to claim 12, wherein at least one of the at least one glass lens element is a molded glass lens element.

15. The camera module according to claim 9, wherein the frame has a mounting structure configured to mount the imaging lens, such that there is no relative displacement between the imaging lens and the frame.

16. The camera module according to claim 15, wherein the imaging lens has no relative displacement inside the camera module.

17. The camera module according to claim 3, wherein the tapered part of the flexible printed circuit tapers off along the direction parallel to the optical axis.

18. An electronic device, comprising:
the camera module of claim 1.

* * * * *